(12) United States Patent
Zöldi et al.

(10) Patent No.: US 12,152,691 B2
(45) Date of Patent: Nov. 26, 2024

(54) SLAM-SHUT SAFETY DEVICES FOR A FLUID REGULATOR

(71) Applicant: EMERSON PROCESS MANAGEMENT REGULATOR TECHNOLOGIES, INC., McKinney, TX (US)

(72) Inventors: Ioan-Răzvan Zöldi, Turda (RO); Alexandru-Vlad Roman, Cluj-Napoca (RO); Radu-Vasile Glodan, Cluj-Napoca (RO); Andrei Teleba, Turda (RO); Ovidiu Mihail Mihut, Reghin (RO); Harry Bogdan Dăngeanu, Turda (RO); Petru Horațiu Tripon, Cluj-Napoca (RO); Gabriel Todoran, Turda (RO); Theodor Rosu, Turda (RO); Eva Gota, Cluj-Napoca (RO)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 17/732,129

(22) Filed: Apr. 28, 2022

(65) Prior Publication Data
US 2023/0313908 A1     Oct. 5, 2023

(30) Foreign Application Priority Data
Apr. 1, 2022    (EP) ...................... 22465525

(51) Int. Cl.
*F16K 31/524*     (2006.01)
*F16K 35/02*     (2006.01)

(52) U.S. Cl.
CPC ...... *F16K 31/52475* (2013.01); *F16K 35/022* (2013.01)

(58) Field of Classification Search
CPC ............. F16K 31/52475; F16K 31/128; F16K 35/022; F16K 17/32; F16K 17/164;
(Continued)

(56) References Cited

U.S. PATENT DOCUMENTS

| | | |
|---|---|---|
| 8,225,812 B2 | 7/2012 | Faillat et al. |
| 9,593,782 B2 | 3/2017 | Crutsinger et al. |
| 2019/0383409 A1 | 12/2019 | Basappa et al. |

OTHER PUBLICATIONS

Extended European Search Report, European Application No. 22465525.8, dated Oct. 6, 2022.
(Continued)

*Primary Examiner* — Reinaldo Sanchez-Medina
*Assistant Examiner* — Nicole Gardner
(74) *Attorney, Agent, or Firm* — MARSHALL, GERSTEIN & BORUN LLP

(57) ABSTRACT

A slam-shut mechanism for operatively connecting a slam-shut control element of a fluid regulator with a controller for the control element. The mechanism includes a shaft and a cam carried by the shaft and having a cam surface adapted to be operatively connected to the slam-shut control element. The mechanism also includes a latching pin carried by the shaft, a latch, and a lever operably connected to the latch and adapted to be selectively engaged by the controller. When the controller engages the lever, the latch is movable from a first position, in which the latch securely retains the latching pin, such that the cam surface is arranged to retain the slam-shut control element in a fully open position, to a second position, in which the latching pin is released from the latch, thereby allowing the slam-shut control element to move from the fully open position to a closed position.

22 Claims, 56 Drawing Sheets

(58) Field of Classification Search
CPC .... F16K 17/168; F16K 17/042; F16K 17/044; Y10T 137/7725
See application file for complete search history.

(56) References Cited

OTHER PUBLICATIONS

VSX4 and VSX8 Series Controller Instruction Manual, Emerson, May 2021.
International Search Report and Written Opinion, International Application No. PCT/US2023/016215, mailed May 16, 2023.

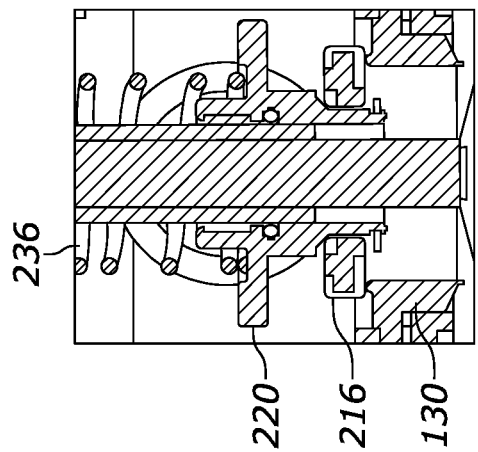
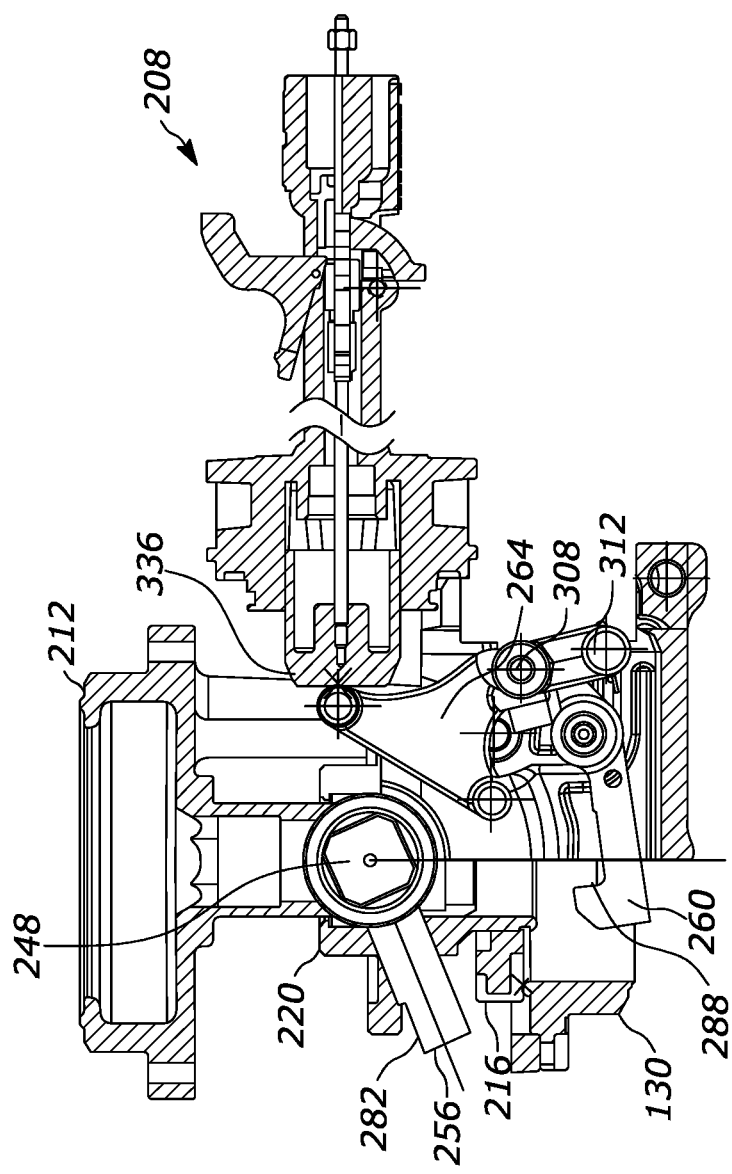
FIG. 13B
FIG. 13A

SLAM-SHUT SAFETY DEVICES FOR A FLUID REGULATOR

CROSS-REFERENCE TO RELATED APPLICATION

The present application claims priority to European Application No. 22465525.8, titled "Slam-Shut Safety Devices for a Fluid Regulator" and filed Apr. 1, 2022, the entire content of which is incorporated herein by reference in its entirety.

FIELD OF THE DISCLOSURE

The present disclosure generally relates to slam-shut safety devices and, more particularly, to slam-shut safety devices for use with a fluid regulator.

BACKGROUND

The pressure at which typical fluid distribution systems supply fluid may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, fluid regulators are implemented in these distribution systems in order to ensure that the delivered gas meets the requirements of the end-user facilities.

Fluid regulators, such as the Tartarini™ M Series Pressure Regulator, are primarily designed for industrial and commercial applications supplying fluids, such as natural gas and propane, to furnaces, burners, and other appliances and are generally well known in the art. Fluid regulators are typically used to regulate the pressure of a supply fluid to a substantially constant value. Specifically, a fluid regulator has an inlet that typically receives the supply fluid at a relatively high pressure and provides a relatively lower and substantially constant pressure at an outlet. To regulate the downstream pressure, fluid regulators commonly include a sensing element (e.g., a diaphragm) to sense an outlet pressure in fluid communication with a downstream pressure.

Fluid regulators can also include a slam-shut device, such as the Emerson® OS/66 series slam-shut device, that provide safety shutoff if needed. Slam-shut devices provide this safety shutoff in response to an overpressure condition (i.e., when the downstream pressure exceeds a maximum downstream pressure threshold) and/or an under pressure condition (i.e., when the downstream pressure is less than a minimum downstream pressure threshold). When the downstream pressure is at a normal operating value, the slam-shut device remains open (i.e., does not provide safety shutoff). However, when the downstream pressure varies beyond its set limits, the slam-shut device closes and prevents fluid from flowing through the fluid regulator. One problem encountered with typically slam-shut devices is the position of an integrated slam-shut device in the fluid regulator. A typical integrated slam-shut device is accessible from one side of the body of the fluid regulator, between the input and the output. Depending on the field installation and/or skid design, the side of the fluid regulator where the slam-shut device is positioned can be inaccessible by the user, which can severely complicate normal line startup, maintenance, and/or troubleshooting.

SUMMARY

One aspect of the present disclosure includes a slam-shut mechanism for operatively connecting a slam-shut control element of a fluid regulator with a controller for the slam-shut control element. The slam-shut mechanism includes a shaft and a cam carried by the shaft, the cam having a cam surface adapted to be operatively connected to the slam-shut control element. The slam-shut mechanism also includes a latching pin carried by the shaft, a latch, and a lever operably connected to the latch, the lever adapted to be selectively engaged by the controller. Responsive to the controller engaging the lever, the latch is movable from a first position, in which the latch securely retains the latching pin, such that the cam surface is arranged to retain the slam-shut control element in a fully open position, to a second position, in which the latching pin is released from the latch, thereby allowing the slam-shut control element to move from the fully open position to a closed position.

Another aspect of the present disclosure includes a slam-shut mechanism for operatively connecting a slam-shut control element of a fluid regulator with a controller for the slam-shut control element. The slam-shut mechanism includes a housing adapted to be coupled to a regulator body of the fluid regulator. The slam-shut mechanism also includes a shaft extending through an opening formed in the housing and a cam carried by the shaft at a position outside of the housing, the cam adapted to be operatively connected to the slam-shut control element. The slam-shut mechanism also includes a latching pin carried by the shaft, a latch pivotably coupled to the housing, and a lever pivotably coupled to the housing and operably connected to the latch, the lever adapted to be selectively engaged by the controller. Responsive to the controller engaging the lever, the latch is movable from a first position, in which the latch securely retains the latching pin, such that the cam surface is arranged to retain the slam-shut control element in a fully open position, to a second position, in which the latching pin is released from the latch, thereby allowing the slam-shut control element to move from the fully open position to a closed position.

Another aspect of the present disclosure includes a fluid regulator. The fluid regulator includes a regulator body having an inlet, an outlet, and a flow path extending between the inlet and the outlet, the regulator body including a seat surrounding an orifice in the flow path. The fluid regulator includes a slam-shut control element that is disposed within the regulator body and shiftable between a fully open position in which the slam-shut control element is spaced away from the seat, and a closed position in which the slam-shut control element is seated against the seat. The fluid regulator also includes a controller for moving the slam-shut control element between the fully open position and the closed position, the controller coupled to a first portion of the regulator body. The fluid regulator further includes a slam-shut mechanism for operatively connecting the slam-shut control element to the controller. The slam-shut mechanism includes a shaft and a cam carried by the shaft, the cam having a cam surface adapted to be operatively connected to the slam-shut control element. The slam-shut mechanism also includes a latching pin carried by the shaft, a latch, and a lever operably connected to the latch, the lever configured to be selectively engaged by the controller. Responsive to the controller engaging the lever, the latch is movable from a first position, in which the latch securely retains the latching pin, such that the cam surface is arranged to retain the slam-shut control element in a fully open position, to a second position, in which the latching pin is released from the latch. Movement of the latch from the first position to the second position allows the slam-shut control element to move from the fully open position to the closed position.

Another aspect of the present disclosure includes a slam-shut mechanism for operatively connecting a slam-shut control element of a fluid regulator with a controller for the slam-shut control element. The slam-shut mechanism includes a shaft and a cam carried by the shaft, the cam having a cam surface adapted to be operatively connected to the slam-shut control element. The slam-shut mechanism includes a first slam-shut assembly and a second slam-shut assembly linked to the first slam-shut assembly. The first slam-shut assembly includes a first latching pin carried by the shaft, a first latch, and a first lever operably connected to the first latch, the first lever adapted to be selectively engaged by the controller. The second slam-shut assembly includes a second latching pin carried by the shaft, a second latch, and a second lever operably connected to the second latch, the second lever adapted to be selectively engaged by the controller. Responsive to the controller engaging the first lever, the first latch is movable from a first position, in which the first latch securely retains the first latching pin, such that the cam surface is arranged to retain the slam-shut control element in a fully open position, to a second position, in which the first latching pin is released from the first latch, thereby allowing the slam-shut control element to move from the fully open position to a closed position. Movement of the first latch from the first position to the second position causes movement of the second latch from a third position, in which the second latch securely retains the second latching pin, to a fourth position, in which the second latching pin is released from the second latch.

Another aspect of the present disclosure includes a slam-shut mechanism for operatively connecting a slam-shut control element of a fluid regulator with a controller for the slam-shut control element. The slam-shut mechanism includes a housing, a shaft extending through an opening formed in the housing, and a cam carried by the shaft, the cam having a cam surface adapted to be operatively connected to the slam-shut control element. The slam-shut mechanism includes a first slam-shut assembly coupled to a first portion of the housing and a second slam-shut assembly coupled to a second portion of the housing and linked to the first slam-shut assembly. The first slam-shut assembly includes a first latching pin carried by the shaft, a first latch, and a first lever operably connected to the first latch, the first lever adapted to be selectively engaged by the controller. The second slam-shut assembly includes a second latching pin carried by the shaft, a second latch, and a second lever operably connected to the second latch, the second lever adapted to be selectively engaged by the controller. Responsive to the controller engaging either the first lever or the second lever, the first latch is movable from a first position, in which the first latch securely retains the first latching pin, such that the cam surface is arranged to retain the slam-shut control element in a fully open position, to a second position, in which the first latching pin is released from the first latch, thereby allowing the slam-shut control element to move from the fully open position to a closed position. Movement of the first latch from the first position to the second position causes movement of the second latch from a third position, in which the second latch securely retains the second latching pin, to a fourth position, in which the second latching pin is released from the second latch.

Another aspect of the present disclosure includes a fluid regulator. The fluid regulator includes a regulator body having an inlet, an outlet, and a flow path extending between the inlet and the outlet, the regulator body including a seat surrounding an orifice in the flow path. The fluid regulator includes a slam-shut control element that is disposed within the regulator body and shiftable between a fully open position in which the slam-shut control element is spaced away from the seat, and a closed position in which the slam-shut control element is seated against the seat. The fluid regulator also includes a controller for moving the slam-shut control element between the fully open position and the closed position, the controller coupled to a first portion of the regulator body. The fluid regulator further includes a slam-shut mechanism for operatively connecting a slam-shut control element of a fluid regulator with the controller. The slam-shut mechanism includes a shaft and a cam carried by the shaft, the cam having a cam surface adapted to be operatively connected to the slam-shut control element. The slam-shut mechanism includes a first slam-shut assembly and a second slam-shut assembly linked to the first slam-shut assembly. The first slam-shut assembly includes a first latching pin carried by the shaft, a first latch, and a first lever operably connected to the first latch, the first lever adapted to be selectively engaged by the controller. The second slam-shut assembly includes a second latching pin carried by the shaft, a second latch, and a second lever operably connected to the second latch, the second lever adapted to be selectively engaged by the controller. Responsive to the controller engaging the first lever, the first latch is movable from a first position, in which the first latch securely retains the first latching pin, such that the cam surface is arranged to retain the slam-shut control element in a fully open position, to a second position, in which the first latching pin is released from the first latch, thereby allowing the slam-shut control element to move from the fully open position to a closed position. Movement of the first latch from the first position to the second position causes movement of the second latch from a third position, in which the second latch securely retains the second latching pin, to a fourth position, in which the second latching pin is released from the second latch. The controller is removable from the first portion of the regulator body and coupleable to a second portion of the regulator body, and when the controller is coupled to the second portion of the regulator body, the controller is configured to selectively engage the second lever.

Another aspect of the present disclosure includes a cam and shaft assembly for use in a fluid regulator. The cam and shaft assembly is adjustable based on a size of the fluid regulator. The cam and shaft assembly includes a shaft and a cam coupled to the shaft, the cam having a cam surface adapted to be operatively connected to a control element of the fluid regulator. The cam is reconfigurable relative to the shaft to adjust an angle between the cam surface and a transverse axis of the shaft.

Another aspect of the present disclosure includes a cam and shaft assembly for use in a fluid regulator. The cam and shaft assembly is adjustable based on a size of the fluid regulator. The cam and shaft assembly includes a shaft and a cam coupled to the shaft, the cam having a cam surface adapted to be operatively connected to a control element of the fluid regulator. The shaft has a first hole corresponding to a first position of the cam surface relative to the shaft, and a second hole corresponding to a second position of the cam surface relative to the shaft. The cam and shaft assembly also includes a fastener removably disposable in the first hole or the second hole to couple the cam to the shaft such that the cam surface is in the first position or the second position, respectively.

Any of the above aspects of the disclosure may include any one or more of the following preferred forms.

In one preferred form, the latching pin has a first contact surface and the latch has a second contact surface configured to engage the first contact surface when the latch is in the first position, and wherein the second contact surface is oriented at an angle relative to an axis of the latching pin.

In another preferred form, a second lever operatively connects the lever and the latch, wherein the second lever is configured to pivot with the lever. The second lever can include a pin that engages an inclined surface of the latch when the latch is moved from the first position to the second position.

In another preferred form, a spring is configured to apply a compressive force on the latch, wherein the spring is adjustable to adjust the compressive force applied to the latch.

In another preferred form, movement of the latch from the first position to the second position permits the shaft to rotate in a first direction to a closed position, and when the shaft is in the closed position, rotation of the shaft in a second direction opposite the first direction causes the latch to move from the second position to the first position. Rotation of the shaft in the second direction can cause the latching pin to engage a first vertex of the lever, and engagement of the first vertex by the latching pin can cause a second vertex of the lever to rotate into engagement with the controller, thereby causing the latch to move to the first position In another preferred form, the cam is reconfigurable relative to the shaft to adjust an angle between the cam surface and a transverse axis of the shaft.

In another preferred form, the controller is removable from a first portion of the regulator body and coupleable to a second portion of the regulator body.

In another preferred form, a first flange is mounted to the regulator body and a second flange is mounted to the slam-shut mechanism, wherein the second flange is configured to matingly engage the first flange to couple the slam-shut mechanism to the regulator body.

In another preferred form, the slam-shut mechanism is slidable relative to the regulator body such that the slam-shut control element is removable from the regulator body without interference from the slam-shut mechanism.

In another preferred form, the fluid regulator includes a spring seat and a spring disposed between the slam-shut control element and the spring seat, the spring configured to bias the slam-shut control element away from the spring seat, wherein the cam surface engages the spring seat as the slam-shut control element moves from the fully open position to the closed position.

In another preferred form, the first latching pin has a first contact surface and the first latch has a second contact surface configured to engage the first contact surface when the first slam-shut mechanism is in the first position, and wherein the second contact surface is oriented at an angle relative to an axis of the first latching pin.

In another preferred form, the first slam-shut assembly further includes a third lever that operatively connects the first lever and the first latch, wherein the third lever is configured to pivot with the first lever. The third lever can include a pin that engages an inclined surface of the first latch when the first latch is moved from the first position to the second position.

In another preferred form, a spring is configured to apply a compressive force on the first latch or the second latch, wherein the spring is adjustable to adjust the compressive force applied to the first latch or the second latch.

In another preferred form, movement of the first latch from the first position to the second position permits the shaft to rotate in a first direction to a closed position, and when the shaft is in the closed position, rotation of the shaft in a second direction opposite the first direction causes the first latch to move from the second position to the first position and the second latch to move from the fourth position to the third position. Rotation of the shaft in the second direction can cause the first latching pin to engage a first vertex of the first lever, and engagement of the first vertex by the first latching pin can cause a second vertex of the first lever to rotate into engagement with the controller, thereby causing the first latch to move to the first position In another preferred form, a linkage connects the second slam-shut assembly to the first slam-shut assembly, wherein the linkage is coupled to both the first lever and the second lever.

In another preferred form, the cam is rotatable relative to the shaft to adjust the angle between the cam surface and the transverse axis of the shaft.

In another preferred form, the cam is coupled to an end of the shaft.

In another preferred form, the cam includes an aperture sized to receive an end of the shaft.

In another preferred form, a fastener is disposed in a hole formed in the shaft to couple the cam to the shaft.

In another preferred form, the cam is reconfigurable between a first position relative to the shaft and a second position relative to the shaft.

In another preferred form, the cam is further reconfigurable between a first position, a second position, and a third position relative to the shaft.

In another preferred form, first and second holes are formed in an end of the shaft, such that the cam is coupled to the end of the shaft.

In another preferred form, the cam includes first and second cutouts immediately adjacent the aperture, the first and second cutouts corresponding to the first and second positions, respectively.

In another preferred form, the fastener is removably disposable in the first hole and the first cutout to couple the cam to the shaft such that the cam surface is in the first position, and the fastener is removably disposable in the second hole and the second cutout to couple the cam to the shaft such that the cam surface is in the second position. When the cam surface is in the first position, the first hole can be aligned with the first cutout and the second hole can be at least partially out of alignment with the second cutout, and when the cam surface is in the second position, the second hole can be aligned with the second cutout and the first hole can be at least partially out of alignment with the first cutout.

In another preferred form, when the cam surface is in the first position, the cam surface is oriented at a first angle relative to a transverse axis of the shaft, and when the cam surface is in the second position, the cam surface is oriented at a second angle relative to the transverse axis of the shaft.

Additional optional aspects, arrangements, examples, and features are disclosed, which may be arranged in any functionally appropriate manner, either alone or in any functionally viable combination, consistent with the teachings of the disclosure. Other aspects and advantages will become apparent upon consideration of the following detailed description.

BRIEF DESCRIPTION OF THE DRAWINGS

FIG. 13A is similar to FIG. 12 but shows the components of the slam-shut mechanism of FIGS. 5-8 in the second position;

FIG. 13B is similar to FIG. 11B, but shows the components of the slam-shut mechanism of FIGS. 5-8 in the second position;

DETAILED DESCRIPTION

Figure 1:
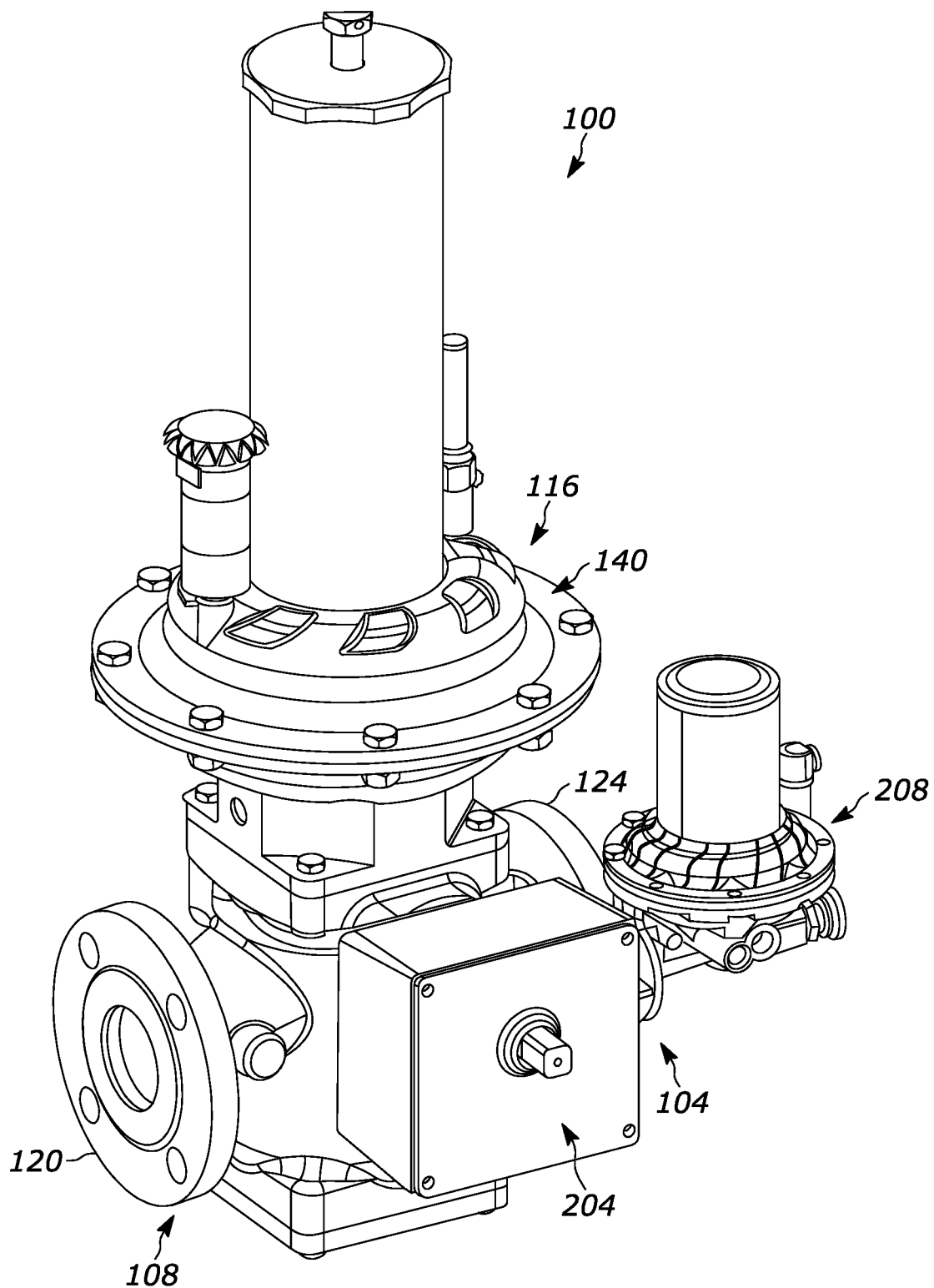
FIG. 1 is a perspective view of one example of a fluid regulator constructed in accordance with the teachings of the present disclosure, the fluid regulator including a slam-shut safety device.

The present disclosure is directed to slam-shut safety devices that are for use with a fluid regulator and aim to solve some of the problems associated with known slam-shut safety devices (e.g., the Emerson® OS/66 series slam-shut device described above). For example, the slam-shut safety devices described herein are accessible by a user, thereby facilitating normal line startup, maintenance, and/or troubleshooting. As another example, the slam-shut safety devices described herein can be moved in order to facilitate maintenance of other components of the fluid regulator without having to open or remove the slam-shut safety device.

FIGS. 1-15 illustrate one example of a fluid regulator 100 constructed in accordance with the teachings of the present disclosure. The fluid regulator 100 is configured to regulate the pressure of a supply fluid flowing therethrough to a substantially constant value, but also includes a slam-shut safety device 104 that is configured to provide a safety shutoff capability in the event of an overpressure condition (i.e., the pressure downstream of the fluid regulator 100 is greater than a maximum downstream pressure threshold) or an under pressure condition (i.e., the pressure downstream of the fluid regulator 100 is less than a minimum downstream pressure threshold). The fluid regulator 100 in this example generally includes the slam-shut safety device 104 as well as a regulator body 108, a control assembly 112, and an actuator assembly 116. In other examples, however, the fluid regulator 100 can include a different regulator body 108, a different control element 112, or a different actuator assembly 116.

Referring first to FIGS. 1-4, the regulator body 108 has a fluid inlet 120 and a fluid outlet 124 connected by a fluid passage forming a flow path 128. A seat 130 is disposed within the regulator body 108 and defines a flow orifice 132 that forms a portion of the flow path 128. The seat 130 may be removably or fixedly disposed in position within the regulator body 108. It will be appreciated that fluid flowing through the regulator body 108 flows from the fluid inlet 120 to the fluid outlet 124 via or through the flow path 128 (including the flow orifice 132). The control assembly 112 is arranged for displacement in the regulator body 108 for controlling the flow of fluid therethrough. The control assembly 112 includes a control element 136, which can, for example, take the form of a valve plug or a valve disk, and a valve stem 140 that is connected to the control element 136.

Figures 3A, 3B:
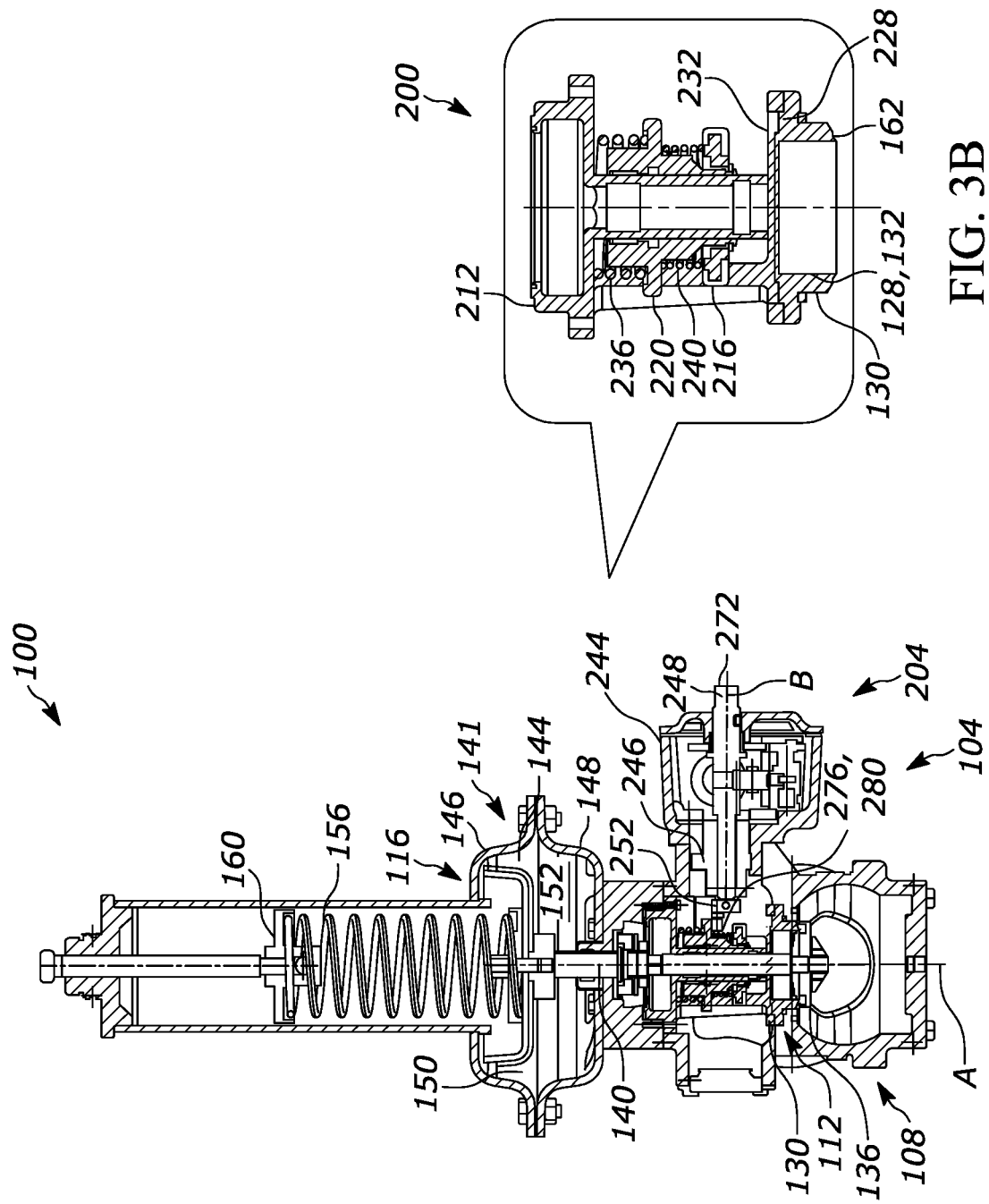
FIG. 3A is a cross-sectional view of the fluid regulator of FIG. 1, with a controller of the fluid regulator removed for clarity.
FIG. 3B is a close-up view of a portion of the fluid regulator of FIG. 3A, showing an internal part of the slam-shut assembly.

The actuator assembly 116 is a diaphragm-based actuator assembly that is operatively connected to the regulator body 108 to control the position of the control assembly 112 relative to the seat 130. As best illustrated in FIG. 3A, the actuator assembly 116 generally includes an actuator housing 141 and a diaphragm 144 disposed within the housing 141. The actuator housing 141 is coupled to the regulator body 108 via a plurality of fasteners and is formed of a first or spring case 146 and a second or diaphragm case 148 secured together, such as with one or more bolts connecting respective outer flanges of the first and second cases 146, 148. The diaphragm 144 separates the housing 141 into a first chamber 150 and a second chamber 152. The first chamber 150 is defined at least partly by one side of the diaphragm 144 and the spring case 146. The second chamber 152 is defined at least partly by the other side of the diaphragm 144 and the diaphragm case 148.

Referring still to FIG. 3A, the valve stem 140 has a first end operatively connected to the diaphragm 144 and a second end operatively connected to the control element 136. Movement of the diaphragm 144 in response to pressure changes at the fluid outlet 124 thus causes the valve stem 140 to shift the control element 136 in a manner so as to maintain the process fluid pressure within a pre-selected range at the fluid outlet 124. The actuator assembly 116 further includes a control spring 156 operatively connected to the diaphragm 144. The spring 156 is arranged to bias the diaphragm 144 against the fluid pressure with a selected force so as to maintain the pre-selected pressure range at the fluid outlet 124. The force exerted by the control spring 156 can be adjusted via an adjusting screw 160.

In turn, the diaphragm-based actuator assembly 116 serves to position the control element 136 relative to the flow path 128 to satisfy desired process control parameters (e.g., a desired set-point pressure). The spring 156 naturally biases the diaphragm 144 downward relative to the orientation of FIG. 3A, which translates into a movement of the control assembly 112 along a longitudinal axis A and toward an open position, i.e., away from the seat 130. In order to move the control assembly 112 from the open position to a closed position, in which the control element 136 sealingly engages a bottom surface of the seat 130 (and, more particularly, a valve seating surface 162), a pneumatic signal can be supplied to the second chamber 152 to increase the pressure in the second chamber 152. The pneumatic signal can, for example, be supplied in response to or based on a pressure at the fluid outlet 124, detected by a feedback pressure sensor, that is more than the desired set-point pressure. In any event, this increase in pressure is sensed by the diaphragm 144 and ultimately overcomes the force applied by the spring 156, thereby moving the diaphragm 144 in the upward direction (at least relative to the orientation of FIG. 3A) and moving the control element 136 and the valve stem 140 along the longitudinal axis A and toward the closed position. When the pneumatic signal supplied to the second chamber 152 is reduced and/or eliminated, the spring 156 can expand and urge the diaphragm 144 downward and, in turn, the control element 136 and the valve plug 140 back toward the open position.

Figure 2:
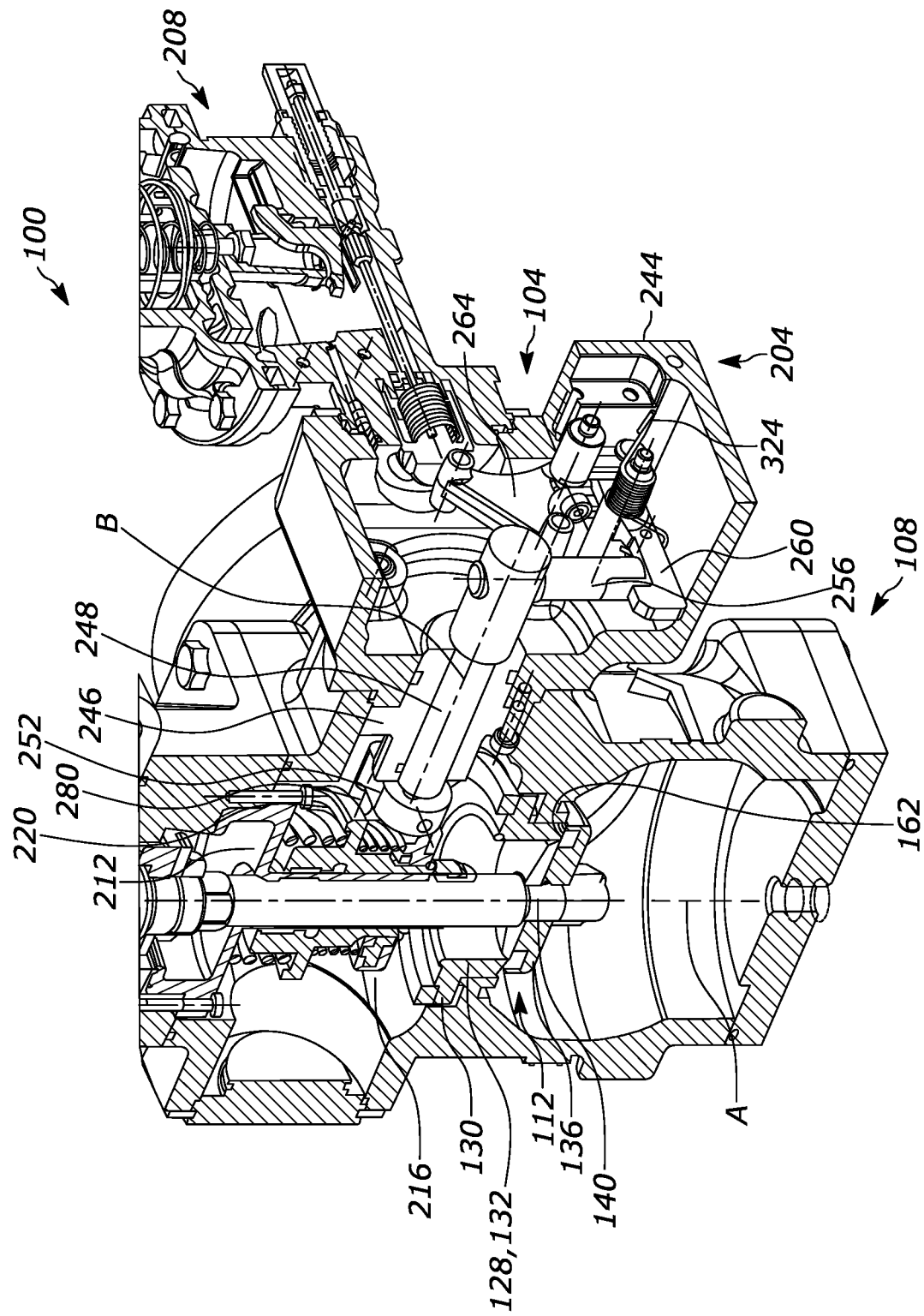
FIG. 2 is a cross-sectional view of a portion of the fluid regulator of FIG. 1.

As discussed above, the fluid regulator 100 includes the slam-shut safety device 104, which is configured to provide a safety shutoff capability in the event the pressure downstream of the fluid regulator 100 is greater than the maximum pressure threshold or less than the minimum pressure threshold. The slam-shut safety device 104 generally includes an internal slam-shut assembly 200 and a slam-shut mechanism 204 operatively connected to the internal slam-shut assembly 200, and a controller 208 that is operatively connected to the internal slam-shut assembly 200 via the slam-shut mechanism 204 in order to control the internal slam-shut assembly 200. As best illustrated in FIGS. 2, 3A, and 3B, the slam-shut safety device 104 is coupled to the regulator body 108 such that the internal slam-shut assembly 200 is disposed within the regulator body 108 (i.e., the slam-shut assembly 200 is internal to the regulator body 108). More particularly, the internal slam-shut assembly 200 is disposed around the valve stem 140 extending through the regulator body 108, though it will be appreciated that the internal slam-shut assembly 200 is operatively decoupled from the valve stem 140. As also illustrated in FIGS. 2, 3A, and 3B, the slam-shut mechanism 204 is partially disposed within the regulator body 108 and partially disposed outside of the regulator body 108, and the controller 208 is coupled to an exterior portion of the slam-shut mechanism 204.

In some examples, the slam-shut safety device 104 can be partially or entirely removable from the regulator body 108 (e.g., in order to facilitate maintenance of the slam-shut safety device 104 or the other components of the fluid regulator 100). In some examples, the slam-shut safety device 104 can be coupled to the regulator body 108 during manufacture of the fluid regulator 100. In other examples, however, the slam-shut safety device 104 can be field positionable and/or adjustable during installation or maintenance of the fluid regulator 100.

Figure 4:
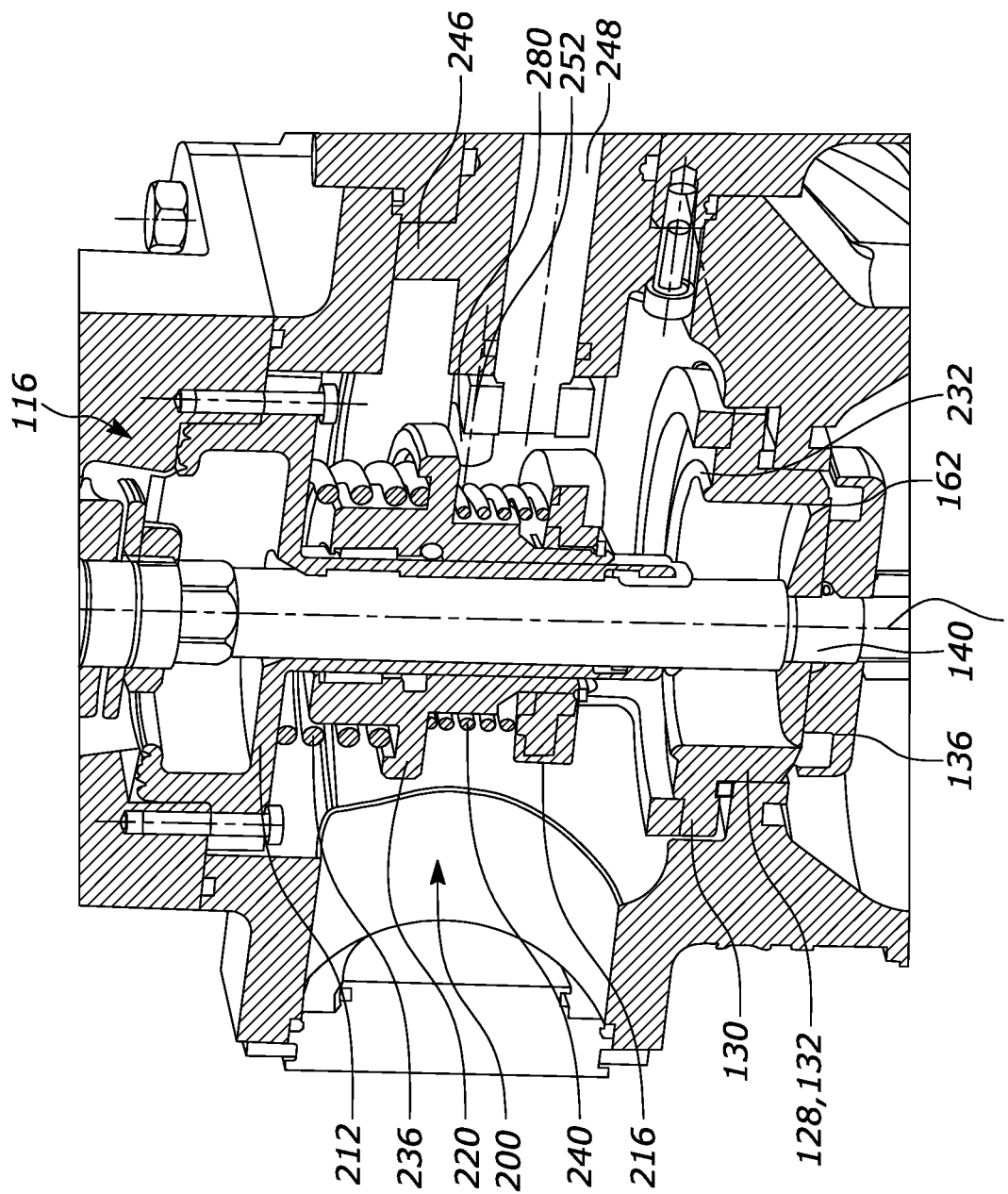
FIG. 4 is a close-up view of a portion of the fluid regulator of FIG. 1, showing the internal part of the slam-shut assembly in a fully-open position.

Referring to FIGS. 2-4, the internal slam-shut assembly 200 generally includes a slam-shut support 212, a slam-shut control element 216 (e.g., a slam-shut disk or plug), and a slam-shut spring seat 220. As best illustrated in FIGS. 2, 3A, and 3B, the slam-shut support 212 is coupled to both a portion of the fluid regulator 100 and the seat 130. In this example, the slam-shut support 212 has a first end that is coupled (e.g., bolted) to a portion of the actuator assembly 116. The slam-shut support 212 has a second end that is seated against a top surface 228 of the seat 130 so as to retain the seat 130 within the regulator body 108. The slam-shut support 212 also serves to guide the slam-shut spring seat 220 within the regulator body 108. The slam-shut control element 216 is secured to the slam-shut spring seat 220 in any known manner (e.g., via a retaining pin). The slam-shut spring seat 220 is coupled to the slam-shut control element 216 such that the slam-shut spring seat 220 generally moves in unison with the slam-shut control element 216 (and vice-versa). When the slam-shut safety device 104 is in operation, the slam-shut control element 216 and the slam-shut spring seat 220 are movable relative to the seat 130 to control fluid flow through the regulator body 108. More particularly, the slam-shut control element 216 and the slam-shut spring seat 220 are movable along the longitudinal axis A and within the regulator body 108 between a first, fully open position, shown in FIGS. 2, 3A, and 3B, and a second, closed position. In the first position, the slam-shut control element 216 is spaced from the seat 130 (and, more particularly, a slam-shut seating surface 232 formed on the top surface 228 opposite the valve seating surface 162), thereby opening the flow orifice 132 and allowing fluid flow between the fluid inlet 120 and the fluid outlet 124. Conversely, in the second position, the slam-shut control element 216 is positioned in sealing engagement with the seat 130 (and more particularly the slam-shut seating surface 232), thereby closing the flow orifice 132 and preventing fluid flow between the fluid inlet 120 and the fluid outlet 124.

In this example, the internal slam-shut assembly 200 also includes a pair of biasing elements—a first biasing element 236 and a second biasing element 240. The first biasing element 236, which in this example takes the form of a spring, is configured to apply a biasing force to the slam-shut spring seat 220 in order to urge the slam-shut spring seat 220 (and in turn the slam-shut control element 216) toward the seat 130 and toward the second position. To this end, the first biasing element 236 has one end that bears against a portion of the slam-shut support 212 and another end that bears against a top surface of the slam-shut spring seat 220. The second biasing element 240 in this example also takes the form of a spring, but the second biasing element 240 is configured to apply a biasing force to the slam-shut control element 216 in order to maintain a minimum distance between the slam-shut control element 216 and the slam-shut spring seat 220, the minimum distance being sufficient to accommodate a portion of the slam-shut mechanism 204, as will be discussed in greater detail below. To this end, the second biasing element 240 has one end that bears against a bottom surface (which can also be referred to as an underside) of the slam-shut spring seat 220 and another end that bears against a portion of the slam-shut control element 216. The second biasing element 240 also plays a role also in the resetting of the slam-shut mechanism 204, after it has tripped.

Referring now to FIGS. 2, 3A, and 5-8, the slam-shut mechanism 204 generally includes a housing 244, a stuffing box 246, a shaft 248, a cam 252, a latching pin 256, a latch 260, and a lever 264. The housing 244, which in this example takes the form of a mechanism box, is removably coupled to the regulator body 108 (though the housing 244 can be fixedly coupled to the regulator 108). As best illustrated in FIG. 3A, the stuffing box 246 is partially disposed in the regulator body 108 and partially disposed in the housing 244. The stuffing box 246 is in turn coupled to the housing 244 so as to couple the housing 244 to the regulator body 108 even though a substantial portion of the housing 244 is disposed outside of the regulator body 108. In this example, the stuffing box 246 is coupled to the housing 244 via one or more bolts extending through opposing flanged surfaces of the housing 244 and the stuffing box 246, respectively. In other examples, however, the stuffing box 246 can be coupled to the housing 244 in a different manner. As also illustrated in FIG. 3A, one or more sealing elements are arranged between the housing 244 and the stuffing box 246 in order to prevent fluid leakage therebetween.

The shaft 248 generally extends through both the housing 244 and through the stuffing box 246. As such, when the housing 244 is coupled to the regulator body 108 via the stuffing box 246, the shaft 248 extends along a transverse axis B that is perpendicular to the longitudinal axis A, such that the shaft 248 is perpendicular to the valve stem 140. Additionally, as best illustrated in FIG. 3A, a first portion of the shaft 248 is disposed in the regulator body 108, a second portion of the shaft 248 is disposed outside of the regulator body 108 but in the housing 244, and a third portion of the shaft 248, including an end 272 of the shaft 248, is disposed outside of both the regulator body 108 and the housing 244. Accordingly, the end 272 of the shaft 248 is accessible to an end user of the fluid regulator 100 when it is necessary to reset the slam-shut mechanism 204, as will be discussed in greater detail below.

The cam 252 is carried by the shaft 248 at or proximate an end 276 of the shaft 248 opposite the end 272 of the shaft 248. Thus, as best illustrated in FIGS. 2 and 3A, the cam 252 is carried by the shaft 248 at a position within the regulator body 108 and outside of the housing 244. Moreover, the cam 252 has a cam surface 280 that extends outwardly from the shaft 248 so that the cam surface 280 is positioned to be operatively connected to the slam-shut control element 216. More particularly, as best illustrated in FIGS. 2 and 3A, the cam surface 280 extends outwardly in a direction that is parallel to the transverse axis B. In turn, the cam surface 280 is positioned to selectively engage the bottom surface of the slam-shut spring seat 220. As discussed above, the slam-shut spring seat 220 moves in unison with the slam-shut control element 216, such that the cam surface 280 is positioned to be operatively connected to the slam-shut control element 216 via the slam-shut spring seat 220.

The latching pin 256 is also carried by the shaft 248, but at a position spaced from the cam 252, such that the latching pin 256 is disposed closer to the end 272 than the cam 252. More particularly, the latching pin 256 is carried by the shaft 248 at a positon along the second surface of the shaft 248, i.e., between the ends 272, 276 of the shaft 248. In turn, the latching pin 256 is positioned within the housing 244. The latching pin 256, which in this example has a substantially cylindrical shape, extends outward from the shaft 248 and has an indentation that defines a first contact surface 282 (see FIGS. 7 and 8).

Figure 6:
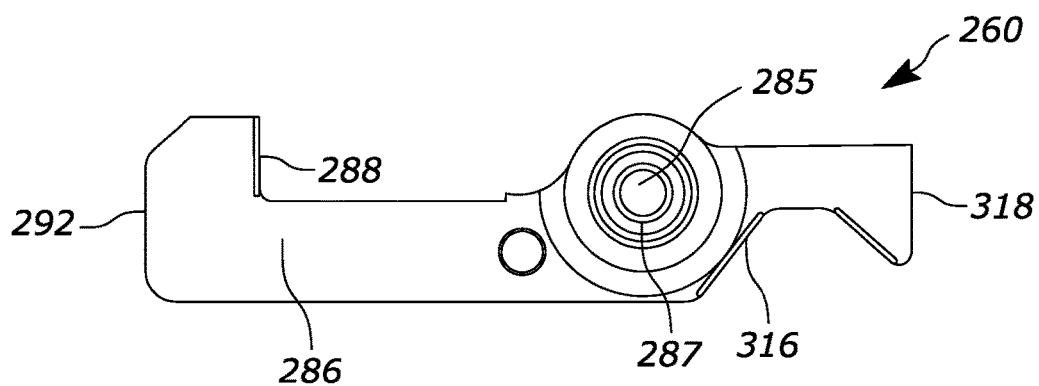
FIG. 6 is a plan view of a latch of the slam-shut mechanism of FIG. 5.
Figure 7:
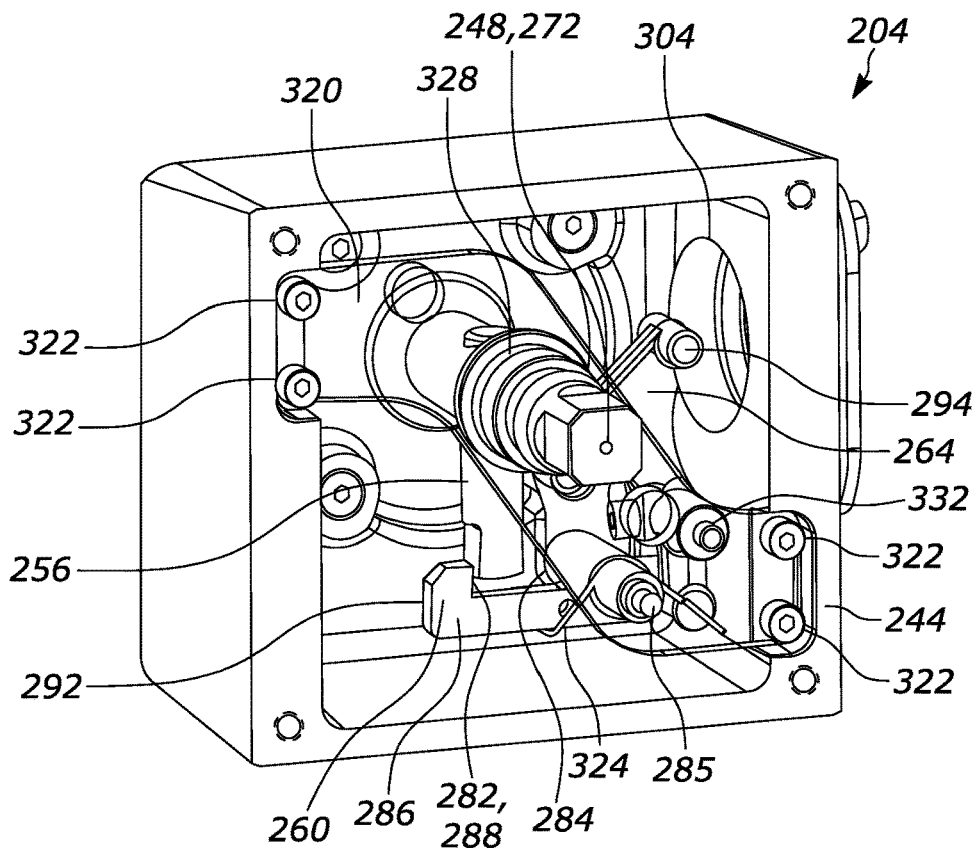
FIG. 7 is a perspective view of the slam-shut mechanism of FIG. 5.

The latch 260 is pivotably coupled to the housing 244 so that the latch 260 is configured to selectively engage the latching pin 256. As best illustrated in FIGS. 6 and 7, the latch 260 has a base 284 and an arm 286 that extends outward from the base 284. The base 284, which in this example has a substantially cylindrical shape, is disposed in the housing 244 and extends in a direction that is substantially parallel, if not entirely parallel, to the transverse axis B. In this example, the latch 260 is pivotably coupled to the housing 244 via a pin 285 that is inserted through an opening 287 formed in the base 284, though in other examples, the latch 260 can be pivotably coupled to the housing 244 in a different manner. The arm 286, which in this example has an L-shape, defines a second contact surface 288 that is located proximate a first end 292 of the latch 260 and is configured to selectively engage the first contact surface 282 of the latching pin 256 in order to selectively retain the latching pin 256 relative to the latch 260 in the position shown in FIGS. 5, 7, and 8.

Figure 5:
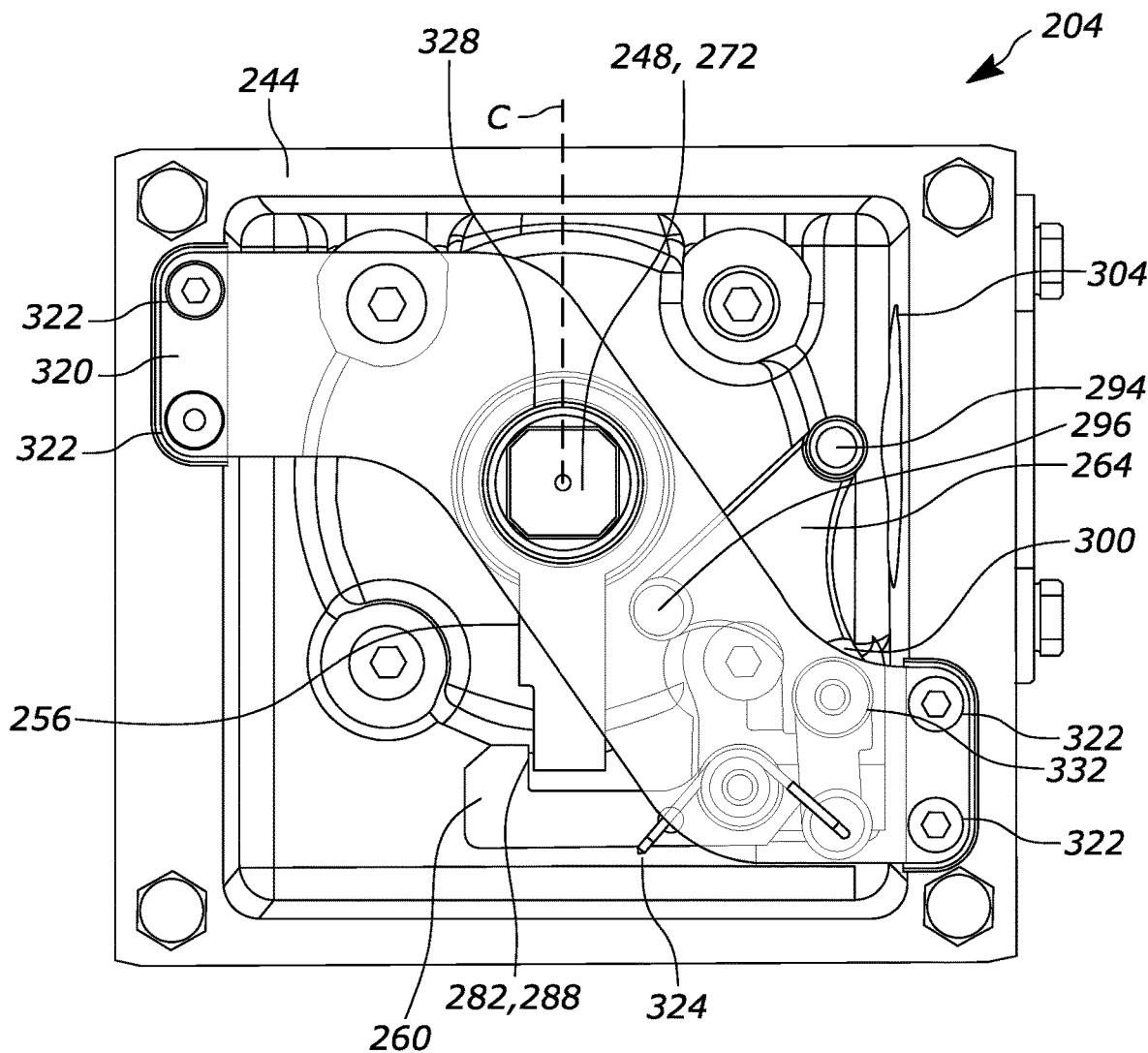
FIG. 5 is a plan view of an external slam-shut mechanism employed in the fluid regulator of FIGS. 1-4.
Figure 8:
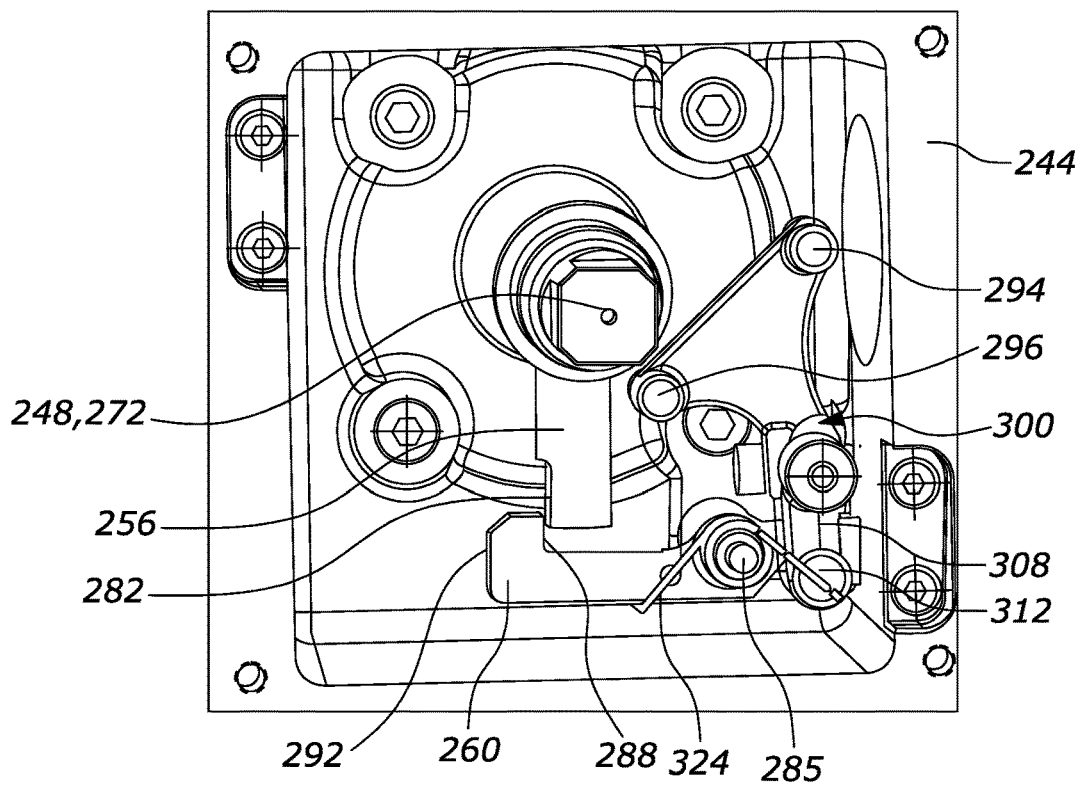
FIG. 8 is a close-up view of a portion of FIG. 7.

In the position shown in FIGS. 5, 7, and 8, both the first contact surface 282 and the second contact surface 288 are parallel to a slam-shut axis C (which is parallel to the longitudinal axis A and perpendicular to the transverse axis B). In turn, as best illustrated in FIG. 5, the second contact surface 288 is substantially flush against the first contact surface 282 when the latch 260 engages the latching pin 256. In other examples, however, the first and second contact surfaces 282, 288 may be oriented differently, as will be described in greater detail below.

Figure 65:
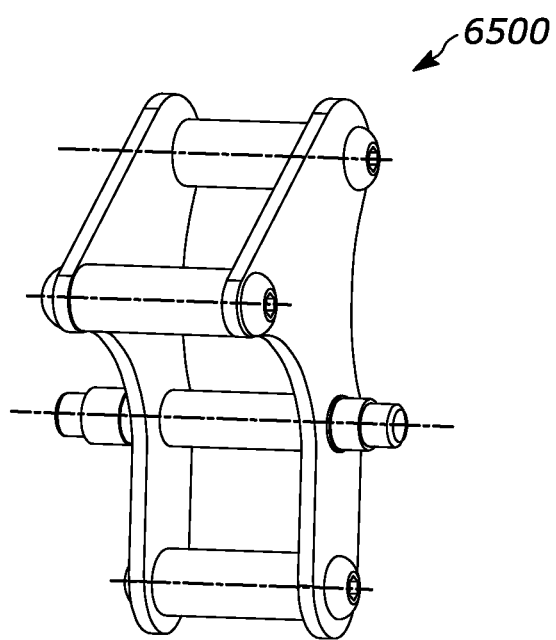
FIG. 65 is a perspective view of an example lever that is constructed in accordance with the teachings of the present disclosure and can be employed in any of the slam-shut mechanisms described herein.

Like the latch 260, the lever 264 is pivotably coupled to the housing 244. The lever 264 is also operably connected to the latch 260 and is configured to be selectively engaged by the controller 208. As best illustrated in FIGS. 5, 7, and 8, the lever 264 in this example has a generally triangular shape having three vertices or nodes—a first vertex 294, a second vertex 296, and a third vertex 300. The first vertex 294 is generally positioned adjacent an opening 304 formed in the housing 244. As such, the first vertex 294 is positioned to be selectively engaged by a portion of the controller 208, as will be discussed in greater detail below. Meanwhile, the second vertex 296 is generally configured to facilitate re-setting of the slam-shut mechanism 204, so is positioned to selectively engage a portion of the latching pin 256 when the first vertex 294 is engaged by the controller 208, as will also be discussed in greater detail below. Finally, the third vertex 300, while somewhat hidden from view, is generally configured to facilitate unlatching of the slam-shut mechanism 204, so is operably connected to the latch 260 via a second lever 308 that is also disposed in the housing 244 (best seen in FIG. 8). The second lever 308 can have a symmetric configuration or an asymmetric configuration. In any event, the second lever 308 operatively connects the lever 264 to the latch 260 (and vice-versa) by being in contact with both components. In this example, the second lever 308 is pivotably coupled to the latch 260 via a pin 312 that extends through the second lever 308 and engages an inclined surface 316 formed proximate a second end 318 of the latch 260 opposite the first end 316. In this example, the second lever 308 is fixedly coupled to the lever 264 by disposing the third vertex 300 around a portion of the second lever 308. In other examples, however, the second lever 308 can be integrally formed with the lever 264 such that the lever 264 and the second lever 308 form a monolithic component. FIG. 65 illustrates one such example of a monolithic lever 6500 that effectively combines the lever 264 with the second lever 308.

Referring now to FIGS. 2, 5, 7, and 8, the slam-shut mechanism 204 also optionally includes a plate 320 and a torsion spring 324. The plate 320 is generally configured to help support and retain the components of the slam-shut mechanism 204 in the proper position. To this end, the plate 320 is fixedly secured to the housing 244 (e.g., via a plurality of bolts 322), as illustrated in FIGS. 5-7. In this example, the plate 320 is substantially z-shaped and spans the width of the slam-shut mechanism 204. In this example, the plate 320 includes a first opening 328 sized to accommodate the end 272 of the shaft 248, and a second opening 332 sized to receive a portion of the second lever 308 so as to pivot the second lever 308 and the lever 264. In other examples, however, the plate 320 can be sized, shaped, and/or arranged differently. On the other hand, the torsion spring 324 is configured to bias the latch 260 (and, more particularly, the second contact surface 288) into engagement with the latching pin 256 (and, more particularly, the first contact surface 282). To this end, the torsion spring 324 has one end coupled to the latch 260 (particularly the arm 286) and another end affixed to the plate 320. In other examples, however, the torsion spring 324 can be coupled to different components of the slam-shut mechanism 204. For example, the torsion spring 324 can instead have one end coupled to the latch 260 and another end coupled to the lever 264 or the second lever 308.

Figure 9:
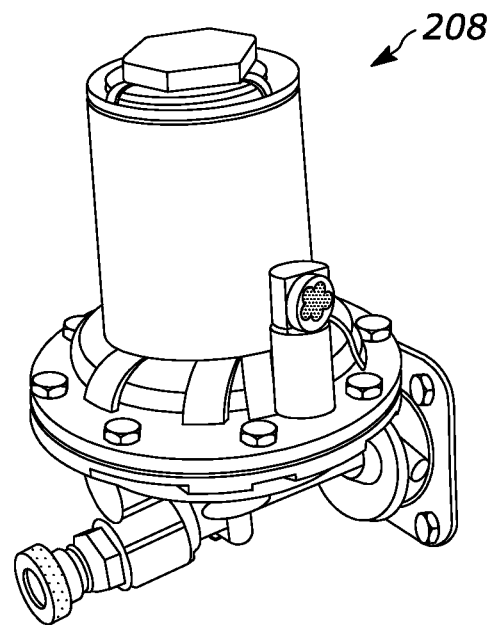
FIG. 9 is a perspective view of the controller of the fluid regulator of FIGS. 1-4.
Figure 10:
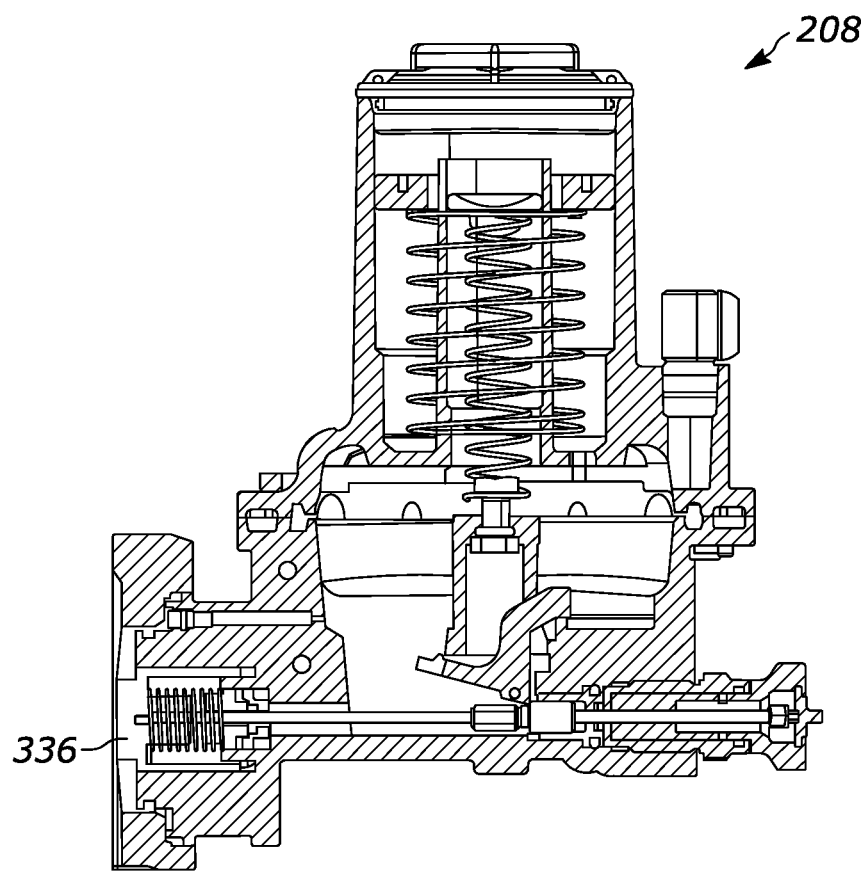
FIG. 10 is a cross-sectional view of the controller of FIG. 9.

Referring now to FIGS. 9 and 10, the controller 208 is a known controller manufactured by Fisher Controls International LLC. In this example, the controller 208 is a VSX8 controller. As such, further details of the controller 208 will be omitted for brevity. However, importantly for purposes of this application, it will be appreciated that the controller 208 is coupled to a portion of the housing 244 and has a plug 336. When the pressure downstream of the fluid regulator 100 is greater than the maximum pressure threshold or less than the minimum pressure threshold, the controller 208 is tripped, or activated, causing the plug 336 to selectively engage the lever 264 in order to cause the slam-shut mechanism 204 to interact with the internal slam-shut assembly 200 such that the slam-shut safety device 104 closes the fluid regulator 100.

Figure 11B:
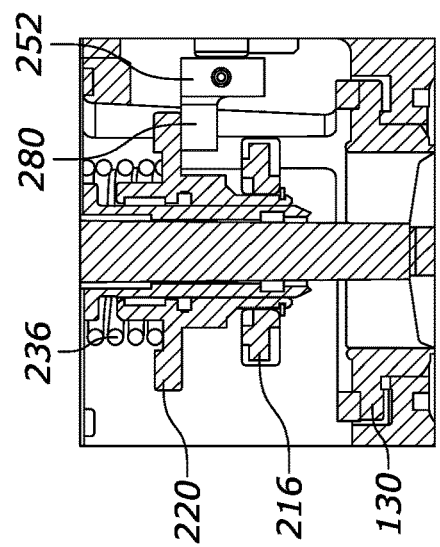
FIG. 11B illustrates some of the components of the slam-shut mechanism of FIG. 11A.
Figure 11A:
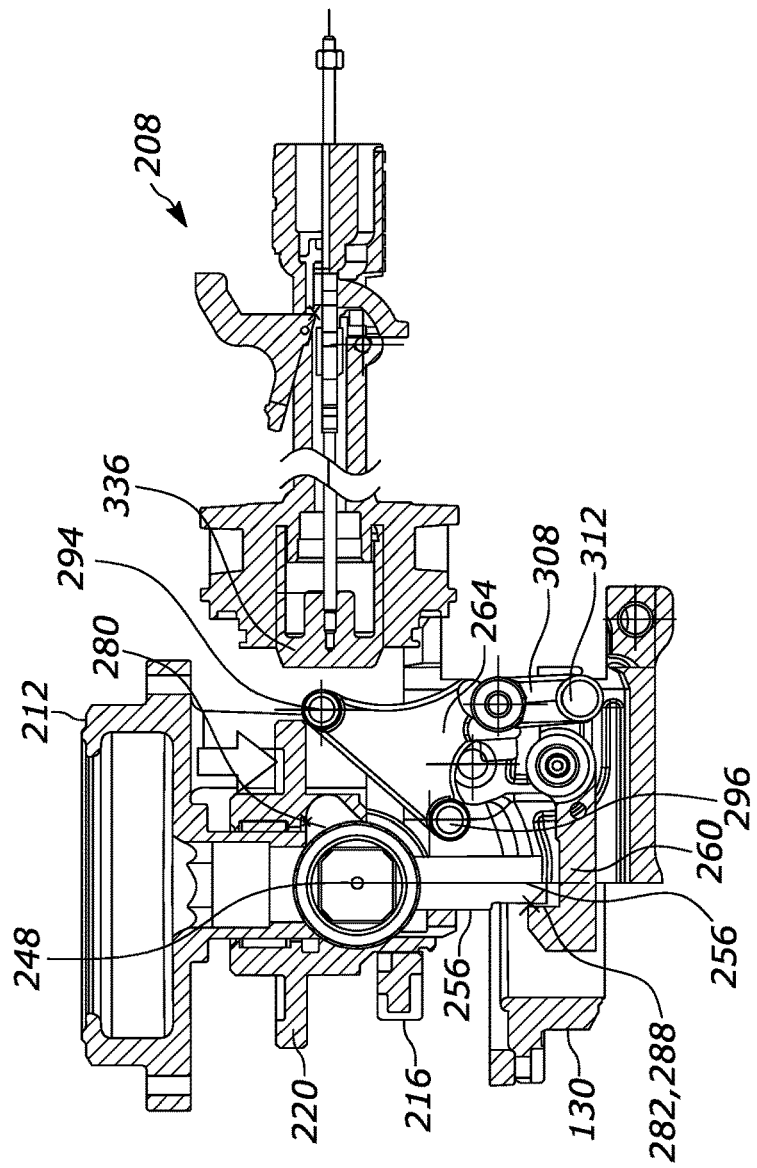
FIG. 11A illustrates the components of the slam-shut mechanism of FIGS. 5-8 when the controller of FIGS. 9 and 10 is in the un-tripped position.
Figure 12:
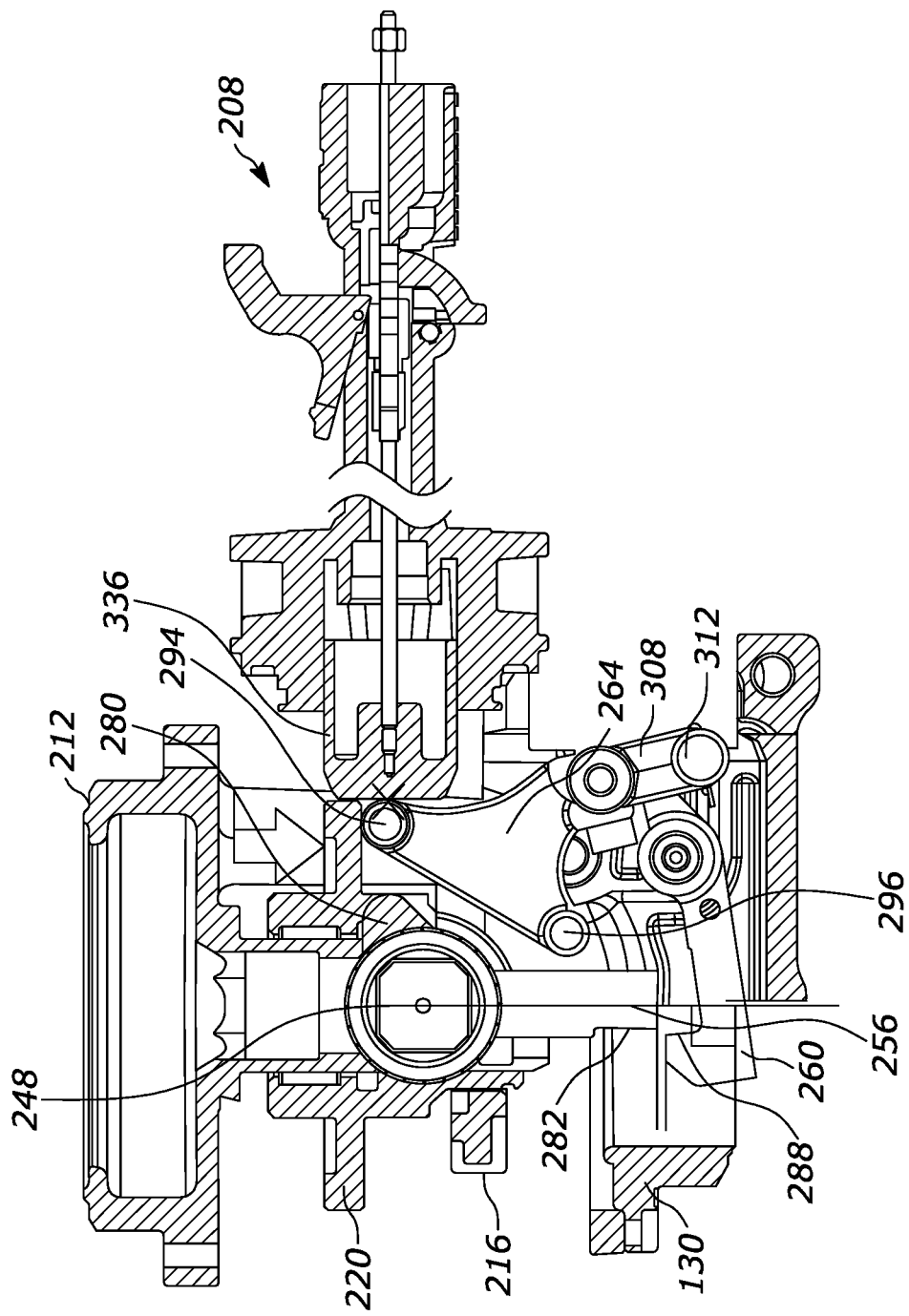
FIG. 12 is similar to FIG. 11A but shows the components of the slam-shut mechanism of FIGS. 5-8 moving from a first position to a second position responsive to the controller being in the tripped position.
Figure 14:
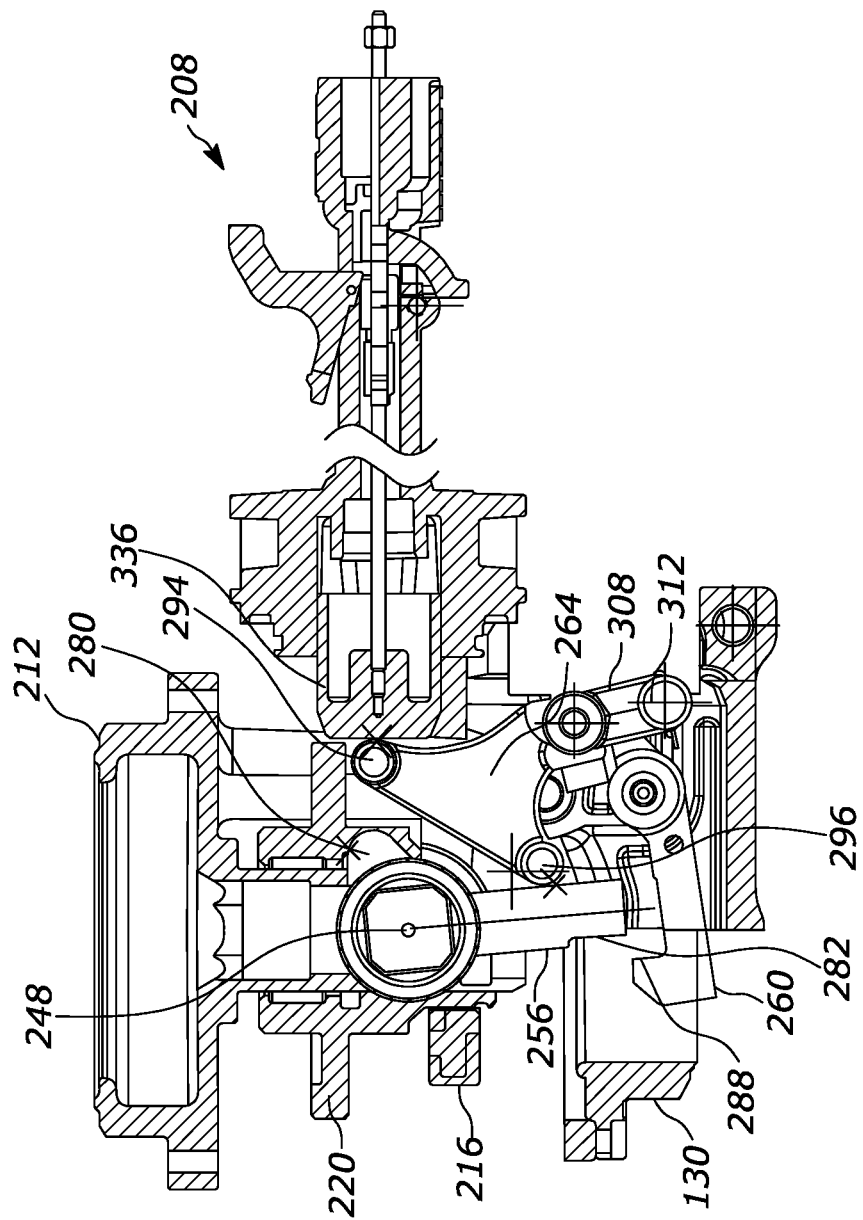
FIG. 14 is similar to FIG. 13A, but shows the components of the slam-shut mechanism of FIGS. 5-8 moving from the second position back to the first position.

When, for example, the pressure downstream of the fluid regulator 100 is greater than the minimum pressure threshold but less than the maximum pressure threshold, the slam-shut safety device 104 is in an un-tripped, or open, position (i.e., the slam-shut safety device 104 does not provide any safety shutoff), and the fluid regulator 100 is open and regulates the pressure of the supply fluid flowing therethrough as normally intended. When the slam-shut safety device 104 is in this un-tripped position, the components of the internal slam-shut assembly 200, the slam-shut mechanism 204, and the controller 208 are positioned as illustrated in FIGS. 11A and 11B. More particularly, the plug 336 of the controller 208 is spaced from the lever 264 (and, more particularly, the first vertex 294), as illustrated in FIG. 11A. In turn, as also illustrated in FIG. 11A, the latch 260 is in a first position, in which the latching pin 256 extends in a direction substantially perpendicular to the transverse axis B and the second contact surface 288 of the latch 260 engages the first contact surface 282 of the latching pin 256. Accordingly, the latch 260 securely (but releasably) retains the latching pin 256 in position against the latch 260. As a result of this positioning of the latching pin 256, the shaft 248 and the cam 252 are positioned so that the cam surface 280 engages the bottom surface of the slam-shut spring seat 220, as illustrated in FIG. 11B. In turn, the cam surface 280 retains the slam-shut control element 216 and the slam-shut spring seat 220 in the first, fully open position, which is also shown in FIG. 11B (and in FIGS. 3A and 4). As a result of the slam-shut safety device 104 being in this un-tripped position, the diaphragm-based actuator assembly 116 operates to position the control element 136 relative to the flow path 128 in order to satisfy the desired process control parameters. More particularly, the diaphragm-based actuator assembly 116 moves the control assembly 112 between the open position and the closed position as is necessary to satisfy the desired process control parameters.

However, when the pressure downstream of the fluid regulator 100 decreases below the minimum pressure threshold or increases above the maximum pressure threshold, the slam-shut safety device 104 is tripped, or activated, to shut off the fluid regulator 100. First, the controller 208 detects the pressure increase or decrease, and, in response to that detection, the controller 208 is tripped, or activated, causing the plug 336 to be moved outwards (leftward in the orientation shown in FIGS. 10 and 11A), towards the slam-shut mechanism 204. Movement of the plug 336 in this manner causes the plug 336 to pass through the opening 304 and engage the lever 264, and, more particularly, the first vertex 294 of the lever 264. This engagement causes the lever 264 to rotate in a counter-clockwise direction, which in turn causes the second lever 308 (which is fixed to the lever 264) to likewise rotate in the counter-clockwise direction. Rotation of the second lever 308 in this manner causes the latch 260 (which is pivotably coupled to the second lever 308) to rotate in the counter-clockwise direction from the first position shown in FIG. 11A to a second position, shown in FIG. 12. While not visible in FIG. 11A or FIG. 12, it will be appreciated that the pin 312 slidably engages the inclined surface 316 of the latch 260 as the latch 260 moves from the first position to the second position. Further, movement of the latch 260 from the first position to the second position disengages the latch 260 (and, more particularly, the second contact surface 288) from the latching pin 256 (and, more particularly, the first contact surface 282).

With the latch 260 free from the latching pin 256, the latch 260 no longer serves to securely retain the latching pin 256. In turn, the latching pin 256 rotates in a clockwise direction from the position shown in FIG. 12 to the position shown in FIG. 13A. This rotation of the latching pin 256 subsequently causes the shaft 248 and the cam 252, which is carried by the shaft 248, to rotate in a similar manner. While not visible in FIG. 13A, it will be appreciated that rotation of the cam 252 in this manner moves the cam surface 280 out of engagement and away from the bottom surface of the slam-shut spring seat 220. With nothing left to retain the slam-shut control element 216 or the slam-shut spring seat 220 in the fully open position (illustrated in FIG. 11B), the slam-shut control element 216 and the slam-shut spring seat 220 are allowed to move from the fully open position to the closed position illustrated in FIG. 13B (the cam surface 280 may, in some cases, re-engage the bottom surface of the slam-shut spring seat 220 when the slam-shut control element 216 and the slam-shut spring seat 220 reach the closed position). In this closed position, the slam-shut control element 216 is positioned in sealing engagement with the seat 130 (and more particularly the slam-shut seating surface 232), thereby closing the flow orifice 132 and preventing any fluid flow between the fluid inlet 120 and the fluid outlet 124. Accordingly, the slam-shut safety device 104 prevents any fluid flowing through the fluid inlet 120 from flowing downstream of the fluid regulator 100.

The slam-shut safety device 104 continues to provide this safety shutoff until the overpressure condition or the underpressure condition has been corrected and the shutoff is no longer needed, at which time the slam-shut safety device 104 can be opened, i.e., returned to its un-tripped position. Beneficially, the slam-shut safety device 104 can be reset, or returned to its un-tripped position, in a single step. More particularly, the slam-shut safety device 104 can be returned to its un-tripped position by rotating the shaft 248 in a counter-clockwise direction from the position shown in FIG. 13A to the position shown in FIG. 14. Rotation of the shaft 248 in this manner, which can be achieved by the end user of the fluid regulator 100 using a tool (e.g., a wrench) or in some other manner, causes (i) a portion of the latching pin 256 to engage the lever 264 (and, more particularly, the second vortex 296), and (ii) the cam surface 280 to re-engage the bottom surface of the slam-shut spring seat 220 and to move the slam-shut control element 216 and the slam-shut spring seat 220 from the closed position shown in FIG. 13B back to the fully open positon shown in FIG. 11B.

Figure 15:
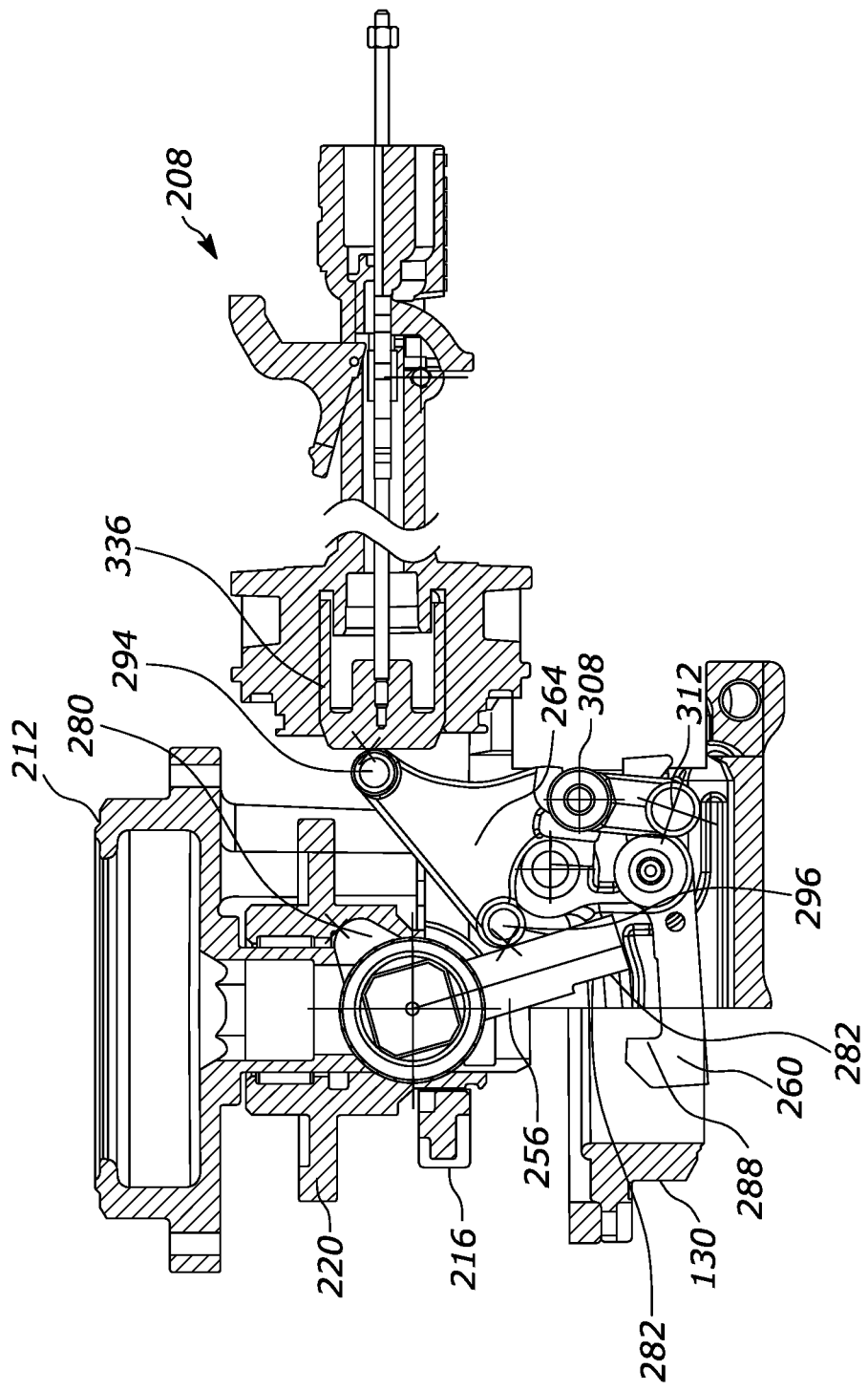
FIG. 15 is similar to FIG. 14, but shows the components of the slam-shut mechanism of FIGS. 5-8 at a different point in the process of moving from the second position back to the first position.

The engagement between the latching pin 256 and the lever 264 further causes the lever 264 to rotate in the clockwise direction from the position shown in FIG. 13A to the position shown in FIG. 15. Rotation of the lever 264 to the position shown in FIG. 15 causes the second lever 308 to rotate in the clockwise direction as well, which in turn allows spring 324 to rotate the latch 260 in the clockwise direction to the position shown in FIG. 15. Rotation of the lever 264 to the position shown in FIG. 15 also causes the lever 264 (and, more particularly, the first vertex 294 of the lever 264) to again engage the plug 336 of the controller 208, but this time the engagement causes the plug 336 to move inwards (rightward in the orientation shown in FIG. 14), away from the housing 244, as illustrated in FIG. 15, and eventually out of engagement with the lever 264.

When the shaft 248 is released (e.g., from the tool), the latching pin 256 will attempt to rotate in the clockwise direction from the position shown in FIG. 15 back to the position shown in FIG. 13A. However, the latch 260, by virtue of being operatively connected to the lever 264 and having been rotated to the position shown in FIG. 15, prevents the latching pin 256 from doing so. Instead, the latch 260 catches the latching pin 256 and re-engages the latching pin 256 via the first and second contact surfaces 282, 288, just as is illustrated in FIG. 11A, thereby again securely retaining the latching pin 256 in position against the latch 260. In turn, the cam surface 280, which engages the bottom surface of the slam-shut spring seat 220, again retains the slam-shut control element 216 and the slam-shut spring seat 220 in the fully open position.

Figure 16:
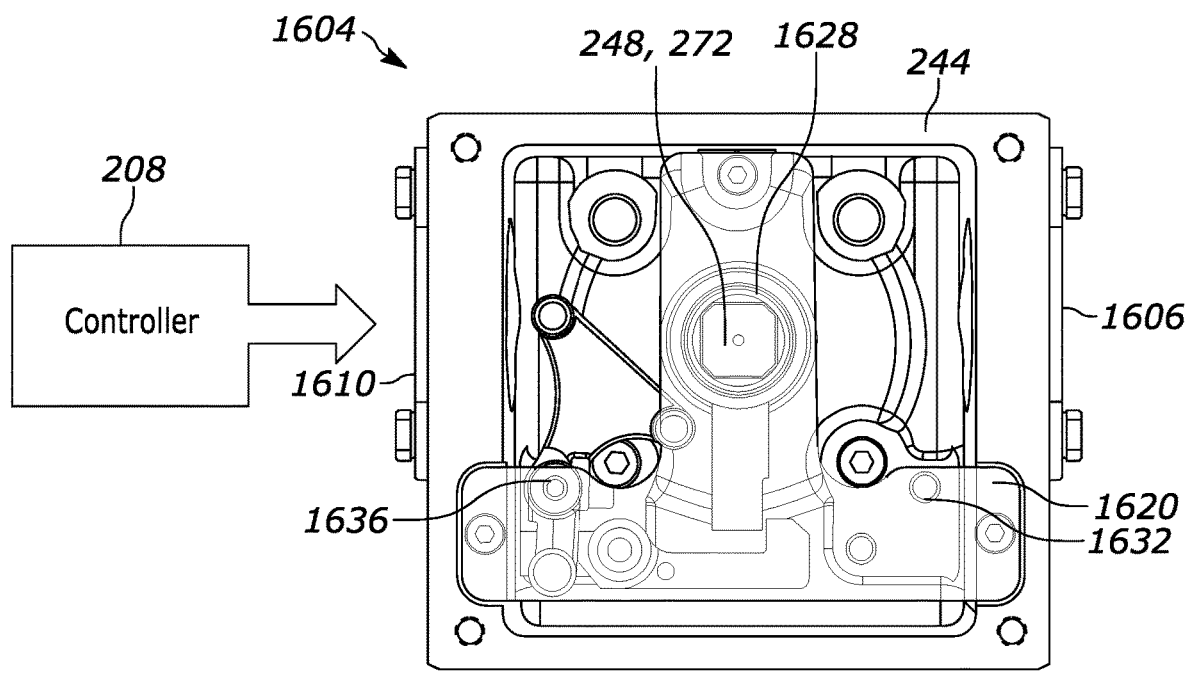
FIG. 16 is a plan view of another example of a slam-shut mechanism constructed in accordance with the teachings of the present disclosure.

Referring now to FIG. 16, it will be appreciated that some of the components of the slam-shut mechanism 204 within the housing 244 can be re-positioned to provide a slam-shut mechanism 1604 that is effectively a mirror-image of the slam-shut mechanism 204. Such a re-positioning allows the controller 208 to be located in a different position relative to the fluid regulator 100, e.g., when it is necessary to do so due to space constraints in the environment housing the fluid regulator 100. More particularly, by re-positioning some of the components of the slam-shut mechanism 204, the controller 208 can be decoupled from a first portion 1606 of the housing 244 and instead coupled to a second portion 1610 of the housing 244. In turn, the controller 208 will occupy a different position relative to the housing 244 (and, in turn, the regulator body 108).

Referring still to FIG. 16, it will be appreciated that the slam-shut mechanism 1604 includes a different plate than the plate 320 secured to the housing 244 in the slam-shut mechanism 204. Instead, the slam-shut mechanism 1604 includes a plate 1620 that is substantially t-shaped. While the plate 1620 is similarly fixedly secured to the housing 244 (e.g., via a plurality of bolts 1622), the plate 1620 includes three openings (instead of the two openings included in the plate 320)— first opening 1628 sized to accommodate the end 272 of the shaft 248, a second opening 1632 sized to receive a portion of the second lever 308 so as to pivot the second lever 308 and the lever 264 when the controller 208 is coupled to the first portion 1606 of the housing 244, and a third opening 1636 sized to receive a portion of the second lever 308 so as to pivot the second lever 308 and the lever 264 when the controller 208 is coupled to the second portion 1610 of the housing 244.

FIGS. 17-20 illustrate another example of a slam-shut mechanism 1704 that can be used instead of the slam-shut mechanism 204 and the slam-shut mechanism 1604. It will be appreciated that the slam-shut mechanism 1704 effectively combines the arrangement of some of the components of the slam-shut mechanism 204 with the arrangement of some of the components of the slam-shut mechanism 1604 to provide a pair of linked slam-shut assemblies 1708A, 17088 in a housing 244, either one of which can be pushed by the controller 208 to close the fluid regulator 100. Thus, the controller 208 can be coupled to a first portion 1712 of the housing 244 of the slam-shut mechanism 1704 or a second portion 1716 of the housing 244 of the slam-shut mechanism 1704, and the controller 208 can be easily and quickly coupled to either the first portion 1712 or the second portion 1716, and the controller 208 can be easily and quickly moved between the first portion 1712 and the second portion 1716 of the housing 244 as desired. It will be appreciated that when the controller 208 is coupled to the first portion 1712, the controller 208 will engage the slam-shut assembly 1708A in order to close the fluid regulator 100, whereas when the controller 208 is coupled to the second portion 1716, the controller 208 will engage the slam-shut assembly 17088 in order to close the fluid regulator 100. In either case, however, because the slam-shut assemblies 1708A, 17088 are linked together, both the slam-shut assemblies 1708A, 17088 will move in unison regardless of which slam-shut assembly 1708A, 17088 is engaged by the controller 208.

Figure 17:
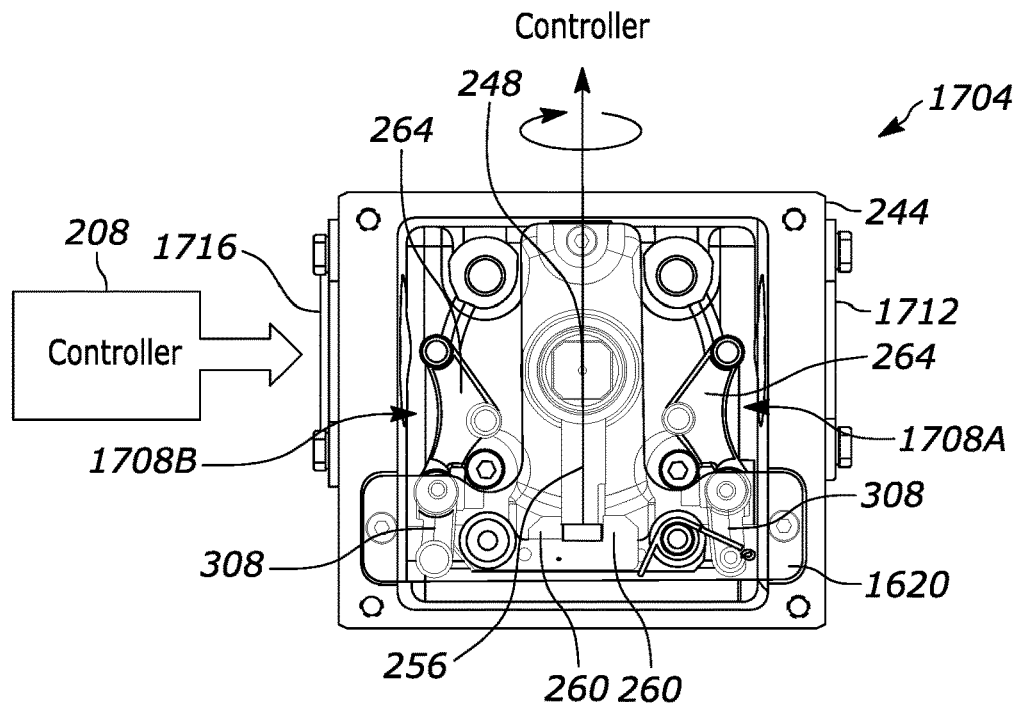
FIG. 17 is a plan view of another example of a slam-shut mechanism constructed in accordance with the teachings of the present disclosure.
Figure 18:
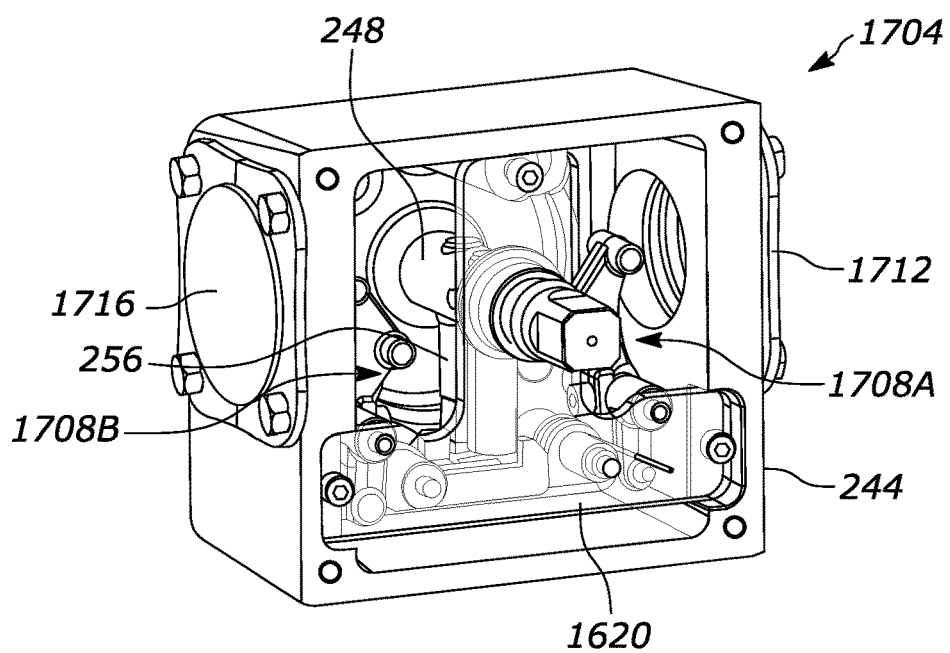
FIG. 18 is a perspective view of FIG. 17.
Figure 19:
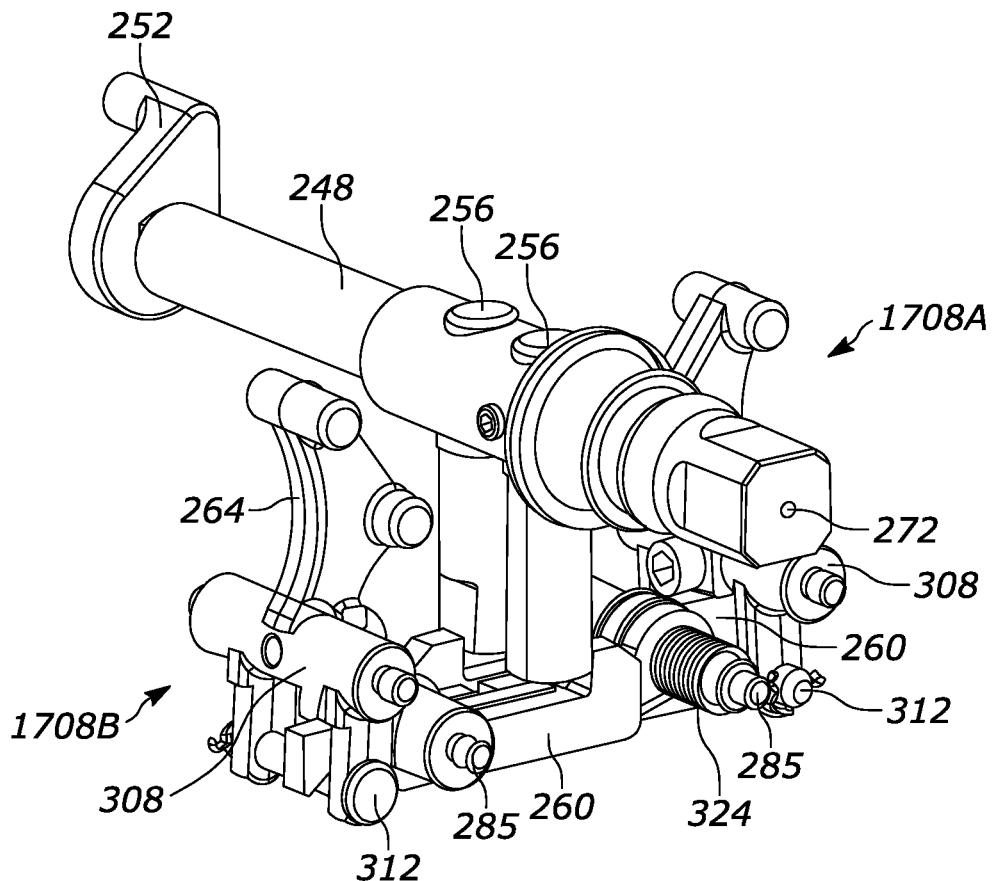
FIG. 19 is a perspective view of the components of the slam-shut mechanism of FIGS. 17-18 when removed from a housing of the slam-shut mechanism.
Figure 20:
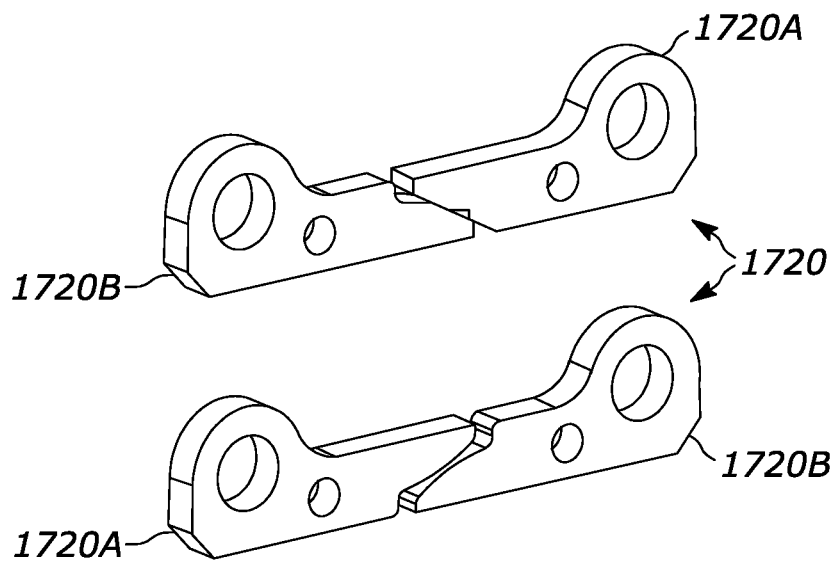
FIG. 20 illustrates a plurality of gear teeth that can be used to link components of the slam-shut mechanism of FIGS. 17-19.

As best illustrated in FIGS. 17-19, the slam-shut mechanism 1704 includes the shaft 248, the cam 252, and the plate 1620 discussed above, and each of the slam-shut assemblies 1708A, 17088 includes a latching pin 256, a latch 260, a lever 264, a pin 285, a second lever 308, and a pin 312. Thus, the slam-shut mechanism 1704 includes two latching pins 256, two latches 260, two levers 264, two pins 285, two second levers 308, and two pins 312. As best illustrated in FIGS. 19 and 20, the slam-shut mechanism 1704 also includes a plurality of gear teeth 1720 that help to link the slam-shut assembles 1708A, 17088 together. More particularly, the slam-shut mechanism 1704 includes two male gear teeth 1720A and two female gear teeth 17208 that selectively engage the two male gear teeth 1720A, respectively, when the controller 208 engages the slam-shut assembly 1708A or the slam-shut assembly 17088. The gear teeth 1720A, 17208 of the first slam-shut assembly 1708A are operatively coupled to both the latch 260 and the lever 264 of the first slam-shut assembly 1708A. Likewise, the gear teeth 1720A, 17208 of the second slam-shut assembly 17088 are operatively coupled to both the latch 260 and the lever 264 of the second slam-shut assembly 17088.

Figure 21A:
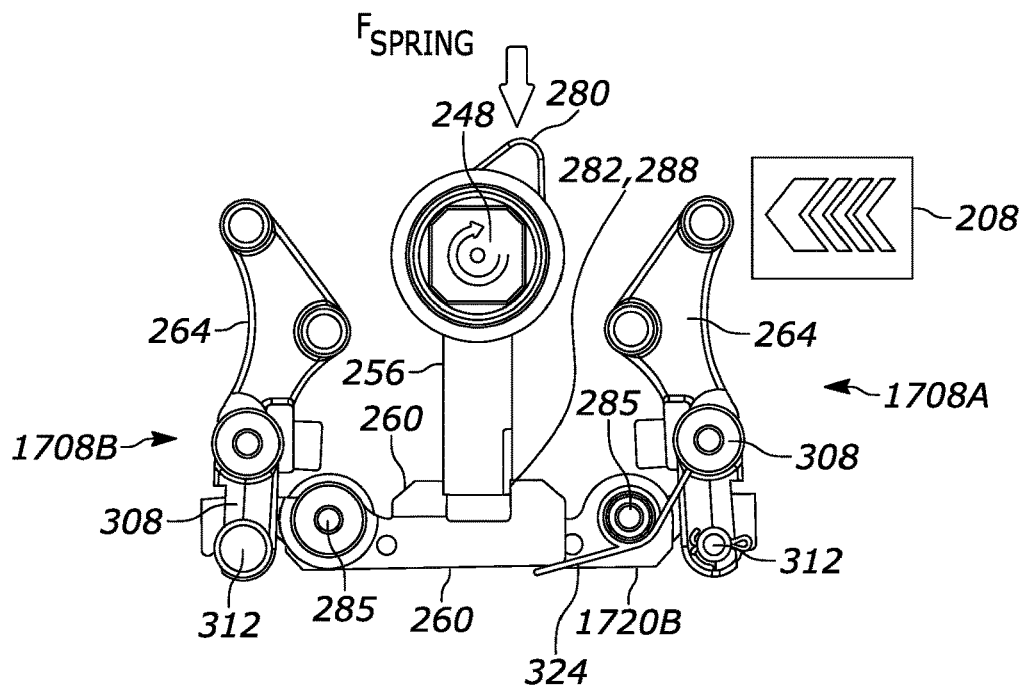
FIG. 21A illustrates the components of the slam-shut mechanism of FIGS. 17-20 as the controller pushes against a first slam-shut assembly of the slam-shut mechanism.
Figure 21B:
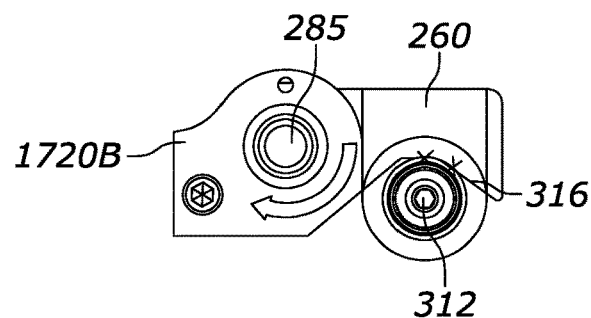
FIG. 21B is a close-up view of a portion of FIG. 21A.
Figure 21C:
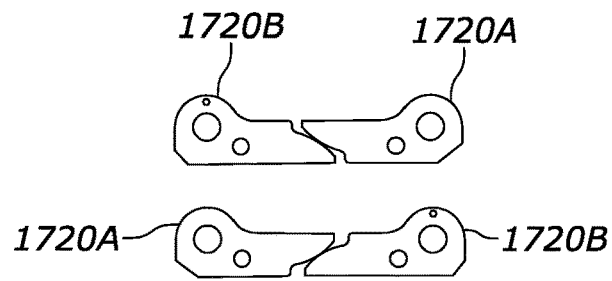
FIG. 21C is a close-up view of the plurality of gear teeth moving responsive to the controller pushing the first slam-shut assembly of the slam-shut mechanism in FIG. 21A.

Accordingly, in a similar manner as discussed above, when the first slam-shut assembly 1708A (and, more particularly the lever 264) is pushed by the controller 208, as illustrated in FIG. 21A, the lever 264 of the first slam-shut assembly 1708A will rotate (in the counter-clockwise direction), which will in turn rotate the second lever 308 and the pin 312 of the first slam-shut assembly 1708, and which will cause the latch 260 of the first slam-shut assembly 1708A to move from the first position to the second position. As discussed above, movement of the latch 260 of the first slam-shut assembly 1708A from the first position to the second position closes the fluid regulator 100. More particularly, movement of the latch 260 of the first slam-shut assembly 1708A from the first position to the second position disengages the latch 260 (and, more particularly, the second contact surface 288) from the latching pin 256 (and, more particularly, the first contact surface 282), which eventually moves the cam surface 280 out of engagement and away from the bottom surface of the slam-shut spring seat 220. The slam-shut control element 216 and the slam-shut spring seat 220 are subsequently allowed to move from the fully open position to the closed position.

At the same time, movement of the latch 260 causes the gear teeth 1720A, 1720B of the first slam-shut assembly 1708A (which are coupled to the latch 260 via the pin 285) to also rotate in the counter-clockwise direction. The rotation of the gear teeth 1720A, 1720B of the first slam-shut assembly 1708A in this direction causes the gear teeth 1720A, 1720B of the second slam-shut assembly 1708B to rotate in the clockwise direction. Rotation of the gear teeth 1720A, 1720B of the second slam-shut assembly 1708B in this direction causes the latch 260 of the second slam-shut assembly 1708B (which is coupled to the gear teeth 1720A, 1720B of the second slam-shut assembly 1708B via the pin 285) to move from the first position to the second position.

Figure 22A:
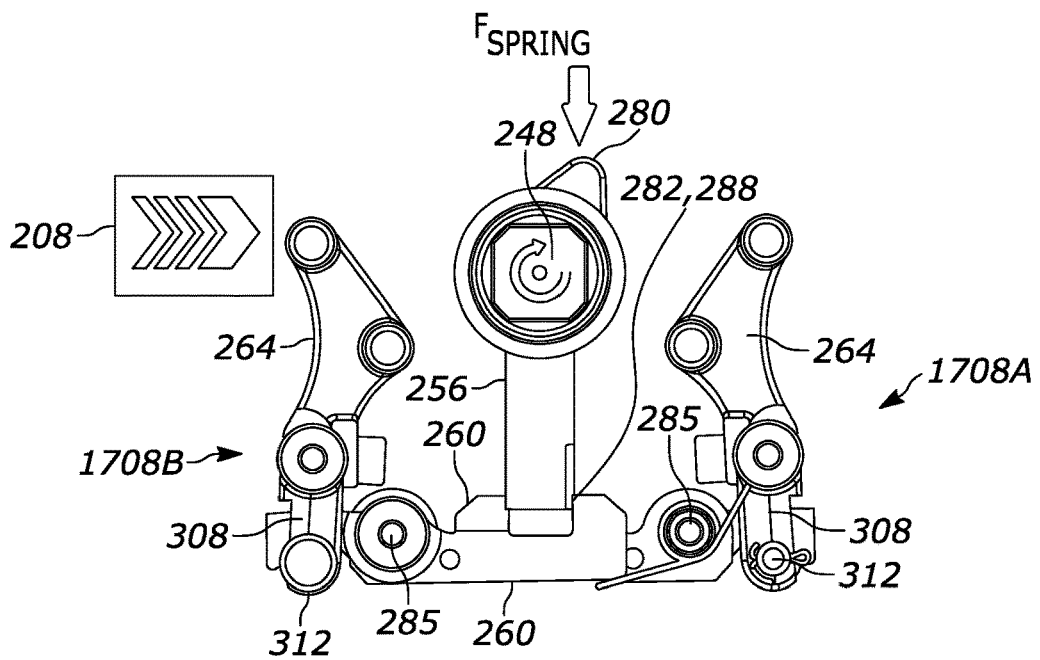
FIG. 22A illustrates the components of the slam-shut mechanism of FIGS. 17-20 as the controller pushes against a second slam-shut assembly of the slam-shut mechanism.
Figure 22B:
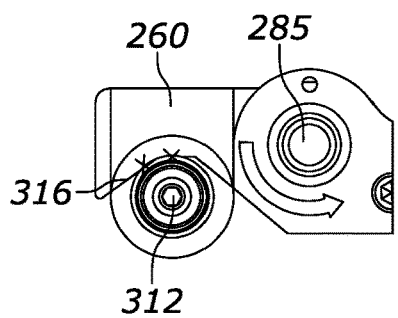
FIG. 22B is a close-up view of a portion of FIG. 22A.
Figure 22C:
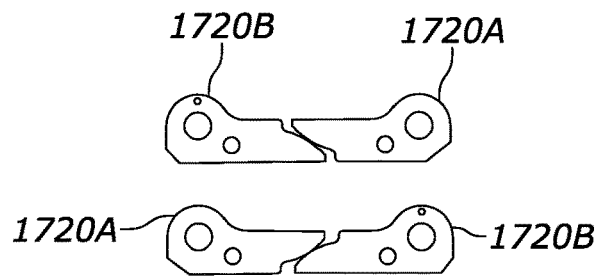
FIG. 22C is a close-up view of the plurality of gear teeth moving responsive to the controller pushing the second slam-shut assembly of the slam-shut mechanism in FIG. 22A.
Figure 23A:
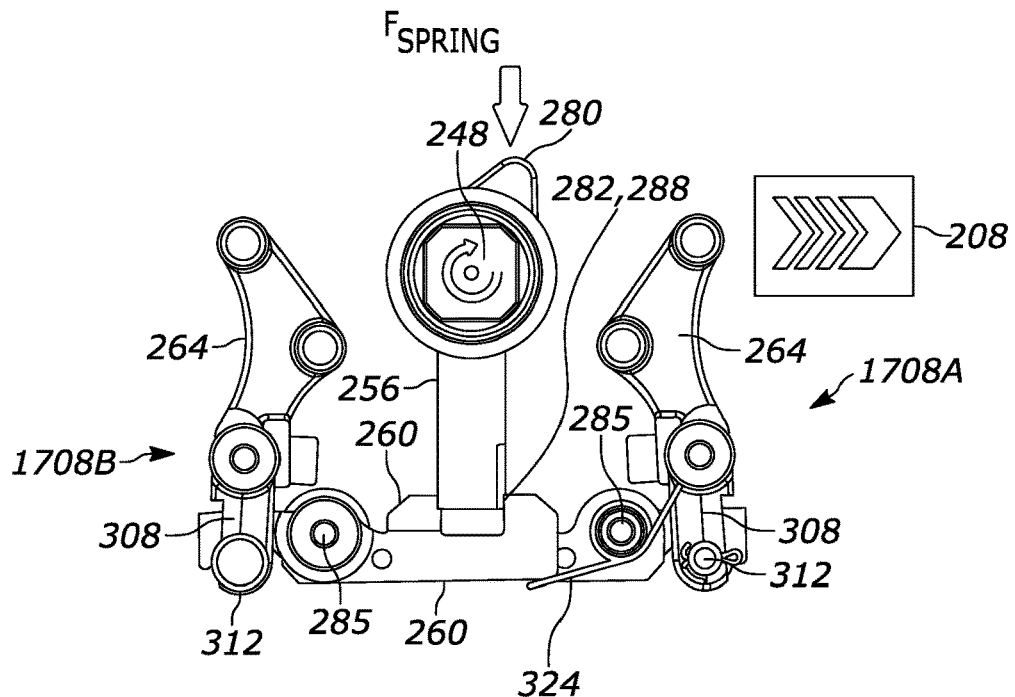
FIG. 23A illustrates the components of the slam-shut mechanism of FIGS. 17-20 as the controller pulls the first slam-shut assembly of the slam-shut mechanism.
Figure 23B:
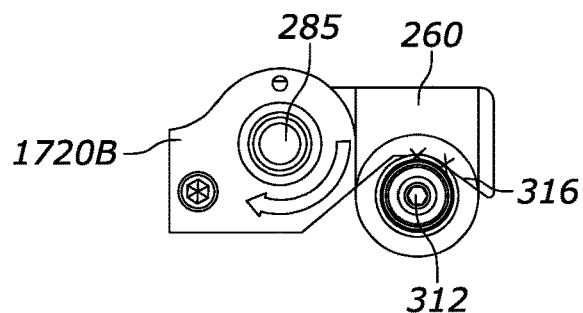
FIG. 23B is a close-up view of a portion of FIG. 23A.
Figure 23C:
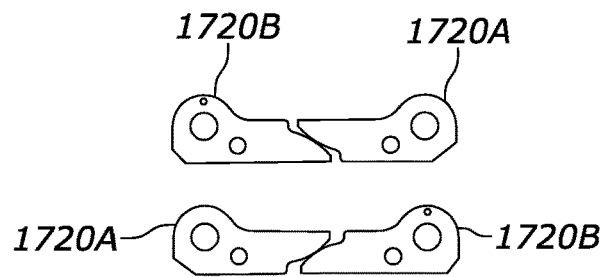
FIG. 23C is a close-up view of the plurality of gear teeth moving responsive to the controller pulling the first slam-shut assembly of the slam-shut mechanism in FIG. 23A.
Figure 24A:
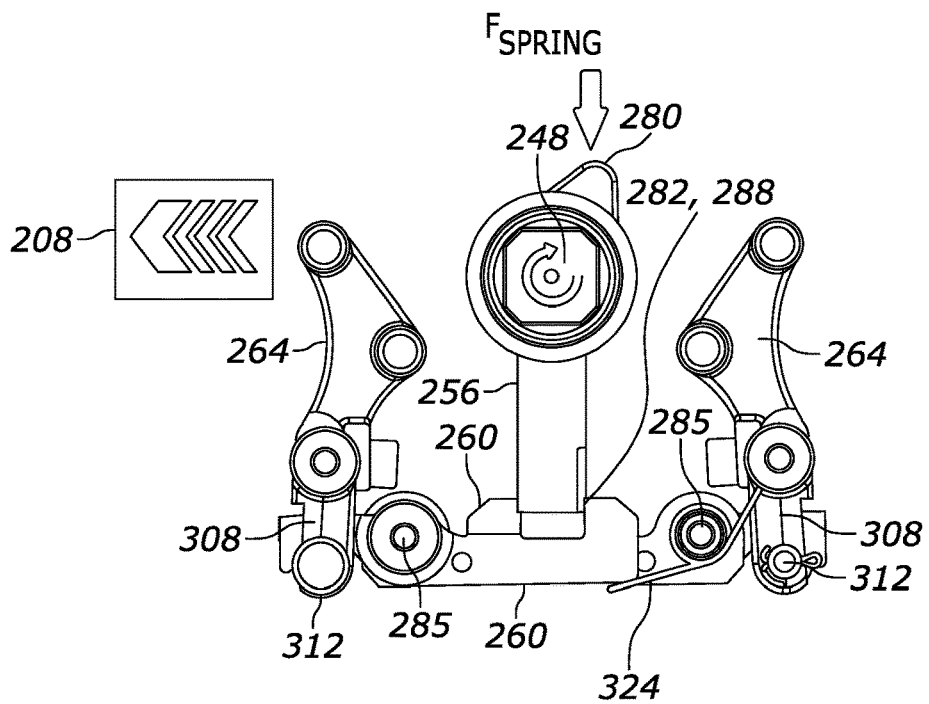
FIG. 24A illustrates the components of the slam-shut mechanism of FIGS. 17-20 as the controller pulls the second slam-shut assembly of the slam-shut mechanism.
Figure 24B:
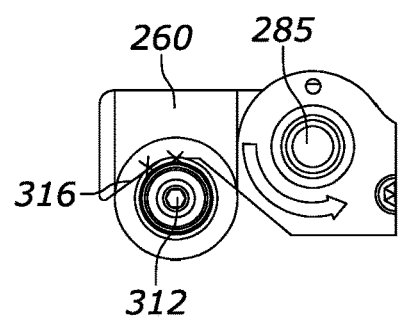
FIG. 24B is a close-up view of a portion of FIG. 24A.
Figure 24C:
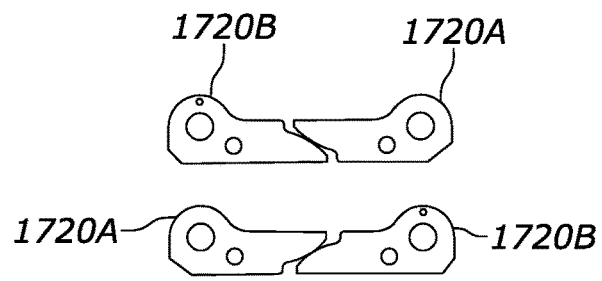
FIG. 24C is a close-up view of the plurality of gear teeth moving responsive to the controller pulling the second slam-shut assembly of the slam-shut mechanism in FIG. 24A.

Beneficially, the slam-shut mechanism 1704 functions in an identical manner when the controller 208 is coupled to the second portion 1716, is tripped, and pushes the second slam-shut assembly 1708B instead of the first slam-shut assembly 1708A, as illustrated in FIGS. 22A-22C. Additionally, it will be appreciated that the slam-shut mechanism 1704 functions in an identical manner when the controller 208 is tripped and pulls the first slam-shut assembly 1708A (when coupled to the first portion 1712), as illustrated in FIGS. 23A-23C, or pulls the second slam-shut assembly 1708B (when coupled to the second portion 1716), as illustrated in FIGS. 24A-24C. In other words, the slam-shut mechanism 1704 is operable regardless of whether the controller 208 is a pull controller (and pulls from the left or from the right) or is a push controller (and pushes from the left or from the right).

Figure 25A:
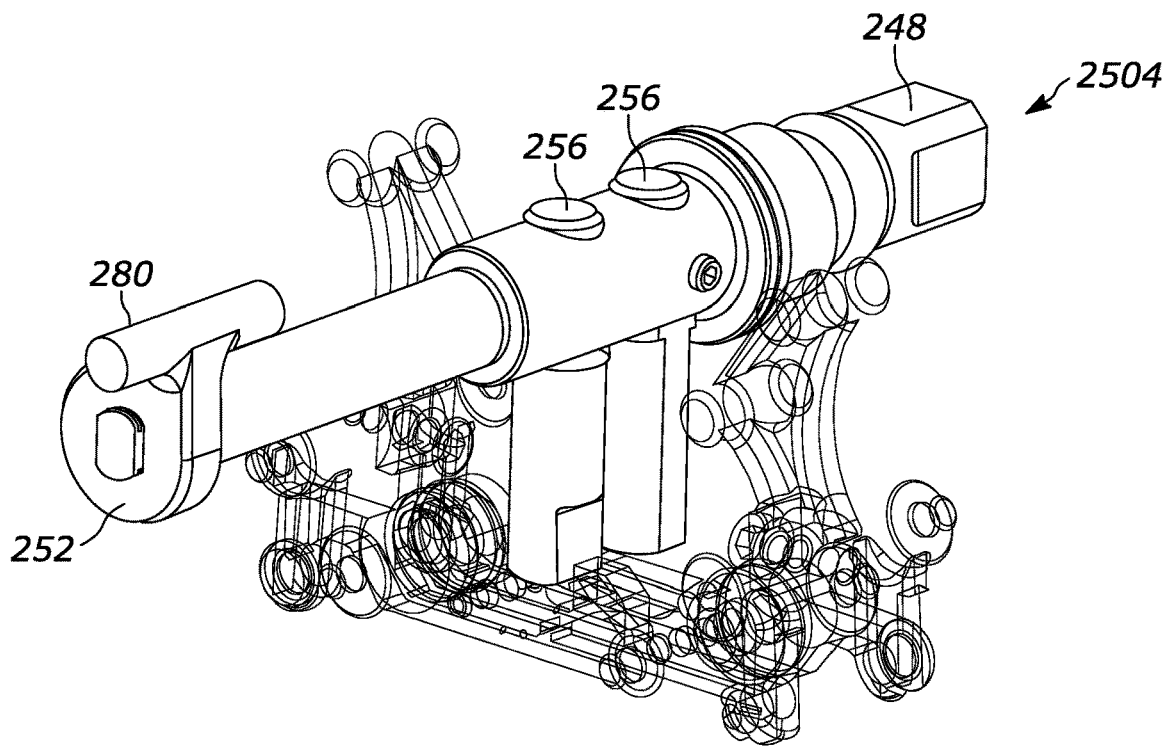
FIG. 25A is a perspective view of a portion of another example of a slam-shut mechanism constructed in accordance with the teachings of the present disclosure.
Figure 25B:
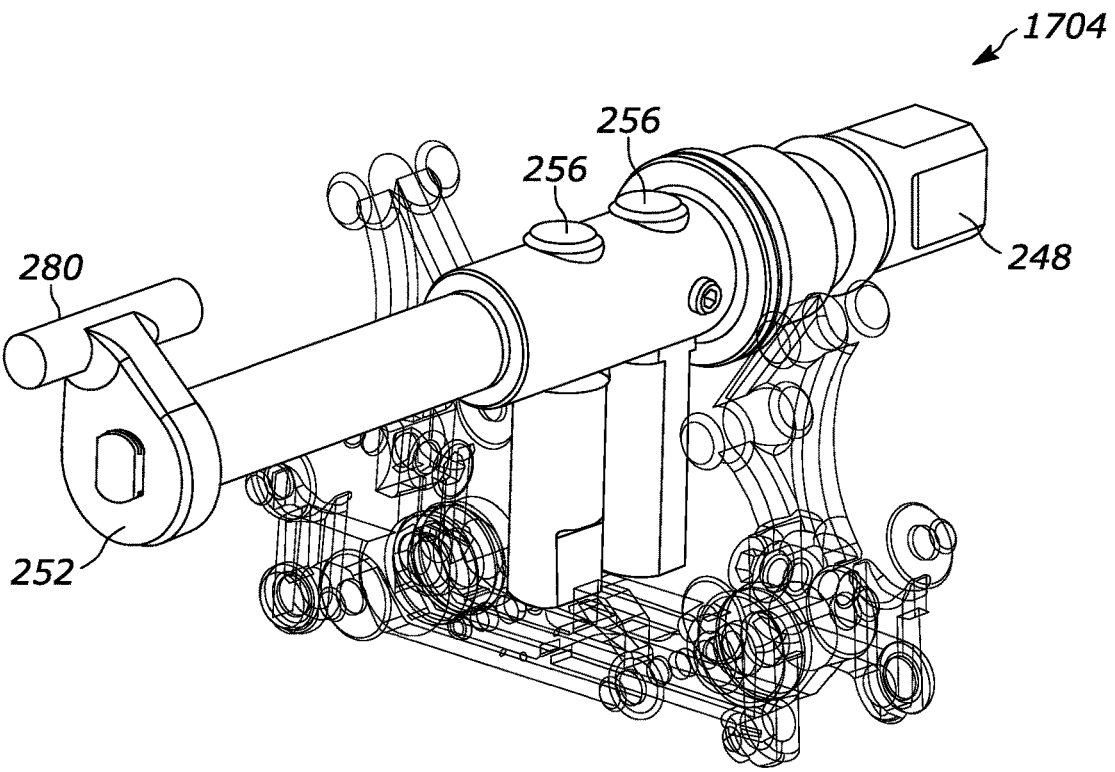
FIG. 25B is similar to FIG. 25A, but shows a portion of the slam-shut mechanism of FIGS. 17-20.
Figure 26:
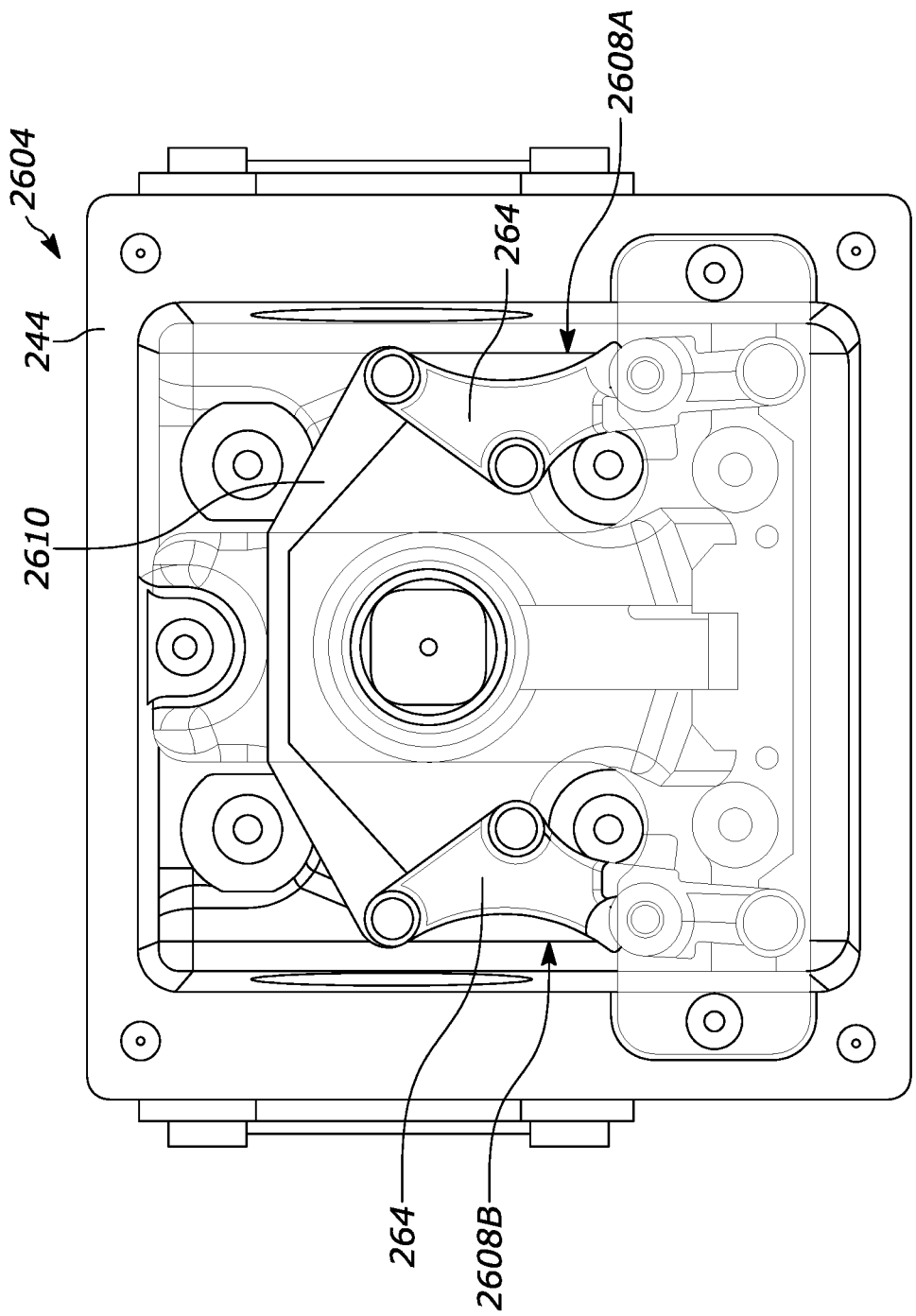
FIG. 26 is a plan view of another example of a slam-shut mechanism constructed in accordance with the teachings of the present disclosure.
Figure 27:
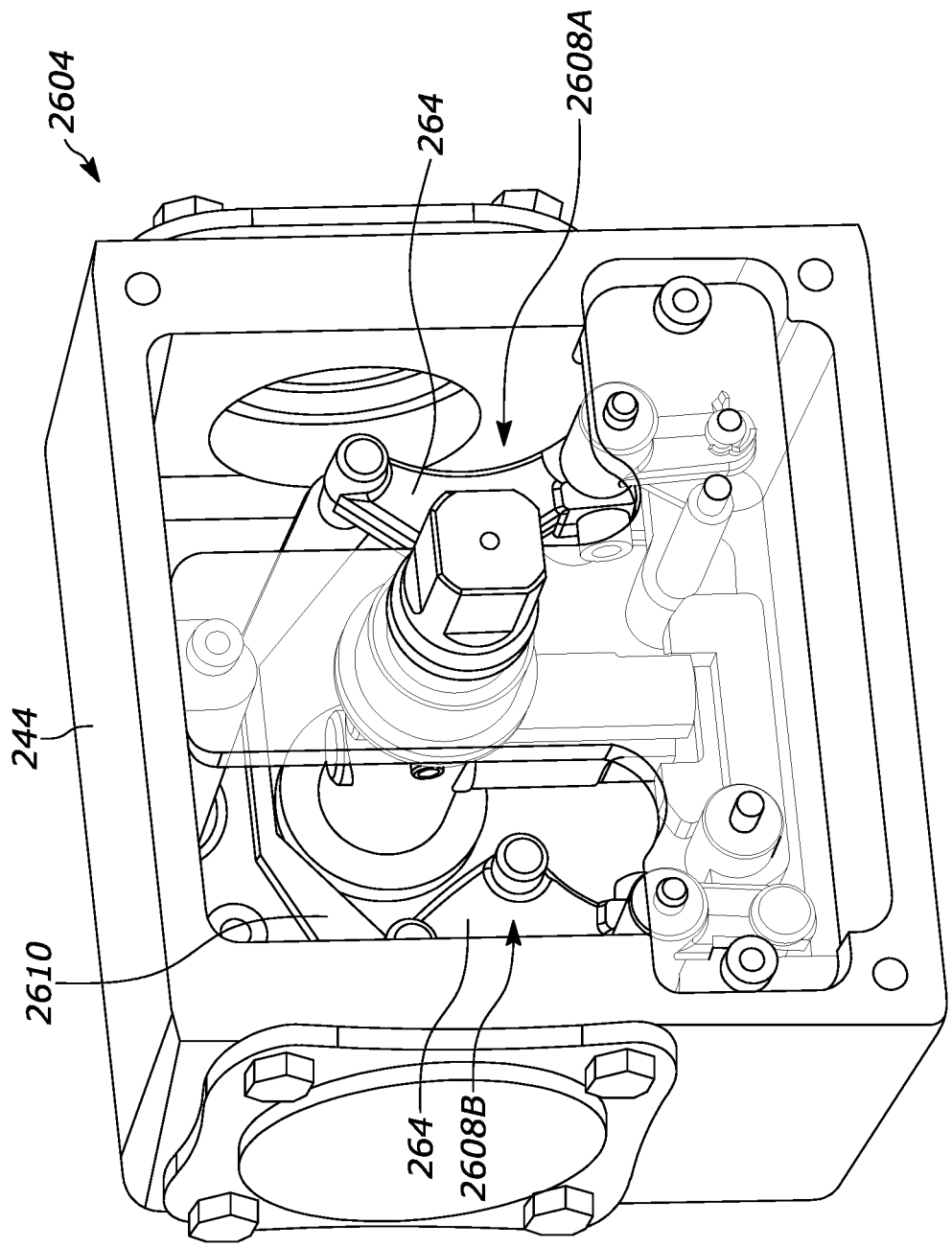
FIG. 27 is a perspective view of FIG. 26.
Figure 28A:
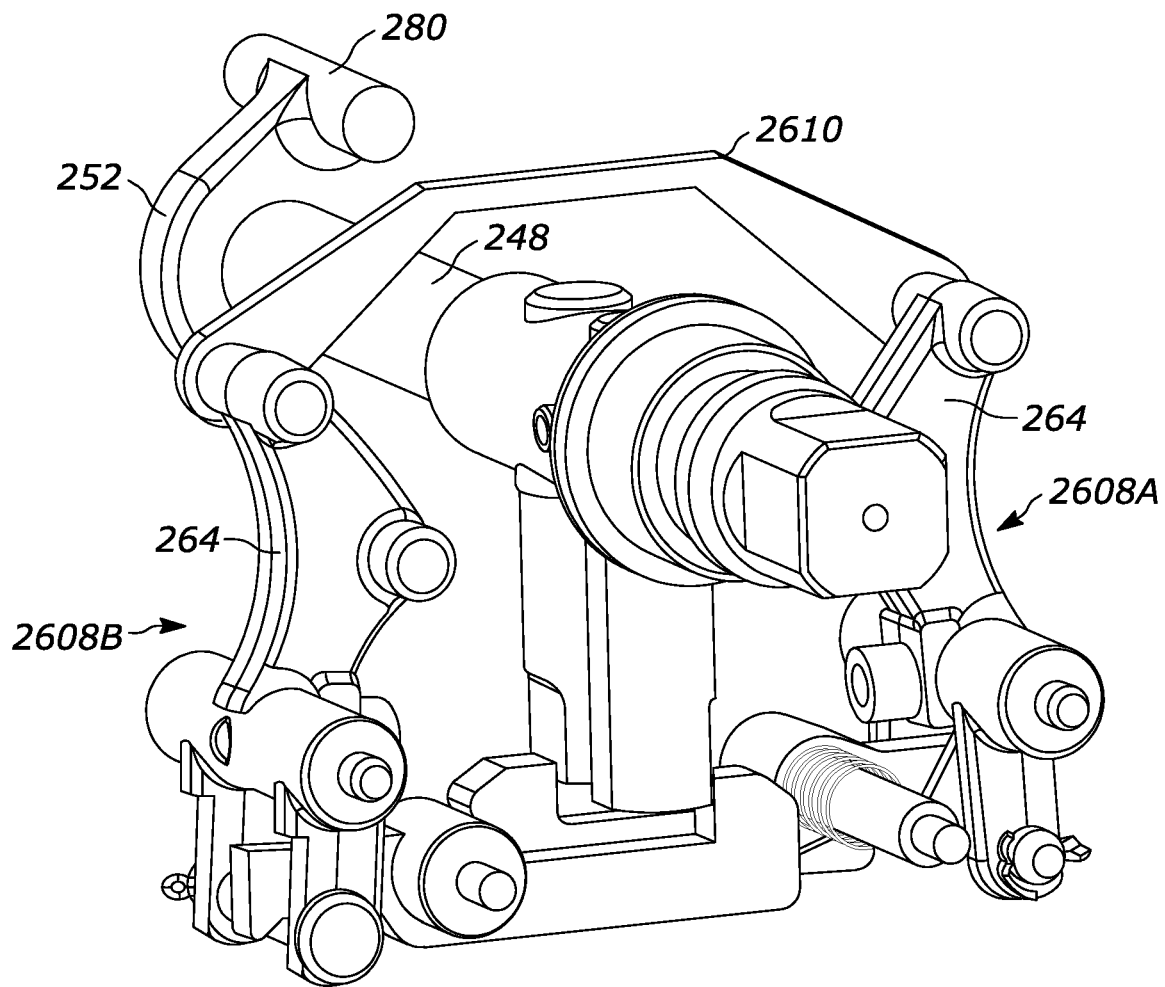
FIG. 28A is a perspective view of the components of the slam-shut mechanism of FIGS. 26 and 27, when removed from a housing of the slam-shut mechanism.
Figure 28B:
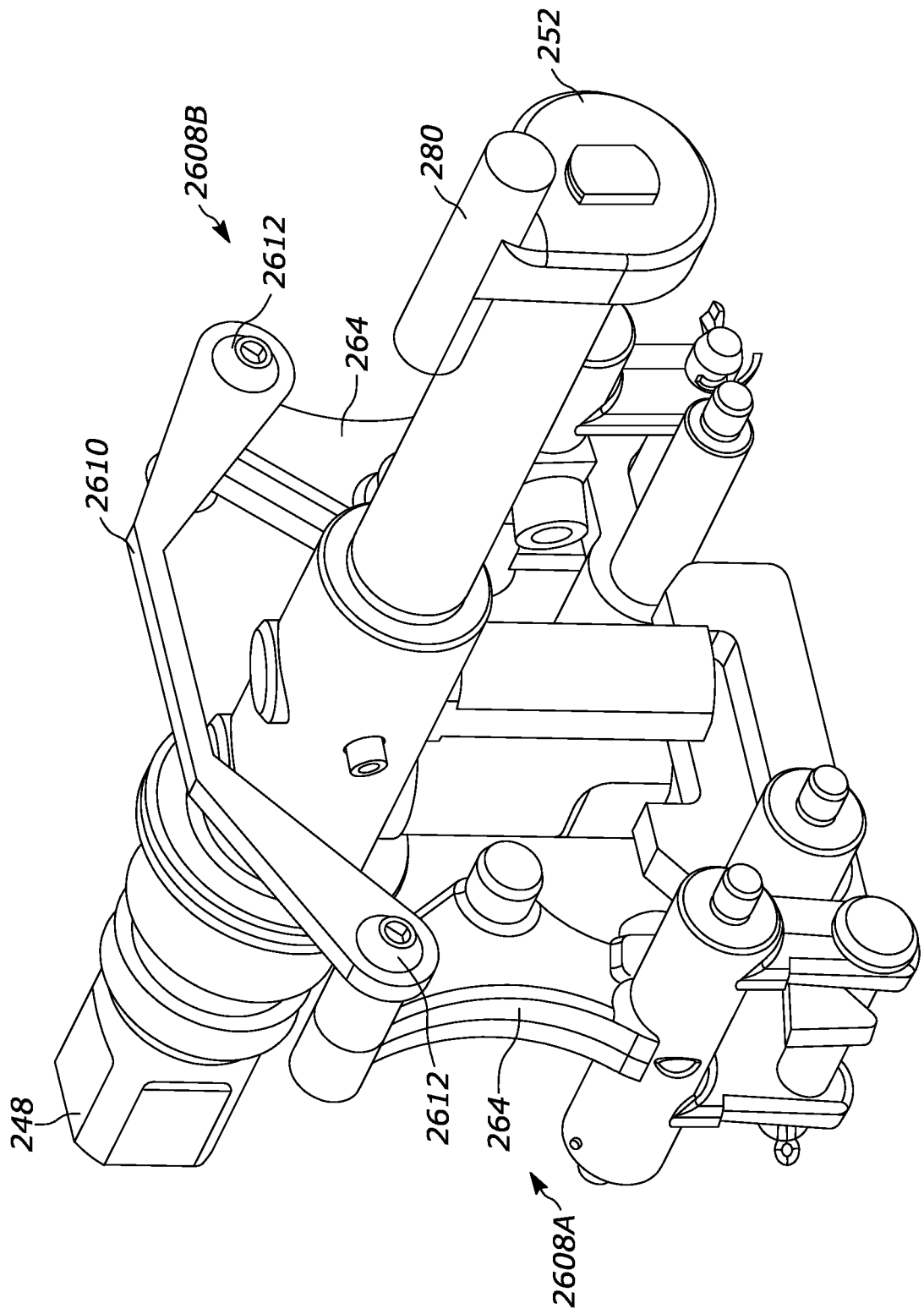
FIG. 28B is a rear view of FIG. 28A.

FIG. 25A illustrates a portion of another example of a slam-shut mechanism 2504 that can be used instead of any of the slam-shut mechanisms 204, 1604, and 1704 described herein. The slam-shut mechanism 2504 is substantially similar to the slam-shut mechanism 1704, with the difference being that the cam 252 of the slam-shut mechanism 2504 is positioned differently than the cam 252 of the slam-shut mechanism 1704. More particularly, the cam 252 of the slam-shut mechanism 2504 is rotated approximately 180 degrees relative to the cam 252 of the slam-shut mechanism 1704, as illustrated by comparing FIG. 25A with FIG. 25B (which shows the position of the cam 252 of the slam-shut mechanism 1704). In turn, the cam surface 280 of the slam-shut mechanism 2504 is also rotated approximately 180 degrees relative to the cam surface 280 of the slam-shut mechanism 1704, as also illustrated by comparing FIG. 25A with FIG. 25B. Accordingly, it will be appreciated that the shaft 248 of the slam-shut mechanism 2504 rotates in an opposite direction than the shaft 248 of the slam-shut mechanism 1704 as the latch 260 is moved between the first position and the second position to open or close the fluid regulator 100.

FIGS. 26-28B illustrate another example of a slam-shut mechanism 2604 that can be used instead of any of the slam-shut mechanisms 204, 1604, 1704, and 2504 described herein. The slam-shut mechanism 2604 is substantially similar to the slam-shut mechanism 1704, particularly in that the slam-shut mechanism 2604 also includes first and second slam-shut assemblies 2608A, 2608B that are linked together, such that the first and second slam-shut assemblies 2608A, 2608B move in unison together regardless of which slam-shut assembly 2608A, 2608B is engaged by the controller 208. However, the first and second slam-shut assemblies 2608A, 2608B are linked together in a different manner than the first and second slam-shut assemblies 1708A, 1708B. More particularly, instead of using the gear teeth 1720, the first and second slam-shut assemblies 2608A, 2608B are connected together via a linkage bar 2610 that is coupled to both the lever 264 of the first slam-shut assembly 2608A and the lever 264 of the second slam-shut assembly 2608B. As illustrated in FIGS. 26-28B, in this example the linkage bar 2610 is coupled to the levers 264 via pins 2612 located proximate the first vertices 294 of the levers 264, respectively. In other examples, however, the linkage bar 2610 can be coupled to different portions of the levers 264 in order to connect the first and second slam-shut assemblies 2608A, 2608B. In any event, the usage of the linkage bar 2610 beneficially allows the slam-shut mechanism 2604 to be entirely assembled outside of the housing 244.

Figure 29:
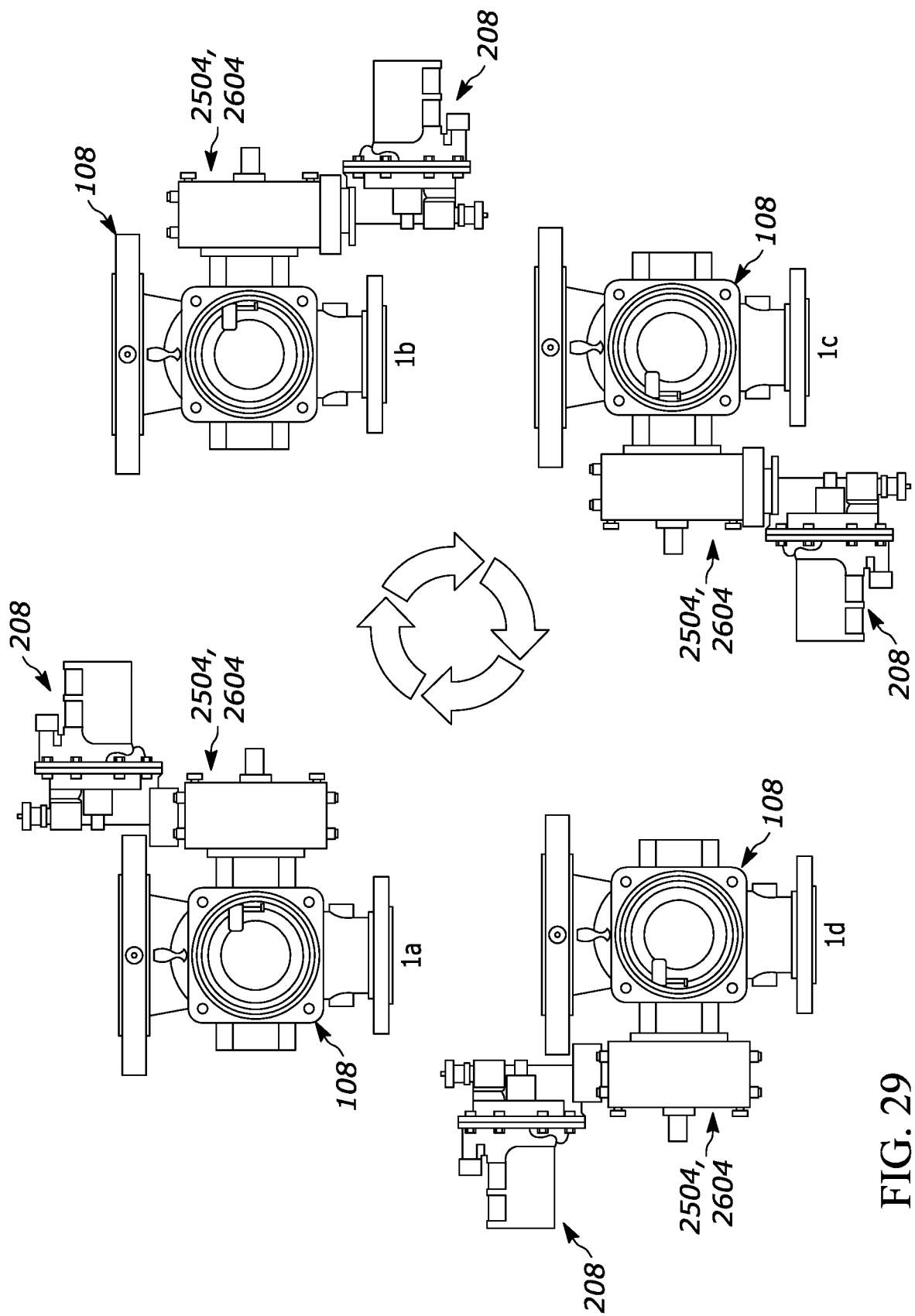
FIG. 29 illustrates a number of different orientations the controller of the fluid regulator of FIGS. 1-4 can be placed in relative to a regulator body of the fluid regulator of FIGS. 1-4.

The slam-shut mechanism 2504 and the slam-shut mechanism 2604 are particularly advantageous because both mechanisms 2504, 2604 allow the housing 244 to be coupled to different portions of the regulator body 108, such that the controller 208, which can itself be coupled to different portions of the housing 244, can be located in a number of different orientations relative to the regulator body 108. For example, as illustrated in FIG. 29, the controller 208 can be positioned in at least four different orientations relative to the regulator body 108: (1) a first orientation, 1*a*, in which the housing 244 is coupled to a first portion of the regulator body 108 and the controller 208 is coupled to a top of the housing 244, (2) a second orientation, 1*b*, in which the housing 244 is coupled to the first portion of the regulator body 108 but the controller 208 is coupled to a bottom of the housing 244, (3) a third orientation, 1*c*, in which the housing 244 is coupled to a second portion of the regulator body 108 and the controller 208 is coupled to the bottom of the housing 244, and (4) a fourth orientation, 1*d*, in which the housing 244 is coupled to the second portion of the regulator body 108 and the controller 208 is coupled to the top of the housing 244. It will be appreciated that the controller 208 can be easily and quickly moved between any of these different orientations (or other orientations) as desired.

Figure 30:
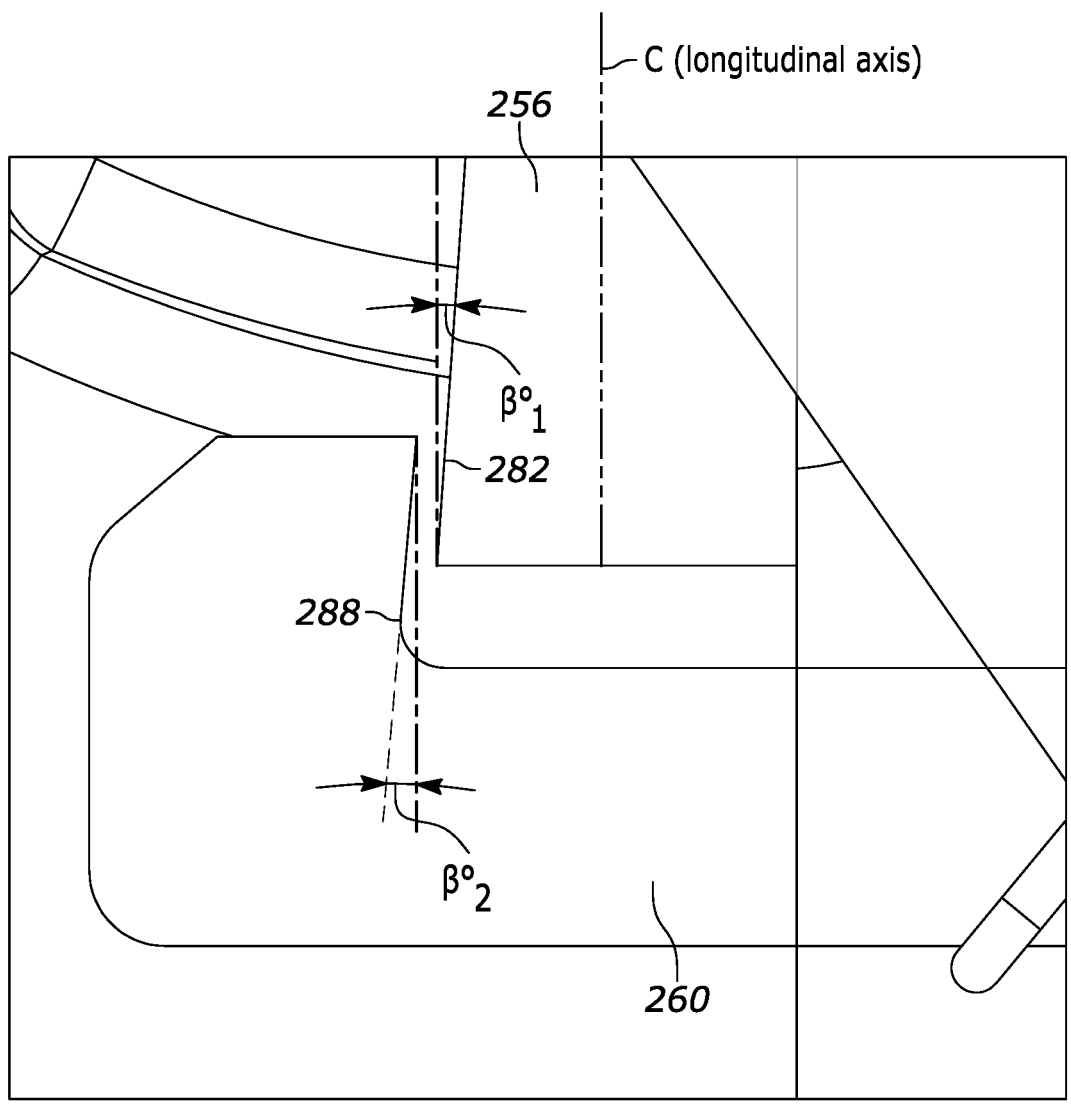
FIG. 30 is a plan view of another example of a slam-shut mechanism constructed in accordance with the teachings of the present disclosure, showing the orientation of the latch of FIG. 6 relative to a latching pin attached to the main shaft of the mechanism.

In some examples, any of the slam-shut mechanisms described herein can be modified so as to ensure that the latching pin 256 is not inadvertently released from the latch 260 (e.g., due to vibrations or shocks occurring during operation of the fluid regulator 100). For example, any of the slam-shut mechanisms described herein can be modified so that the first contact surface 282 of the latching pin 256 is inclined relative to the second contact surface 288 of the latch 260, as orienting the first and second contact surfaces 282, 288 in this manner has been found to prevent the slam-shut mechanism from inadvertently unlatching (e.g., when subject to vibrations or shocks) but still allow the slam-shut mechanism to unlatch when desired. More particularly, the first contact surface 282 of the latching pin 256 can be oriented at a first angle 131 relative to the slam-shut axis C (which is parallel to the longitudinal axis A) and the second contact surface 288 oriented at a second angle 132 relative to the slam-shut axis C, as illustrated in FIG. 30. Preferably, the first angle and second angles are selected so that the second contact surface 288 is inclined relative to the first contact surface 282 at an angle equal to between approximately 1.5 degrees and approximately 2.5 degrees, as it has been found that values below 1.5 degrees still allow such inadvertent latching whereas values above 2.5 degrees frustrate the ability of the slam-shut mechanism to unlatch when desired.

Figure 31:
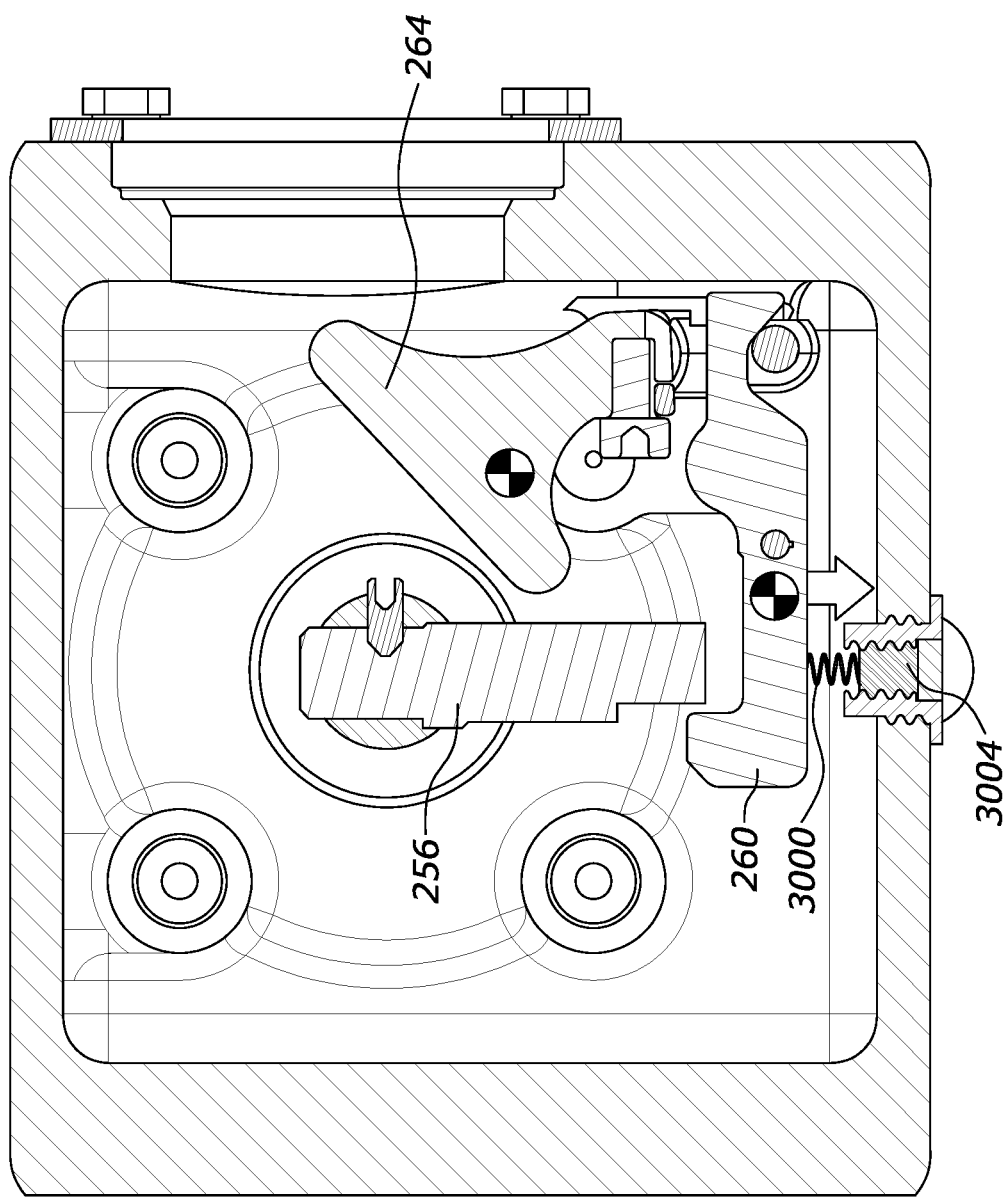
FIG. 31 is a plan view of a portion of another example of a slam-shut mechanism constructed in accordance with the teachings of the present disclosure, showing a spring of the slam-shut mechanism that brings the latch of FIG. 6 into position.
Figure 32:
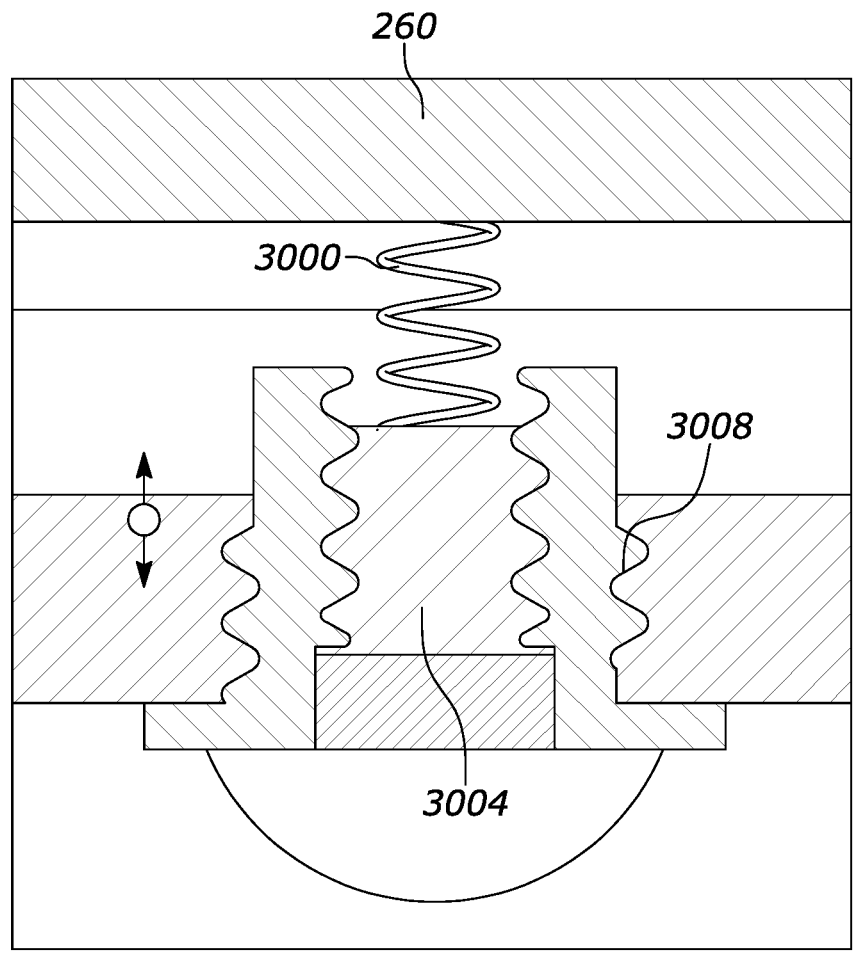
FIG. 32 is a close-up view of a portion of FIG. 31.

In some examples, any of the slam-shut mechanisms described herein can be modified so as to replace the torsion spring 324 with a different biasing element that imparts a biasing force on the latch 260 that prevents the slam-shut mechanism from inadvertently unlatching (e.g., when subject to vibrations or shocks) but still allow the slam-shut mechanism to unlatch when desired. For example, the housing 244 can be modified to include a compression spring 3000 having one end seated against an underside of the latch 260, such that the compression spring 3000 applies a compressive force on the underside of the latch 260 in order to bias the latch 260 to its first position (i.e., into engagement with the latching pin 256), as illustrated in FIGS. 31 and 32. In some cases, any of the slam-shut mechanisms can also be modified to include a force adjuster that is positioned immediately adjacent one end of the compression spring 3000 and is configured to adjust the compressive force applied by the compression spring 3000 when desired (e.g., to account for different tolerances). In the example illustrated in FIGS. 31 and 32, the force adjuster takes the form of a threaded pin 3004 that is threaded within a threaded opening 3008 formed in the housing 244 and has one end seated against the compression spring 3000 opposite the latch 260. It will be appreciated that by moving (e.g., rotating) the threaded pin 3004 towards the latch 260, the threaded pin 3004 will further compress the compression spring 3000, thereby increasing the compressive force applied by the compression spring 3000 on the underside of the latch 260. Conversely, by moving the threaded pin 3004 away from the latch 260, the threaded pin 3004 will allow the compression spring 3000 to expand, thereby decreasing the compressive force applied by the compression spring 3000 on the underside of the latch 260.

Figure 33A:
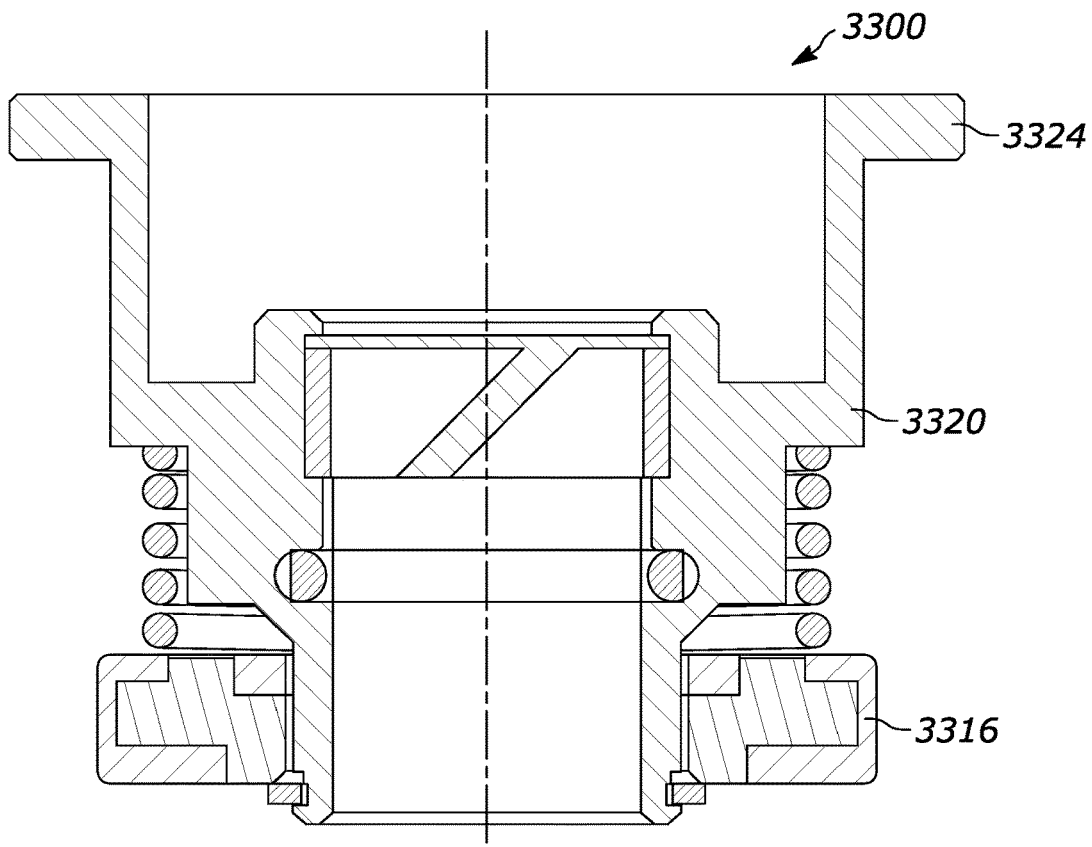
FIG. 33A is a close-up view of a portion of another example of an internal slam-shut assembly that can be used instead of the internal slam-shut assembly of FIG. 3B.
Figure 33B:
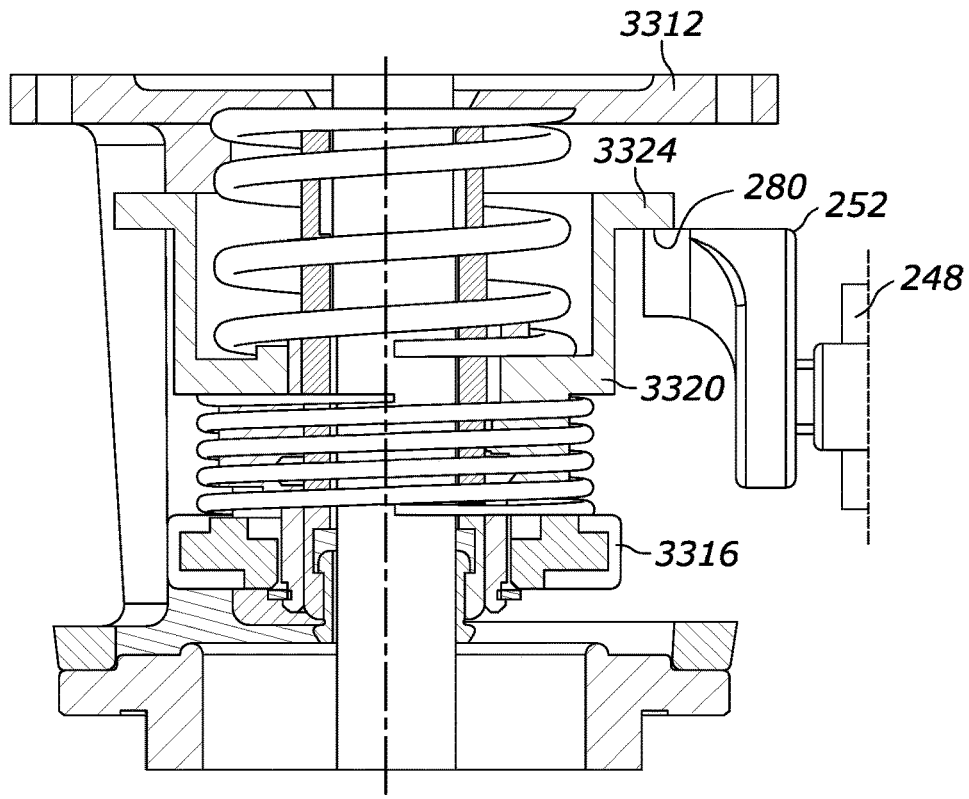
FIGS. 33B and 33C illustrate the internal slam-shut assembly of FIG. 33A in a fully open position.
Figure 33C:
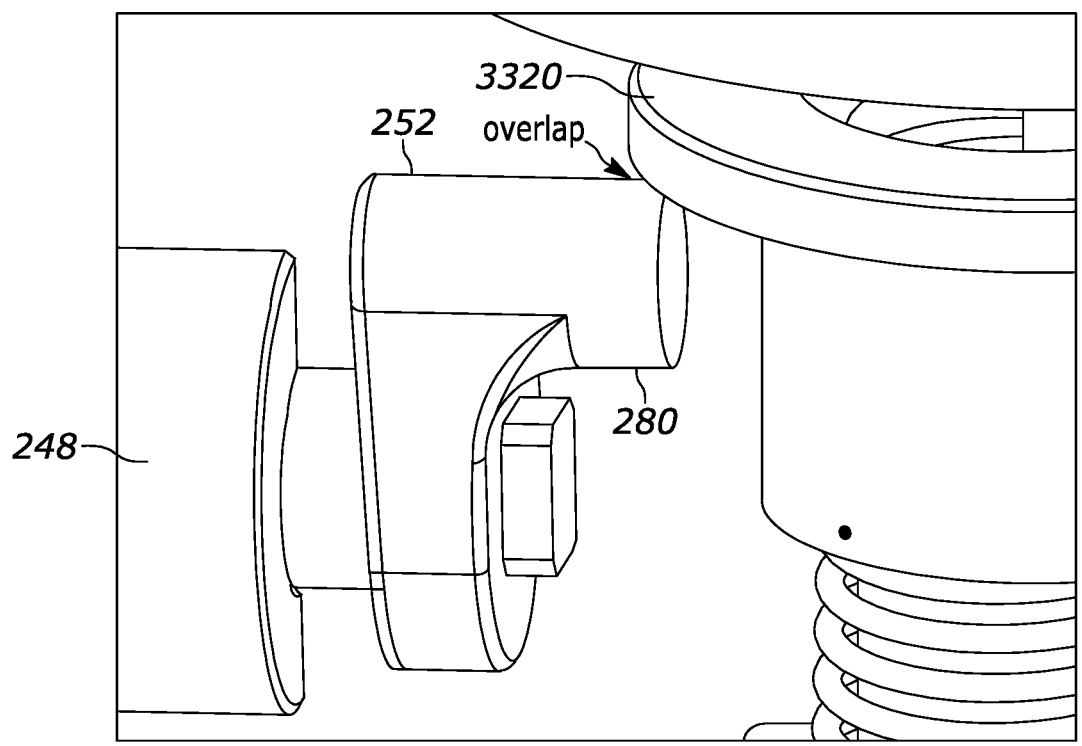

FIGS. 33A-33C illustrate another example of an internal slam-shut assembly 3300 that can be used instead of the internal slam-shut assembly 200. The internal slam-shut assembly 3300 is specifically configured for use with the slam-shut mechanism 1704, though it will be appreciated that the internal slam-shut assembly 3300 can be used with other slam-shut mechanisms (e.g., the slam-shut mechanism 204). The internal slam-shut assembly 3300 is similar to the internal slam-shut assembly 200, in that the internal slam-shut assembly 3300 includes a slam-shut support 3312, a slam-shut control element 3316, and a slam-shut spring seat 3320. However, the internal slam-shut assembly 3300 is different because the slam-shut spring seat 3320 has a different shape than the slam-shut spring seat 220 of the internal slam-shut assembly 200. More particularly, the slam-shut spring seat 3320 has a flanged portion 3324 that is narrower than the flanged portion of the slam-shut spring seat 220, and the flanged portion 3324 is positioned at the top end of the slam-shut spring seat 3320, whereas the flanged portion of the slam-shut spring seat 220 is positioned between the top and bottom ends of the slam-shut spring seat 3320.

It will be appreciated that as a result of the design of the slam-shut spring seat 3320, the cam surface 280, which selectively engages the flanged portion 3324 and rotates to move the slam-shut control element 3316 between its fully open position (illustrated in FIGS. 33B and 33C) and its closed position (illustrated in FIGS. 34A-34C), rotates less than the cam surface 280 rotates to move the slam-shut control element 216 between its fully open positon and its closed position. In one example, the cam surface 280 rotates approximately 60 degrees to move the slam-shut control element 3316 between its fully open and closed positions, whereas the cam surface 280 rotates approximately 70 degrees to move the slam-shut control element 216 between its fully open and closed positions. In turn, the shaft 248 and the latching pins 256 of the slam-shut mechanism 1704 need not rotate as far, thereby helping to ensure that the latching pins 256 do not inadvertently move other components of the slam-shut mechanism 1704.

Figure 34A:
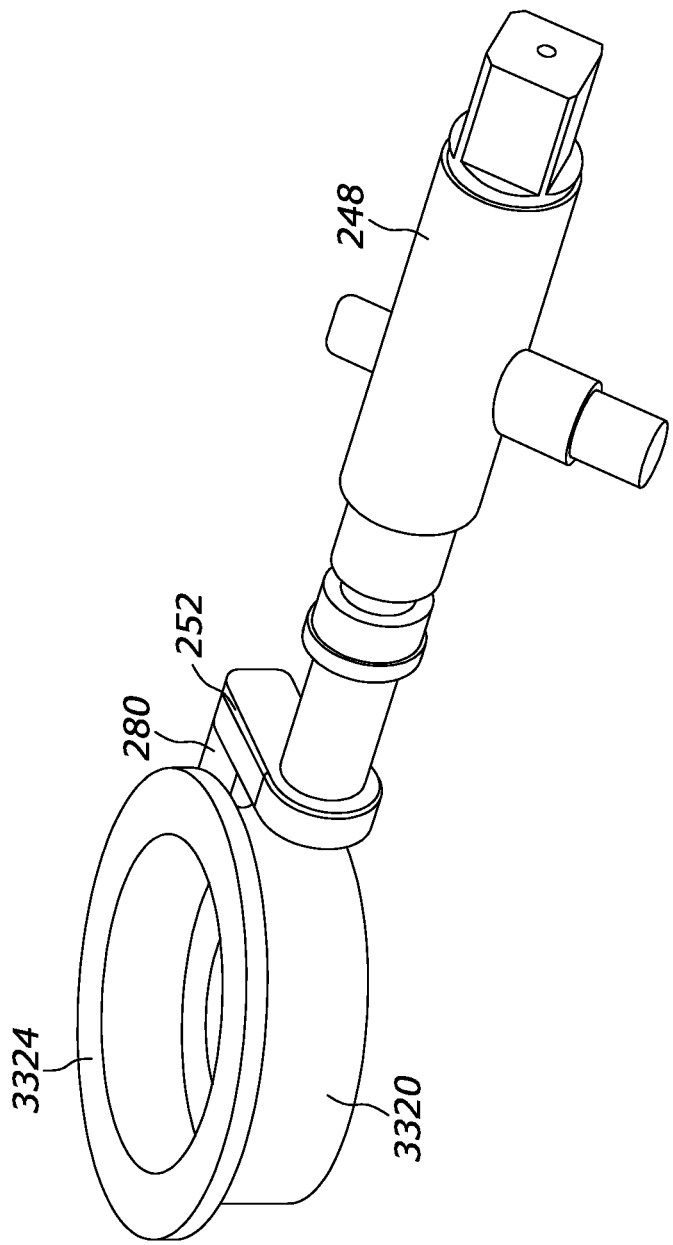
FIG. 34A illustrates a lack of engagement between a cam surface and a slam-shut spring seat of the internal slam-shut assembly of FIGS. 33A-33C when the internal slam-shut assembly is in a fully closed position.
Figure 34B:
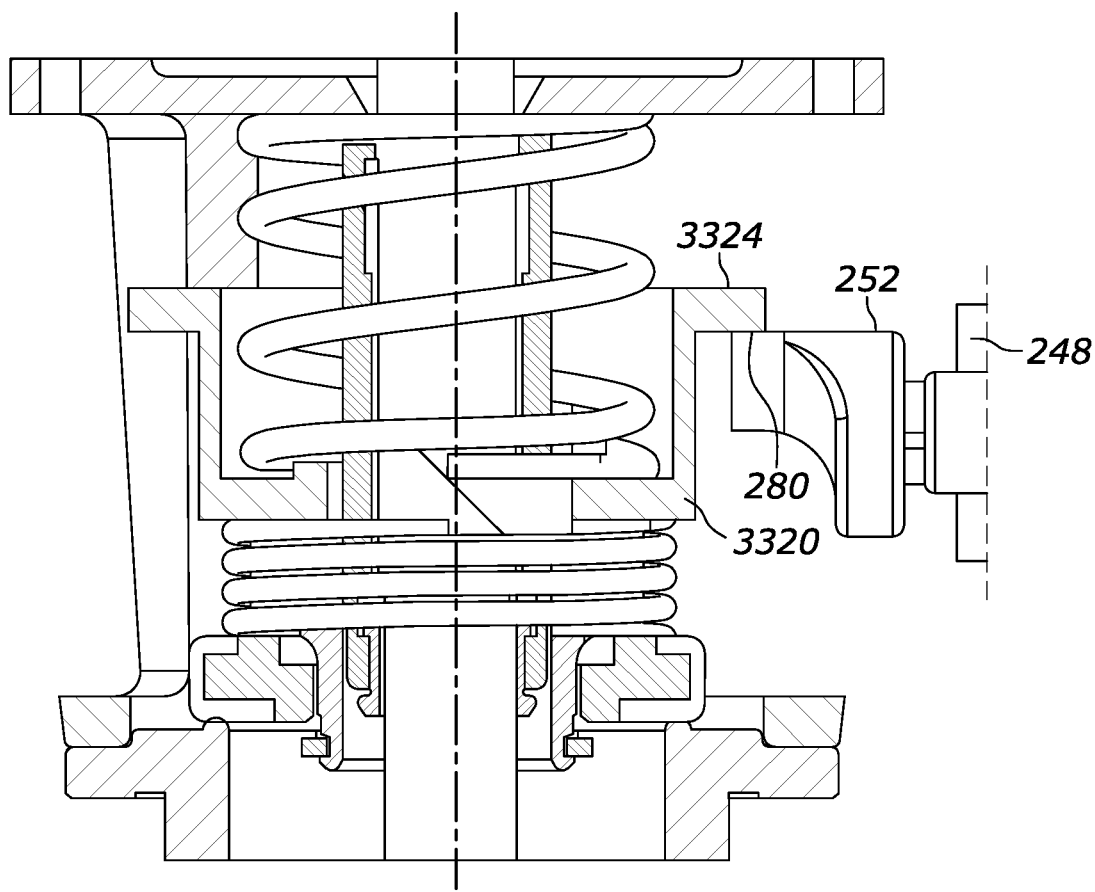
FIGS. 34B and 34C are close-up views of FIG. 34A.
Figure 34C:
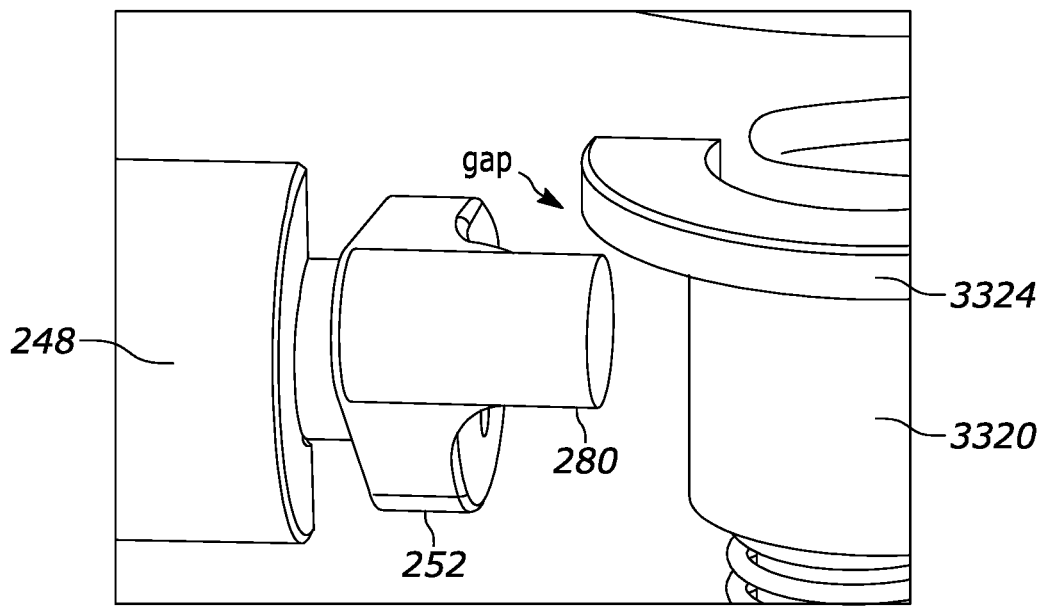

At the same time, use of the slam-shut spring seat 3320 can increase the likelihood that the cam surface 280 will disengage from the slam-shut spring seat 3320 when the slam-shut safety device 104 employing the slam-shut mechanism 1704 is in the tripped position, as illustrated in FIGS. 34A-34C. Accidental disengagement may also occur in other cases when the contact surface between the cam surface 280 and the slam-shut spring seat 220 is small and the slam-shut safety device 104 employing any of the other slam-shut mechanisms described herein is in the tripped position. In any event, disengagement of the cam surface 280 from the slam-shut spring seat (220 or 3320) will cause the slam-shut mechanisms described herein to not work as intended and the cam surface 280 and/or the slam-shut spring seat (220 or 3320) may be damaged. Thus, in some examples, the slam-shut mechanisms described herein can be modified so that the cam 252 (which carries the cam surface 280) is slidable along the shaft 248 in order to promote engagement between the cam surface 280 and the slam-shut spring seat (220 or 3320) at all times, particularly when the slam-shut safety device 104 is tripped.

Figure 35A:
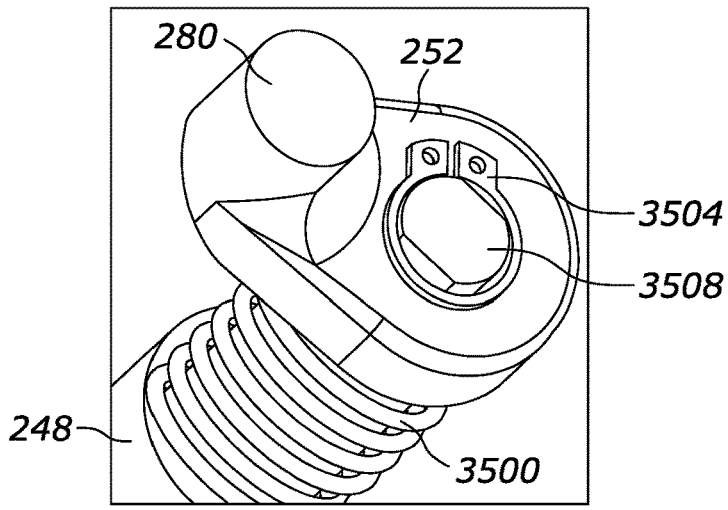
FIG. 35A is a perspective view of a portion of another example of a slam-shut mechanism constructed in accordance with the teachings of the present disclosure.
Figure 35B:
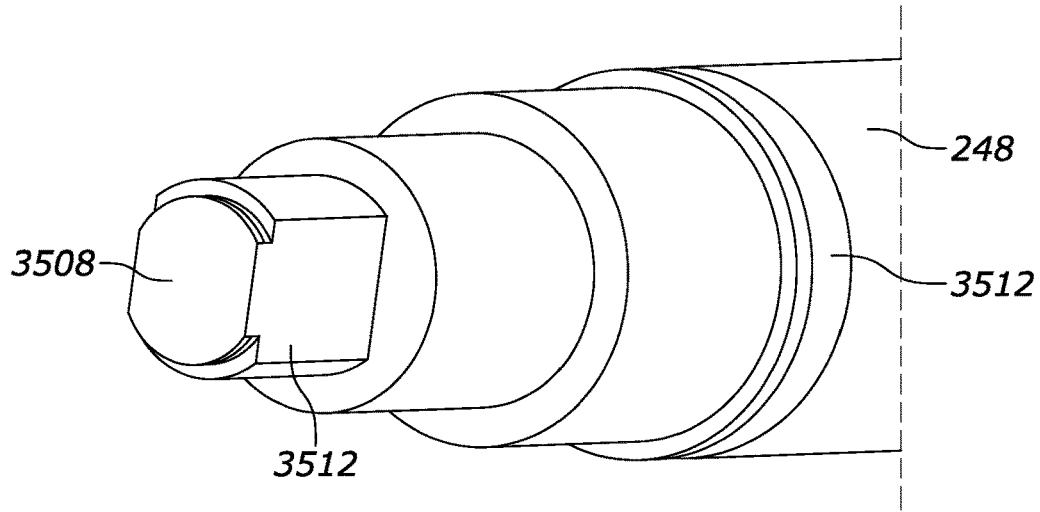
FIG. 35B illustrates a shaft of the slam-shut mechanism of FIG. 35A.
Figure 35C:
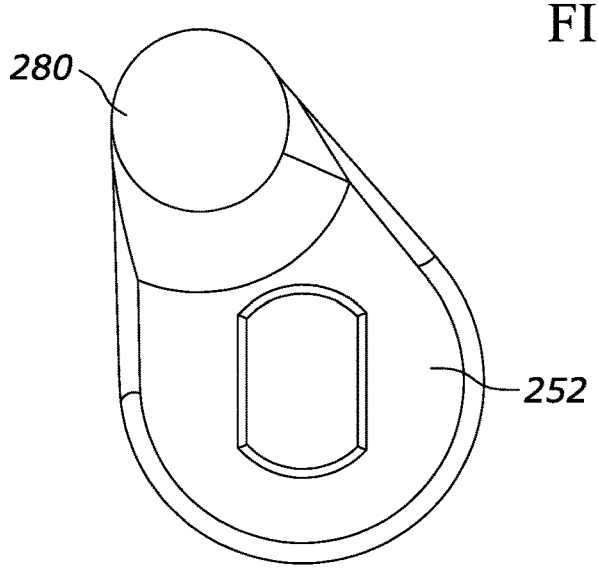
FIG. 35C illustrates a cam of the slam-shut mechanism of FIG. 35A.

FIGS. 35A-35C illustrate one such example, in which the slam-shut mechanism further includes a biasing element 3500 and the shaft 248 is modified to accommodate the biasing element 3500 and permit adjustment of the cam surface 280 relative to the shaft 248. In this example, the shaft 248 is modified to include a plurality of stepped, radial surfaces having different diameters, and to include a travel stop 3504, which in this example is an elastic ring, fixedly secured on an end 3508 of the shaft 248. As best illustrated in FIG. 35A, the cam 252 is movably disposed on one of the radial surfaces (the radial surface 3512 closest to the end 3508). Meanwhile, the biasing element 3500, which in this example takes the form of a spring, is disposed between one of the radial surfaces (the innermost stepped surface 3512) and an underside of the cam 252 opposite the cam surface 280. In turn, the biasing element 3500 biases the cam 252 (and, more particularly, the cam surface 280) outward, toward the travel stop 3504, which prevents the cam 252 from being moved beyond the end 3508 of the shaft 248 (which would decouple the cam 252 from the shaft 248).

Figure 36:
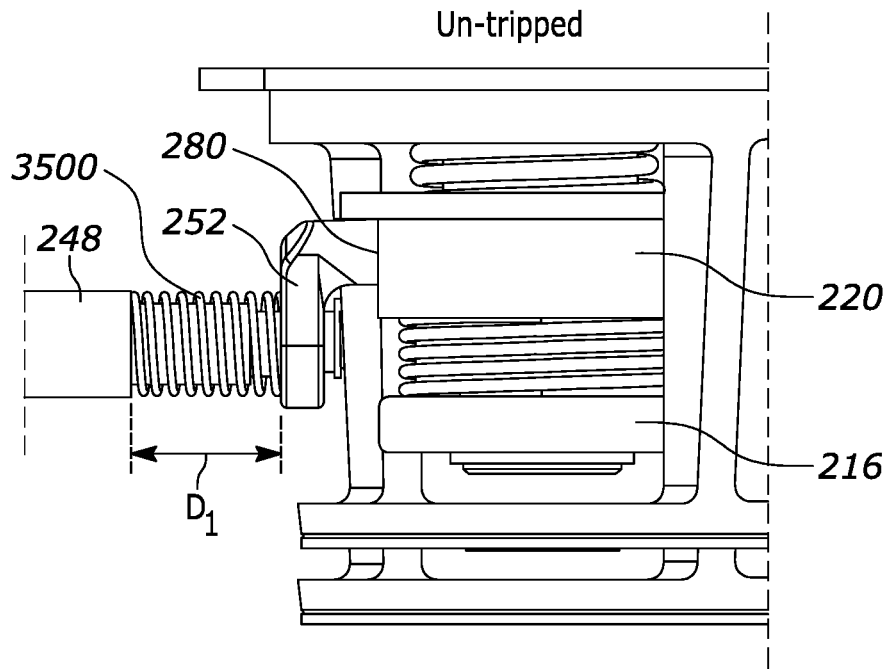
FIG. 36 illustrates the engagement between a cam surface of the cam of FIG. 35C and a component of the slam-shut mechanism when the slam-shut mechanism is un-tripped.
Figure 37:
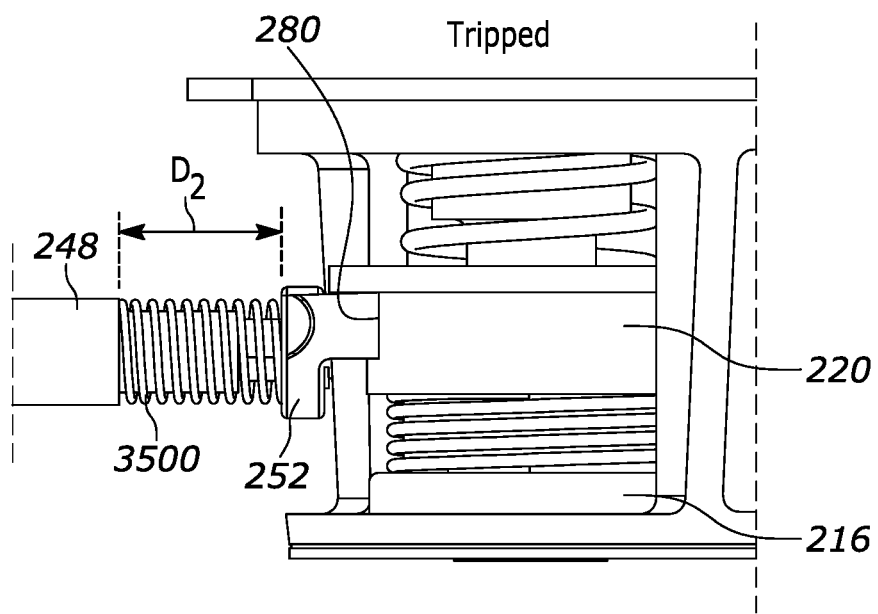
FIG. 37 is similar to FIG. 36, but shows the engagement when the slam-shut mechanism is tripped.

As illustrated in FIGS. 36 and 37, the biasing element 3500 helps to maintain the cam surface 280 in engagement with the bottom surface of the slam-shut spring seat (e.g., slam-shut spring seat 220), regardless of whether the slam-shut safety device 104 is in the un-tripped position (FIG. 36) or in the tripped position (FIG. 37). When, for example, the slam-shut safety device 104 is in the un-tripped position (FIG. 36), the cam surface 280 engages the bottom surface of the slam-shut spring seat 220, yet the cam 252 is spaced from the end 3508 of the shaft 248. The biasing element 3500 in turn biases the cam surface 280 into engagement with the bottom surface of the slam-shut spring seat 220. On the other hand, when the slam-shut safety device 104 is moved to the tripped position (FIG. 37), the biasing element 3500 biases the cam 252 outward, toward the end 3508, so that the cam surface 280 is pushed into engagement with the bottom surface of the slam-shut spring seat 220. As such, it will be appreciated that in the un-tripped position, the distance between the stepped surface 3512 and the underside of the cam 252 is equal to D1, whereas in the tripped position, the distance between the stepped surface 3512 and the underside of the cam 252 is equal to D2, D2 being greater than D1.

Figure 38A:
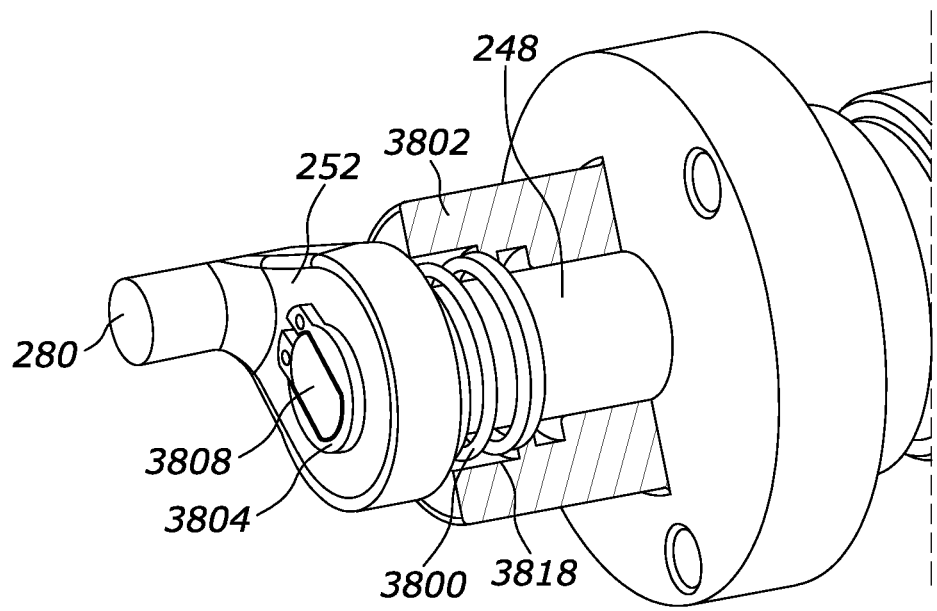
FIG. 38A is a perspective view of a portion of another example of a slam-shut mechanism constructed in accordance with the teachings of the present disclosure.
Figure 38B:
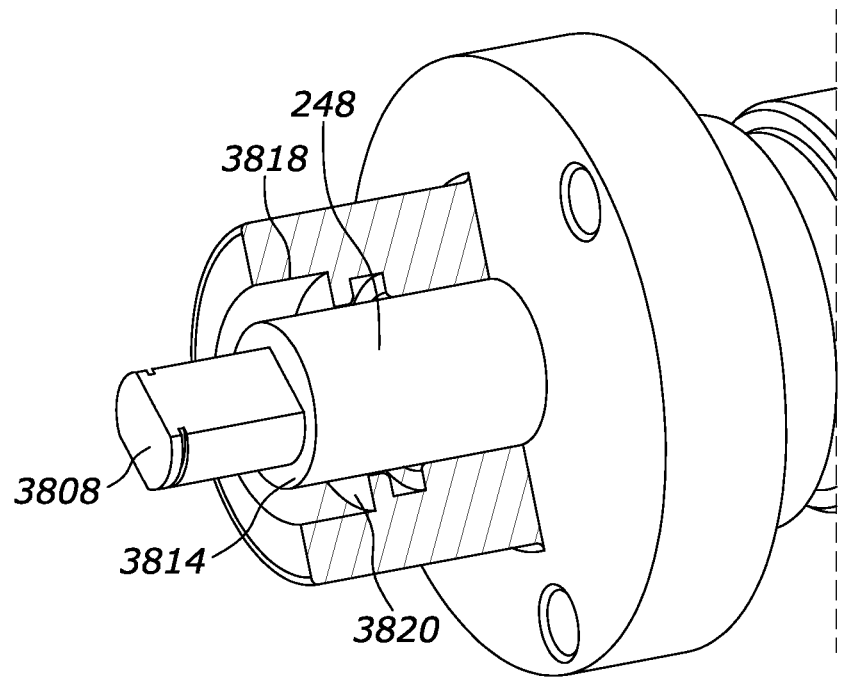
FIG. 38B is similar to FIG. 38A, but with several components removed for illustrative purposes.

FIGS. 38A and 38B illustrate another example that can be used in instead of the example illustrated in FIGS. 35A-35C. In the example illustrated in FIGS. 38A and 38B, the slam-shut mechanism further includes a biasing element 3800 and a bushing 3802 that is coupled to the shaft 248 for accommodating the biasing element 3800 and facilitating adjustment of the cam surface 280 relative to the shaft 248. Like the shaft 248 in the example illustrated in FIGS. 35A-35C, the shaft 248 illustrated in this example includes a travel stop 3804, which in this example is an elastic ring, fixedly secured on an end 3808 of the shaft 248. However, unlike the shaft 248 in the example of FIGS. 35A-35C, the shaft 248 in this example only includes a single stepped surface, i.e., stepped surface 3814. The cam 252 is movably disposed on the shaft 248 between the travel stop 3804 and the stepped surface 3814 of the shaft 248. As best illustrated in FIG. 38B, the bushing 3802 is coupled to the shaft 248 (e.g., via any known manner) proximate the end 3808, such that the bushing 3802 surrounds a portion of the shaft 248. Meanwhile, as best illustrated in FIG. 38A, the biasing element 3800, which in this example takes the form of a spring, is disposed in a recess 3818 of the bushing 3802, with one end of the biasing element 3800 seated against a shoulder 3820 of the bushing 3802 that helps to define the recess 3818. Accordingly, the biasing element 3800 surrounds a portion of the shaft 248 within (or substantially within) the bushing 3802. In turn, the biasing element 3800 biases the cam 252 (and, more particularly, the cam surface 280) outward, toward the travel stop 3804, which prevents the cam 252 from being moved beyond the end 3808 of the shaft 248 (which would decouple the cam 252 from the shaft 248).

Figure 39A:
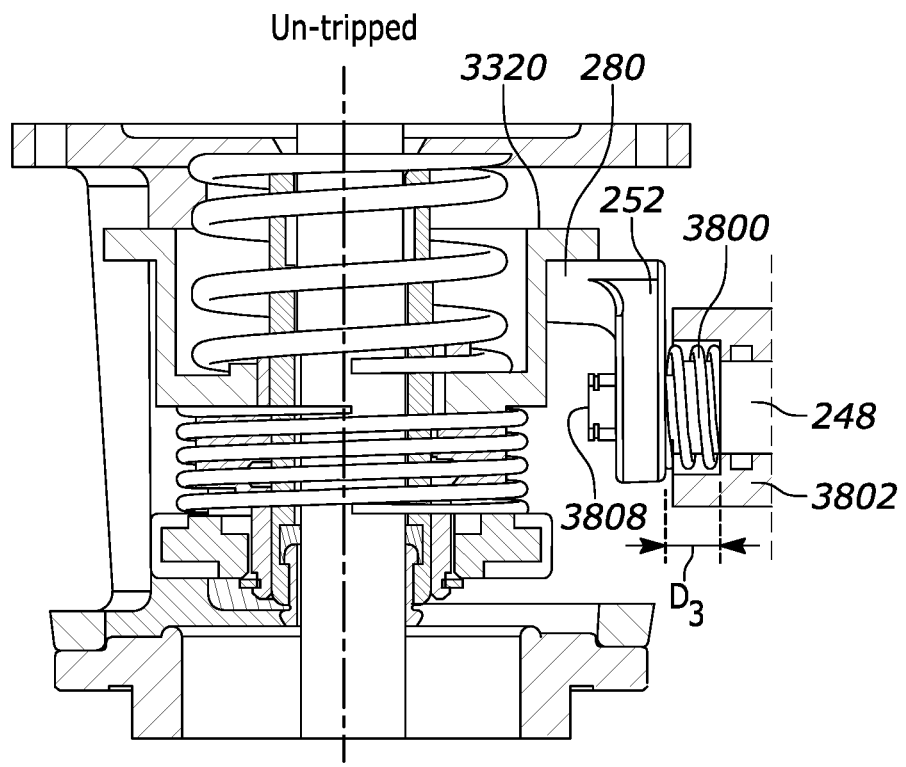
FIG. 39A illustrates the engagement between a cam surface of the cam of FIGS. 38A and 38B and a component of the slam-shut mechanism when the slam-shut mechanism is un-tripped.
Figure 39B:
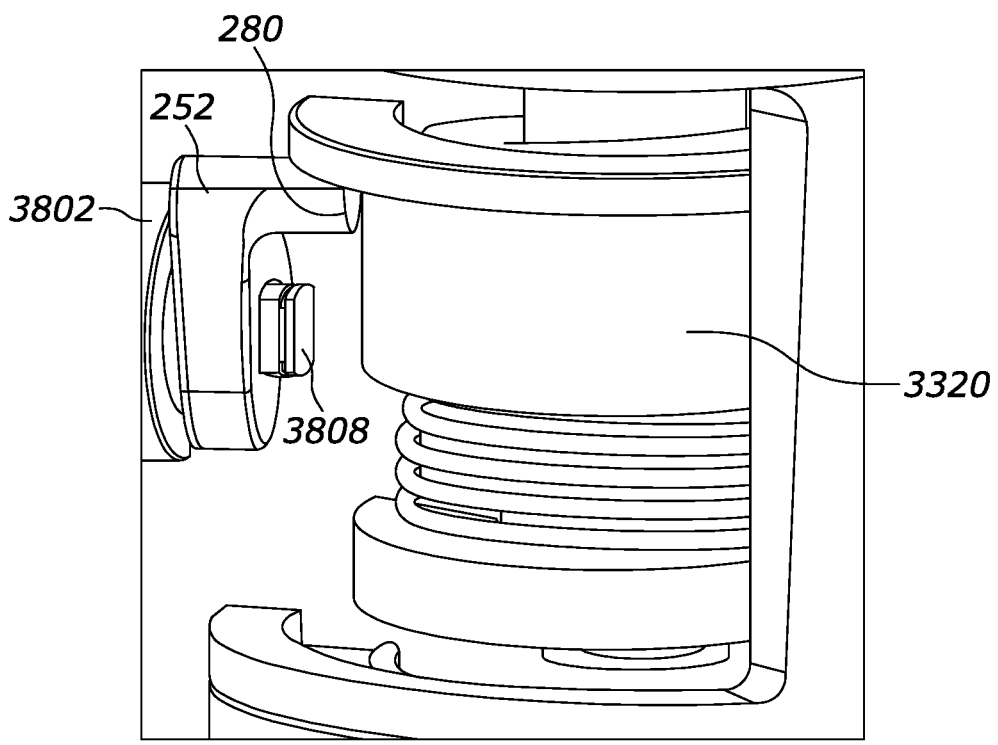
FIG. 39B is a close-up view of FIG. 39A.
Figure 39C:
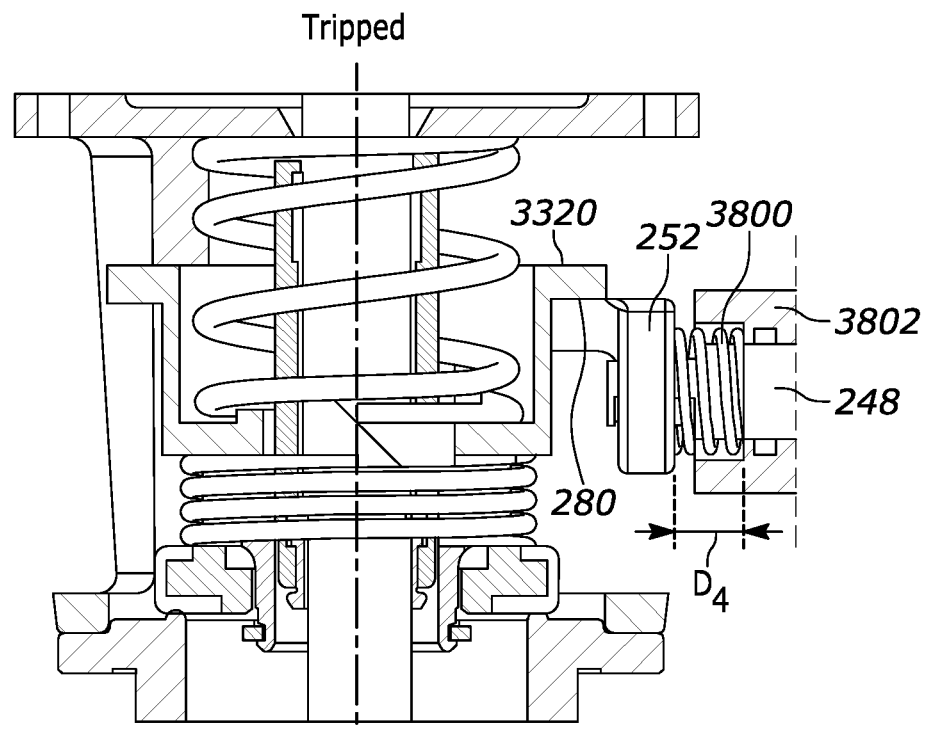
FIG. 39C is similar to FIG. 39A, but shows the engagement when the slam-shut mechanism is tripped.
Figure 39D:
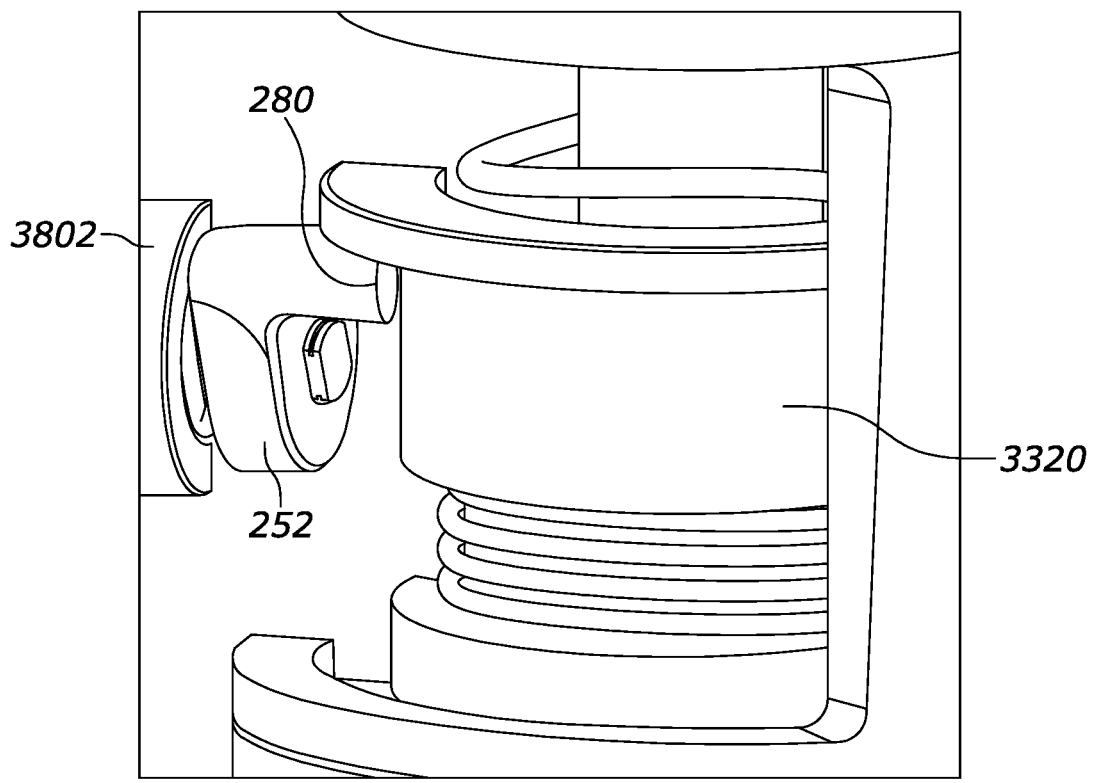
FIG. 39D is a close-up view of FIG. 39C.

As illustrated in FIGS. 39A-39D, the biasing element 3800 helps to maintain the cam surface 280 in engagement with the bottom surface of the slam-shut spring seat (e.g., slam-shut spring seat 3320), regardless of whether the slam-shut safety device 104 is in the un-tripped position (FIGS. 39A and 39B) or in the tripped position (FIGS. 39C and 39D). When, for example, the slam-shut safety device 104 is in the un-tripped position (FIGS. 39A and 39B), the cam surface 280 engages the bottom surface of the slam-shut spring seat 3320, yet the cam 252 is spaced from the end 3808 of the shaft 248. The biasing element 3800 in turn biases the cam surface 280 into engagement with the bottom surface of the slam-shut spring seat 3320. On the other hand, when the slam-shut safety device 104 is moved to the tripped position (FIGS. 39C and 39D), the biasing element 3800 biases the cam 252 outward, toward the end 3808, so that the cam surface 280 is pushed into engagement with the bottom surface of the slam-shut spring seat 3320. As such, it will be appreciated that in the un-tripped position, the distance between the shoulder 3820 and the underside of the cam 252 is equal to D3, whereas in the tripped position, the distance between the shoulder 3820 and the underside of the cam 252 is equal to D4, D4 being greater than D3.

Figure 40:
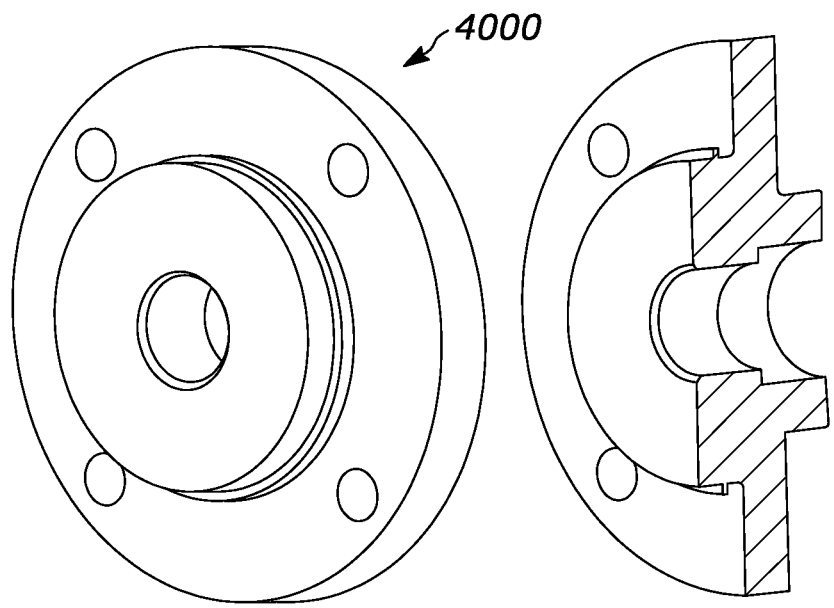
FIG. 40 illustrates a single flange that can be used to couple the slam-shut mechanism of FIGS. 5-8 to the regulator body of the fluid regulator of FIGS. 1-4.
Figure 41:
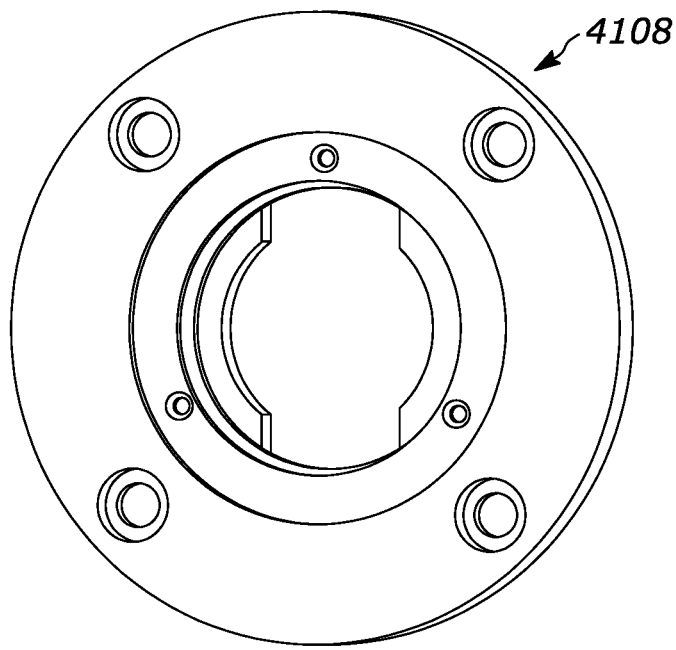
FIG. 41 illustrates a first flange of a flange assembly that is constructed in accordance with the teachings of the present disclosure and can be used to couple the slam-shut mechanism of FIGS. 5-8 to the regulator body of the fluid regulator of FIGS. 1-4.
Figure 42:
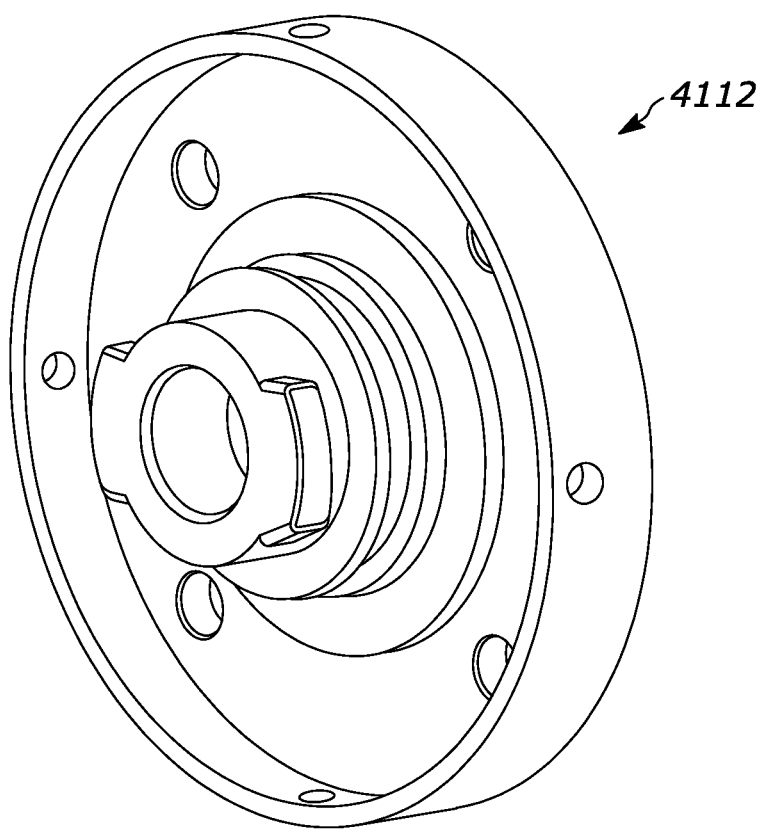
FIG. 42 illustrates a second flange of the flange assembly of FIG. 41.

The slam-shut mechanisms described herein can, in some examples, be coupled to the regulator body 108 of the fluid regulator 100 via a single flange, e.g., the flange 4000 illustrated in FIG. 40, that is coupled to and disposed between the housing 244 of the respective slam-shut mechanism and the regulator body 108. However, it will be appreciated that this single flange prevents the housing 244 from being decoupled from the regulator body 108 without first opening the housing 244. Accordingly, in some examples, and as illustrated in FIGS. 41-52, the slam-shut mechanisms described herein can be coupled to the regulator body 108 of the fluid regulator 100 via a flange assembly that allows the housing 244 of the respective slam-shut mechanism to be quickly and easily coupled to or decoupled from the regulator body 108 without having to open the housing 244.

Figure 43:
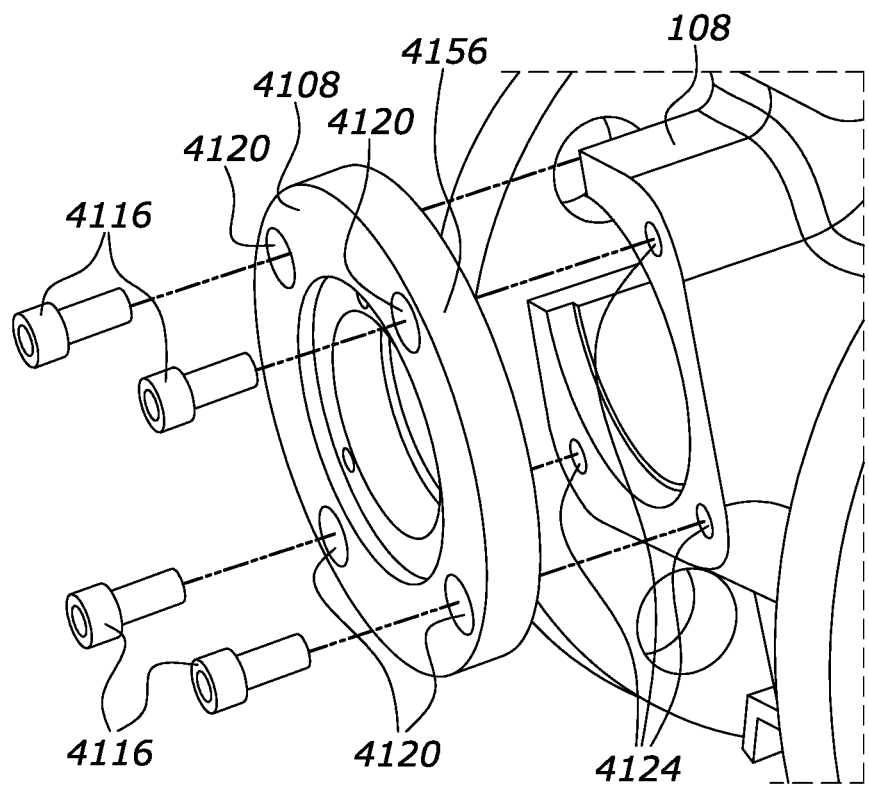
FIG. 43 illustrates the first flange of the flange assembly of FIG. 41 being coupled to the regulator body.
Figure 44:
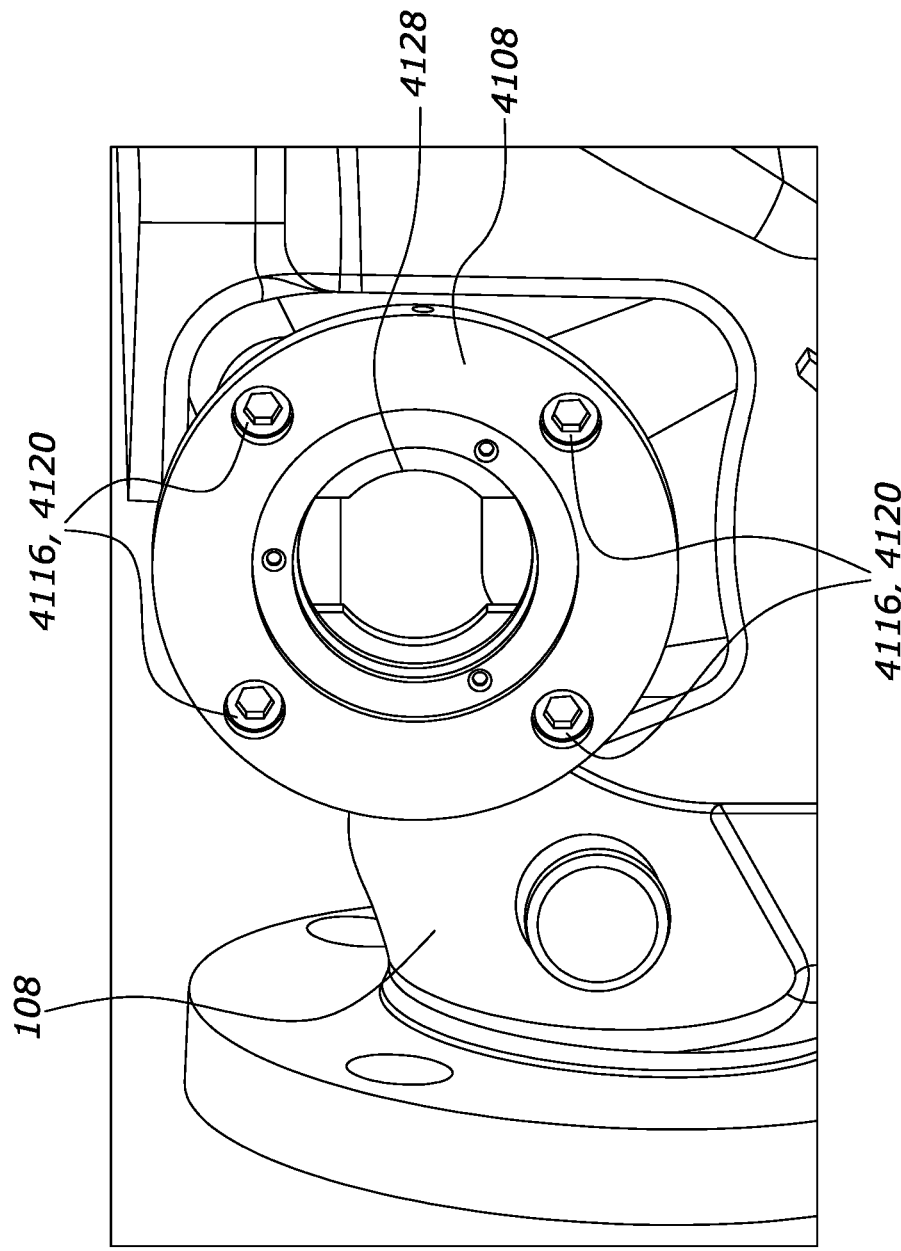
FIG. 44 is a front view of the first flange of the flange assembly of FIG. 41 coupled to the regulator body.
Figure 45:
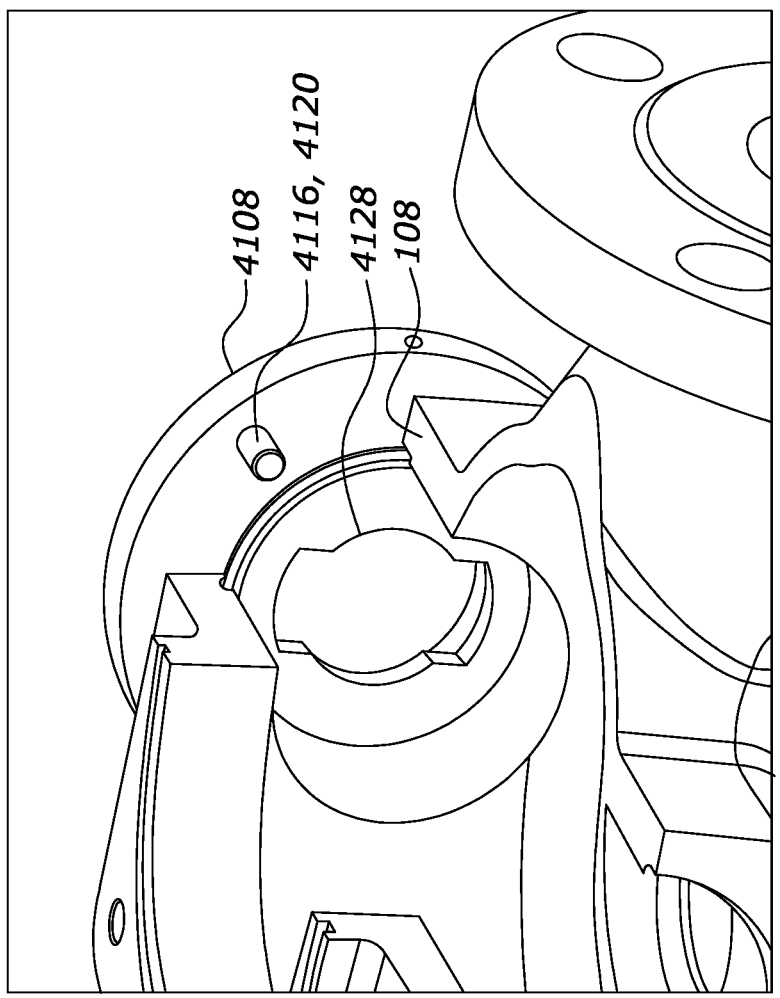
FIG. 45 is a rear view of FIG. 44.
Figure 46:
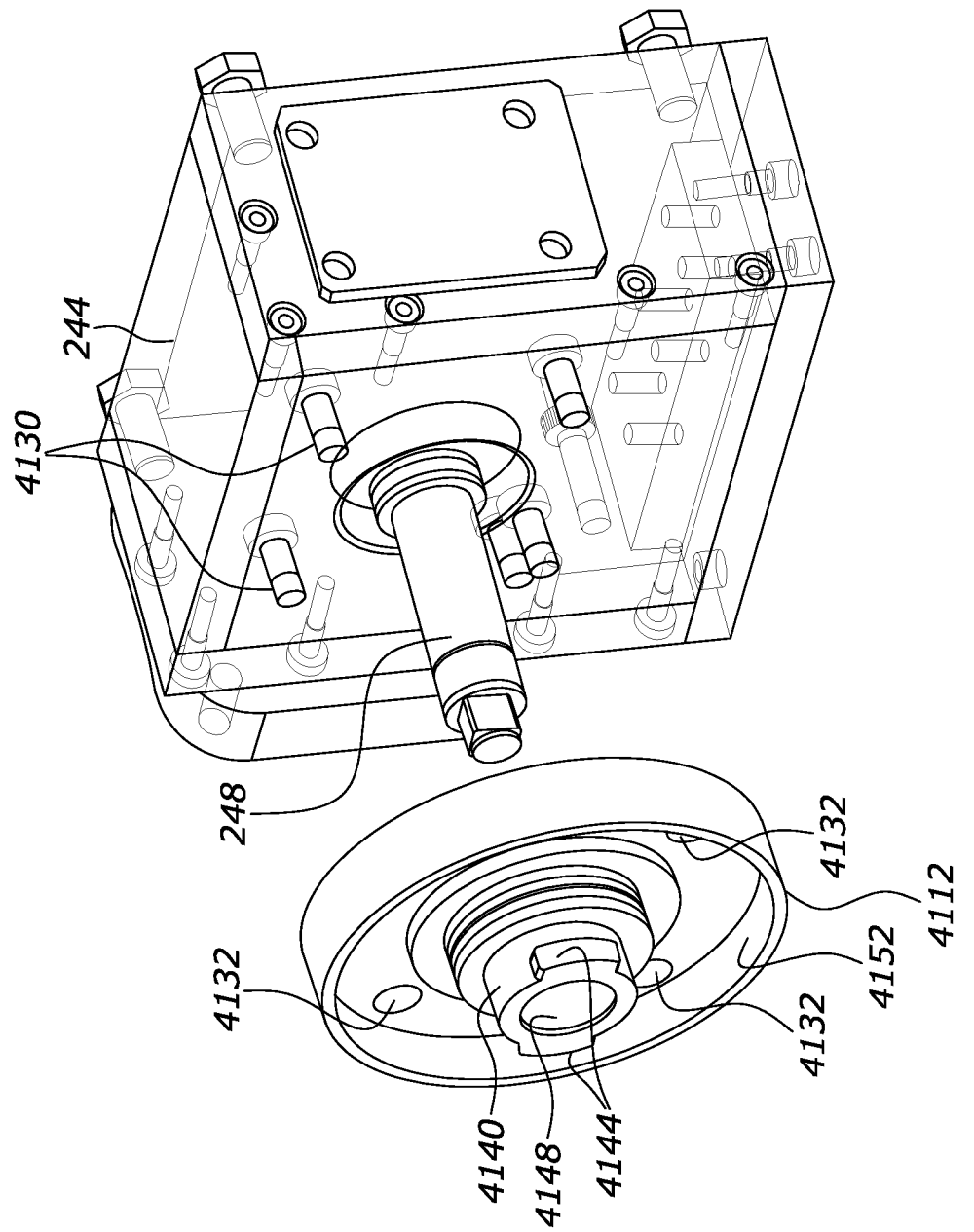
FIG. 46 illustrates the second flange of the flange assembly of FIG. 41 being coupled to the slam-shut mechanism.

Referring to FIGS. 41-52, the flange assembly generally includes a first flange 4108 and a second flange 4112 configured to matingly engage the first flange 4108. As illustrated in FIGS. 43-45, the first flange 4108 is mounted to the regulator body 108 via a plurality of fasteners 4116 inserted into a plurality of circumferential openings 4120, respectively, formed in the first flange 4108 and then a plurality of corresponding openings 4124 formed in the regulator body 108. The first flange 4108 has a central opening 4128 that is surrounded by the plurality of circumferential openings 4120. Meanwhile, as illustrated in FIG. 46, the second flange 4112 is mounted to an exterior portion of the housing 244 via a plurality of fasteners 4130 inserted into a plurality of circumferential openings 4132, respectively, formed in the second flange 4112 and then a plurality of corresponding openings formed in the housing 244. In other examples, however, the second flange 4112 can be integrally formed on the exterior portion of the housing 244.

Referring still to FIG. 46, the second flange 4112 in this example has an outwardly extending coupling 4140, a plurality of tabs 4144 carried by an end of the outwardly extending coupling 4140, and a central opening 4148 defined by the outwardly extending coupling 4140. When the second flange 4112 is coupled to the housing 244, the shaft 248 extends through the central opening 4148 such that the cam 252 and the cam 280 extend outward from the second flange 4112 and the outwardly extending coupling 4140 surrounds a portion of the cam 252. As such, as illustrated in FIGS. 44 and 45, the central opening 4128 of the first flange 4108 has a shape and size that match the shape and size of the second flange 4112, particularly the outwardly extending coupling 4140 and the plurality of tabs 4144.

Figure 47:
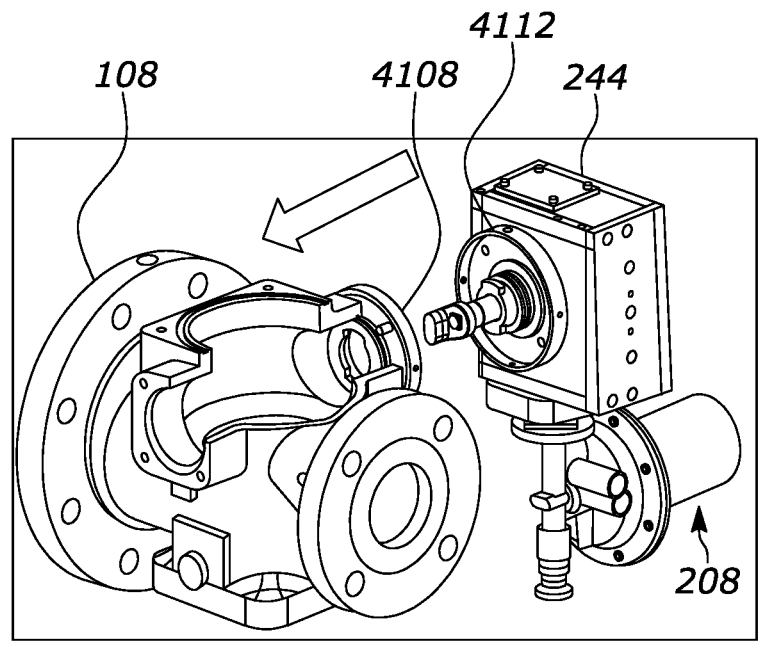
FIGS. 47-52 illustrate the process of coupling the slam-shut mechanism to the regulator body using the flange assembly of FIGS. 41-46.
Figure 48:
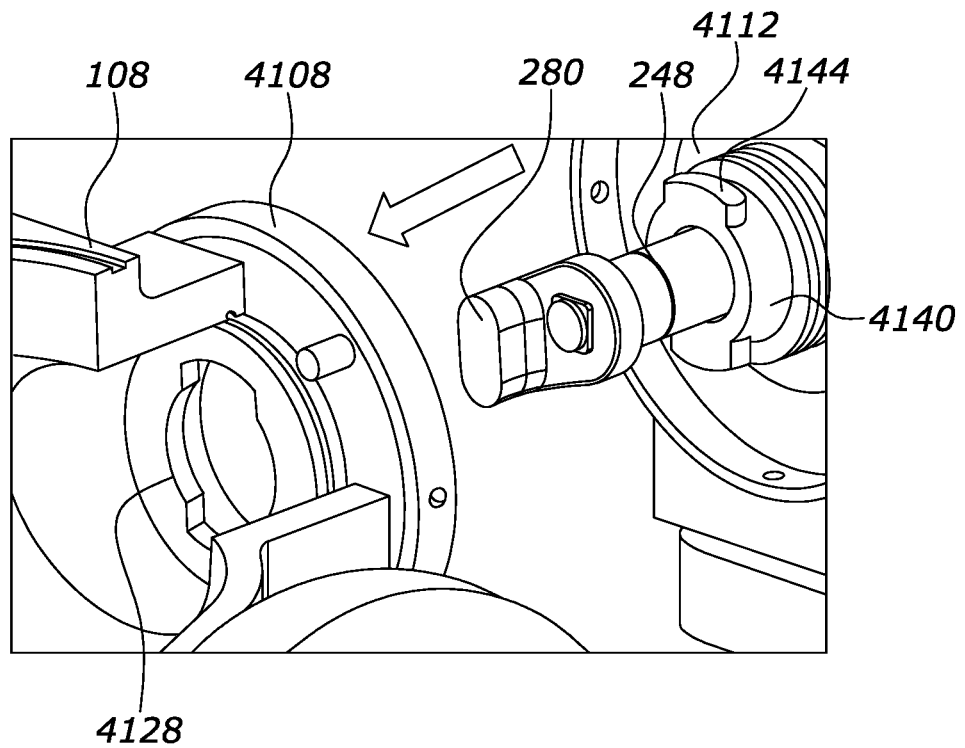
Figure 49:
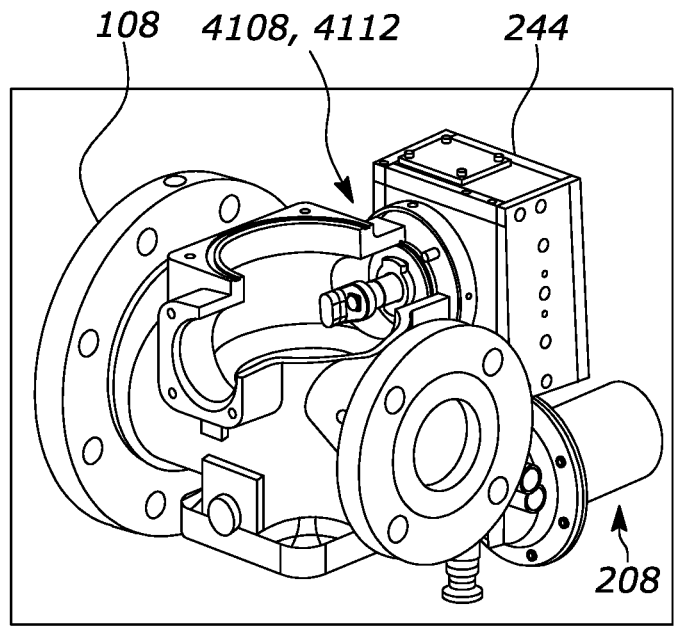
Figure 50:
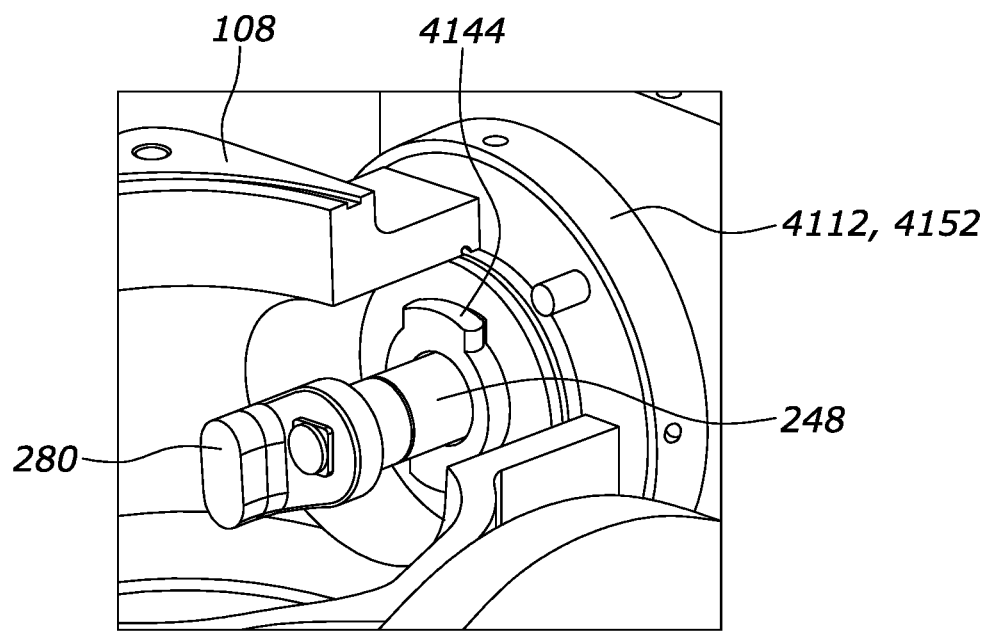
Figure 51:
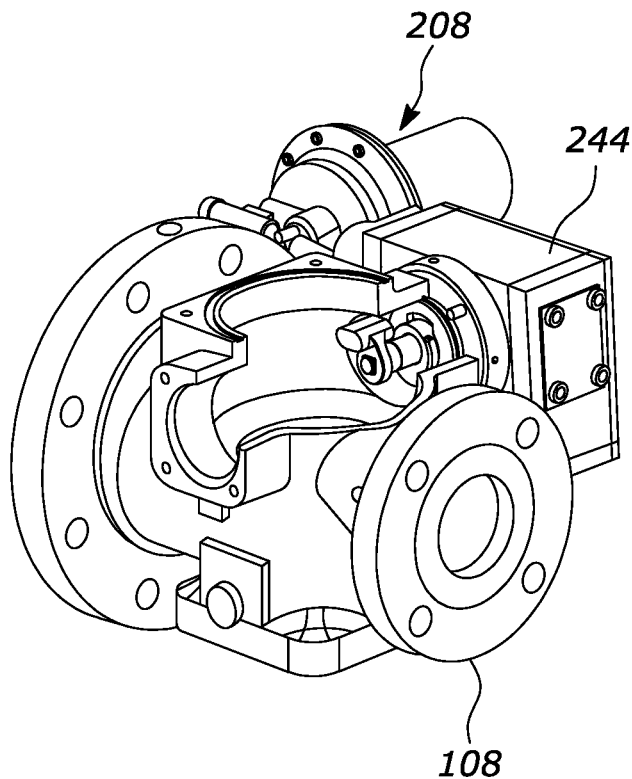
Figure 52:
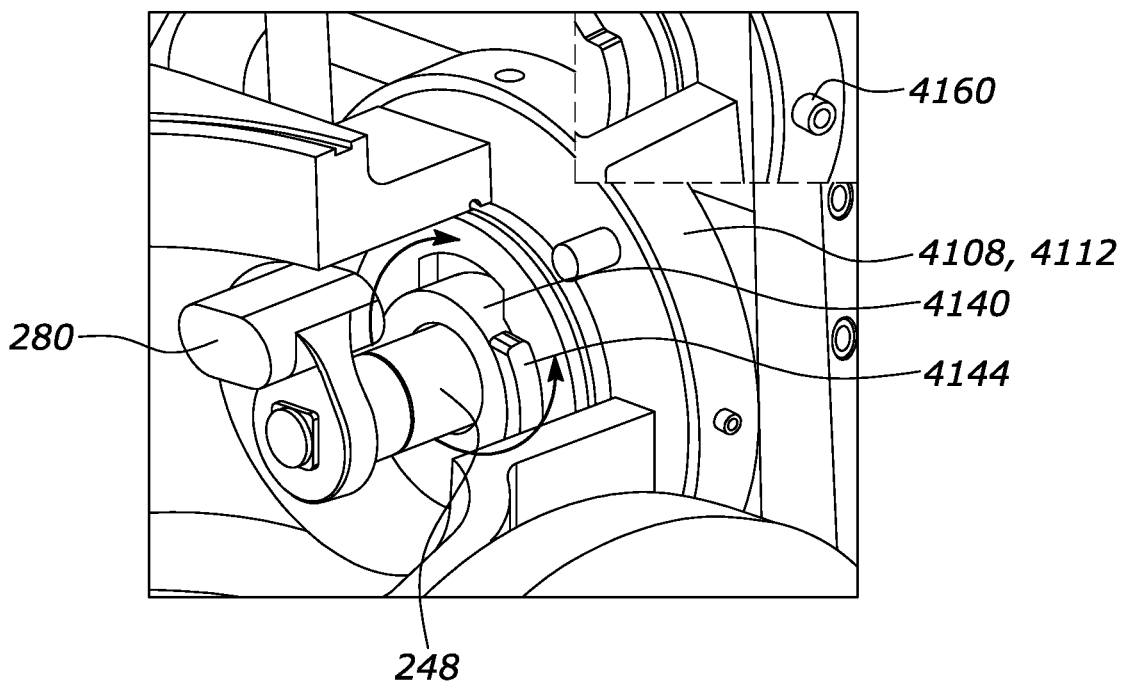

In order to couple the housing 244 of the slam-shut mechanism to the regulator body 108 of the fluid regulator 100 via the flange assembly, the second flange 4112 (mounted to the housing 244) is positioned immediately adjacent the first flange 4108 (mounted to the regulator body 108) such that the outwardly extending coupling 4140 and the tabs 4144 of the second flange 4112 are aligned with the central opening 4128 of the first flange 4108, as illustrated in FIGS. 47 and 48. In turn, the shaft 248 and the cam 252 are inserted through the central opening 4128 of the first flange 4108 until (1) a perimeter edge 4152 of the second flange 4112 engages (and surrounds) a perimeter edge 4156 of the first flange 4108, and (2) the outwardly extending coupling 4140 and the tabs 4144 of the second flange 4112 are inserted into the central opening 4128 of the first flange 4108, as illustrated in FIGS. 49 and 50. The outwardly extending coupling 4140 and the tabs 4144 are subsequently rotated (e.g., in a clockwise direction) until the tabs 4144 are out of alignment with the central opening 4128 of the first flange 4108, as illustrated in FIGS. 51 and 52. A plurality of fasteners 4160 (only one of which is shown in FIG. 52) are subsequently inserted into a plurality of apertures formed in each of the perimeter edge 4152 and the perimeter edge 4156, thereby fixing the second flange 4112 in this position relative to the first flange 4108 (and securing the housing 244 to the regulator body 108). It will of course be appreciated that the housing 244 can be decoupled from the regulator body 108 in a similar (but reverse) manner, all without having to open the housing 244.

In some cases (e.g., for maintenance), it may be necessary to remove the actuator assembly 116 from the regulator body 108. In order to remove the actuator assembly 116 from the regulator body 108, the plurality of fasteners coupling the actuator housing 240 from the regulator 108 are removed, and the actuator assembly 116 can be lifted up, off the regulator body 108. Lifting the actuator assembly 116 in this manner also lifts the control assembly 112 and the components of the internal slam-shut assembly 200 out of the regulator body 108. However, in some cases, the components of the slam-shut mechanism 204 may interfere with the removal of the actuator assembly 116 from the regulator body 108. For example, the shaft 248 and the cam surface 280 may interact with the seat 130 and the slam-shut control element 216 as the actuator assembly 116 is removed from the regulator body 108.

Figure 53:
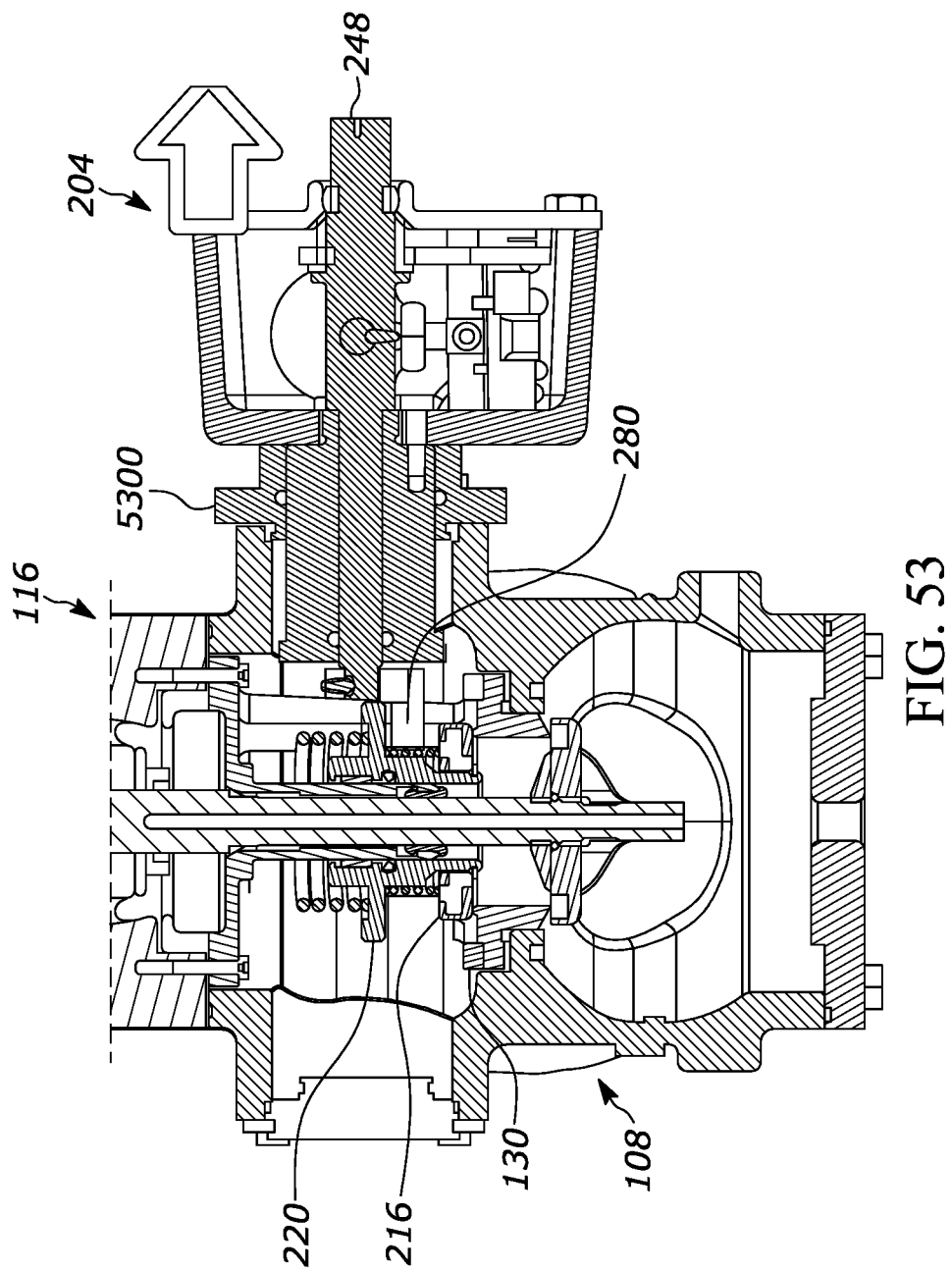
FIG. 53 is a cross-sectional view of a portion of another example of a slam-shut mechanism constructed in accordance with the teachings of the present disclosure, the slam-shut mechanism coupled to the fluid regulator of FIGS. 1-4 and including a bushing.
Figure 54:
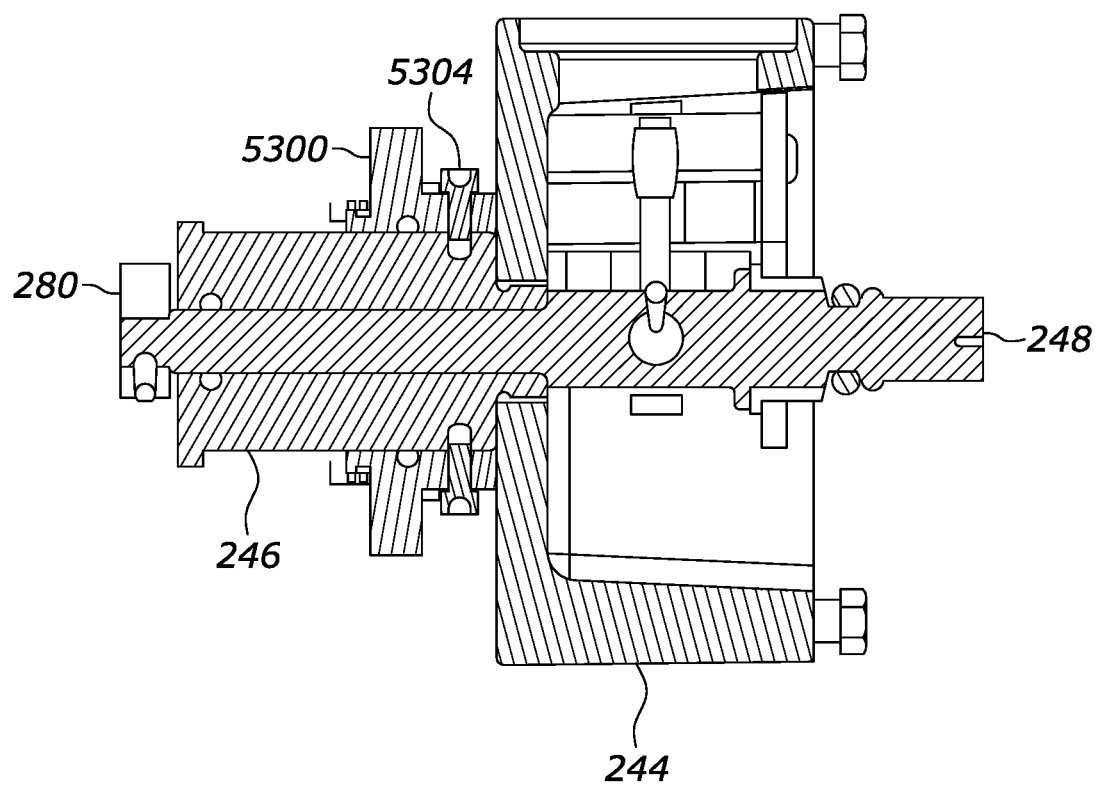
FIG. 54 is a close-up view of the slam-shut mechanism of FIG. 53.

Thus, in some examples, any of the slam-shut mechanisms described herein can be modified to include a bushing that allows the slam-shut mechanism to be moved (e.g., slid) outward, away from the internal slam-shut assembly 200, in order to allow the actuator assembly 116, the control assembly 112, and the components of the internal slam-shut assembly 200 to be removed from the regulator body 108 without interference and without removing the slam-shut mechanism. FIGS. 53-59 illustrate one example of such a bushing 5300 that can be employed for this purpose in connection with the slam-shut mechanism 204. First, it will be appreciated that the bushing 5300 is removably coupled to the regulator body 108 via a plurality of fasteners (not shown) such that the bushing 5300 engages a portion of the regulator body 108, as illustrated in FIGS. 53 and 54. Moreover, as also illustrated in FIGS. 53 and 54, the bushing 5300 is also removably coupled to the stuffing box 246 via a plurality of fasteners (e.g., bolts 5304) at a position between the housing 244 and the cam 252, and, more particularly, at a position immediately adjacent an exterior portion of the housing 244. Accordingly, when the bushing 5300 is coupled to the regulator body 108, the housing 244, which is coupled to the bushing 5300 via the stuffing box 246, is spaced from and disposed entirely outside of the regulator body 108.

Figure 55:
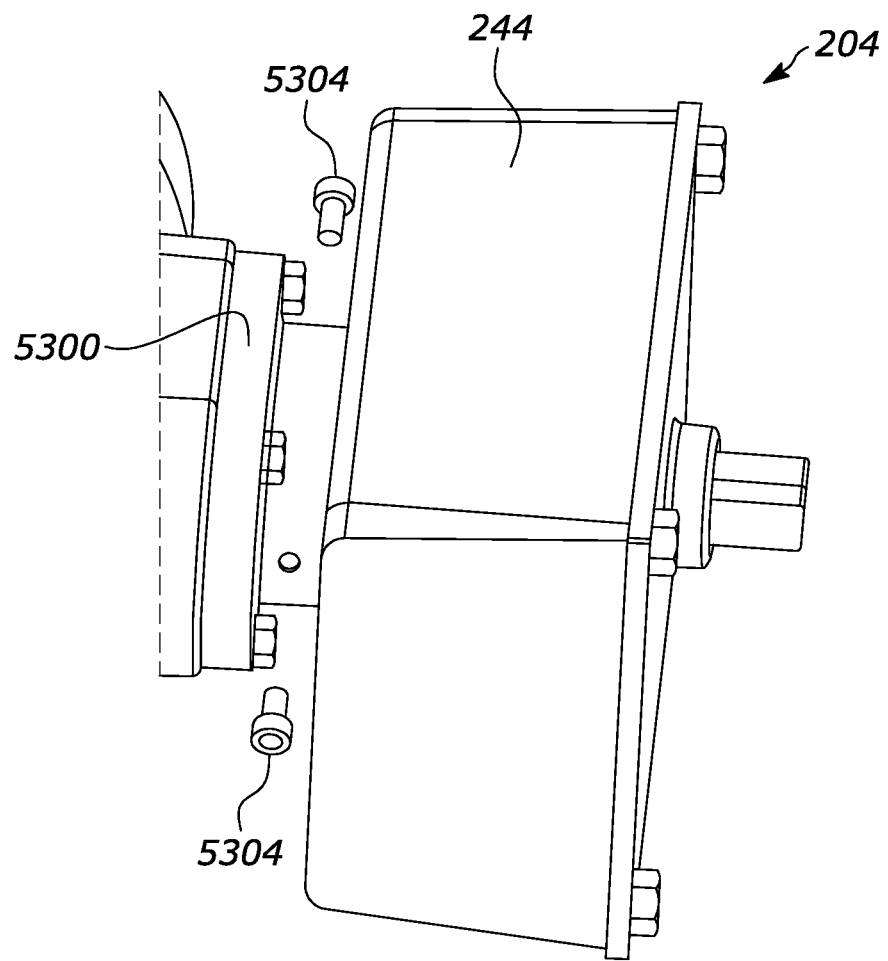
FIG. 55 illustrates a plurality of fasteners being removed from the bushing so as to allow the slam-shut mechanism to be moved.
Figure 56:
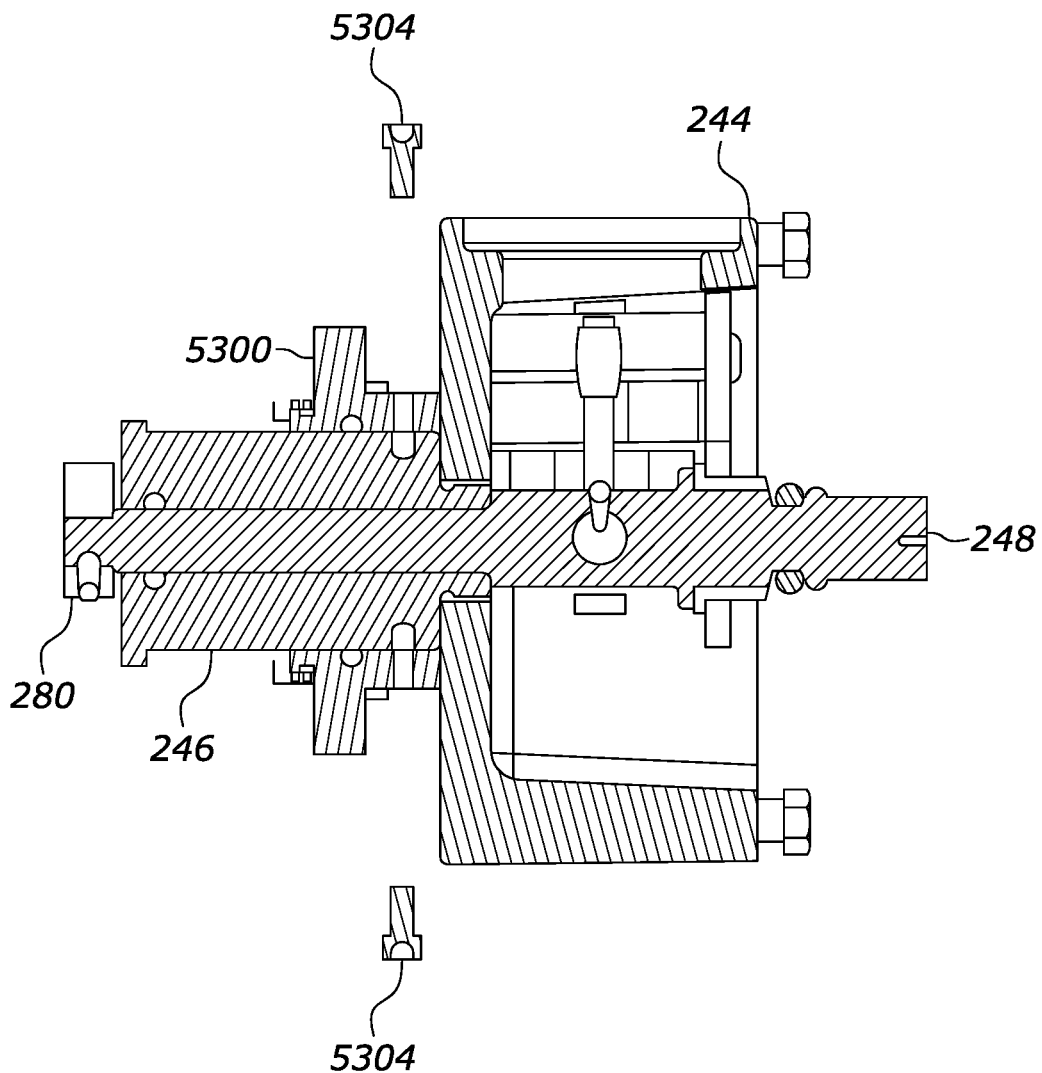
FIG. 56 is a cross-sectional view of slam-shut mechanism with the plurality of fasteners removed from the bushing.
Figure 57:
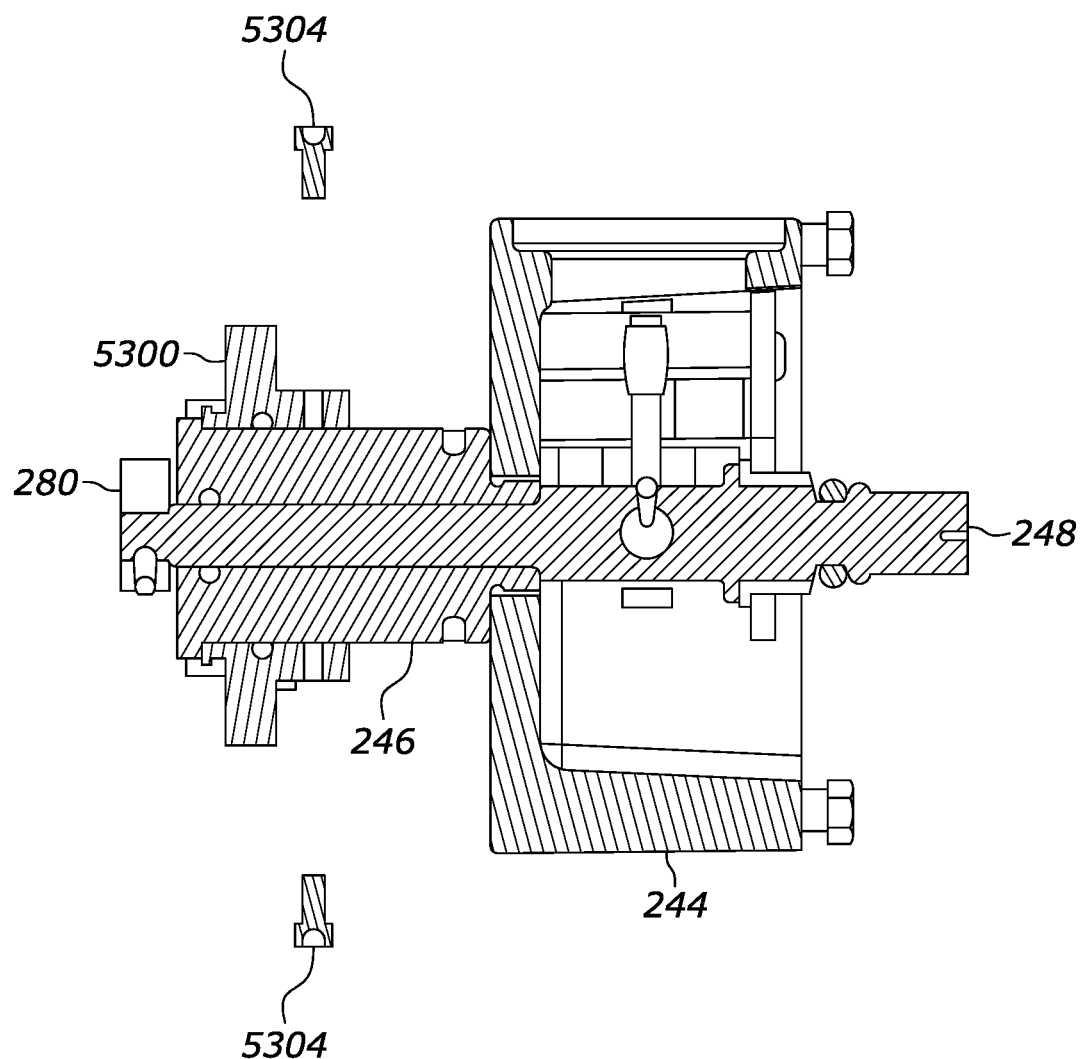
FIG. 57 is similar to FIG. 56, but shows the slam-shut mechanism moved to a different position.
Figure 58:
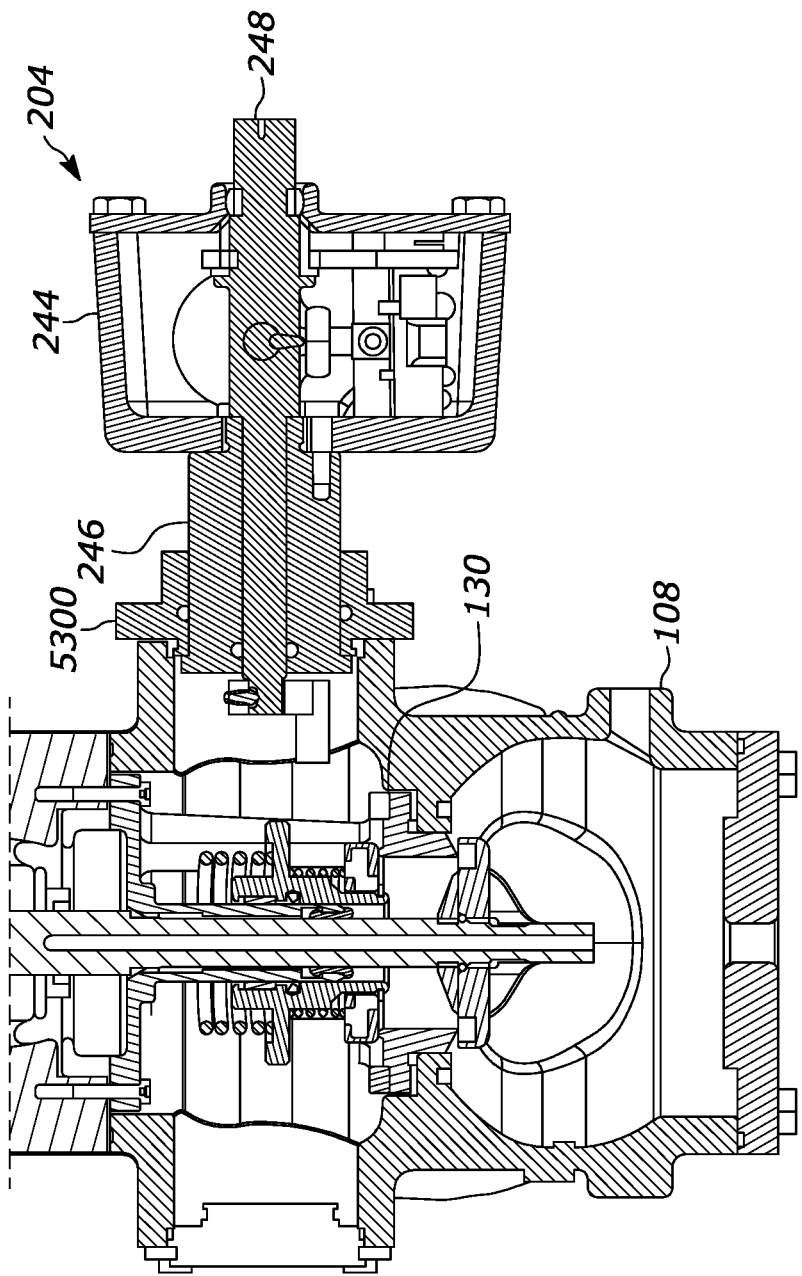
FIG. 58 illustrates the slam-shut mechanism in the different position of FIG. 57 and coupled to the fluid regulator of FIGS. 1-4.
Figure 59:
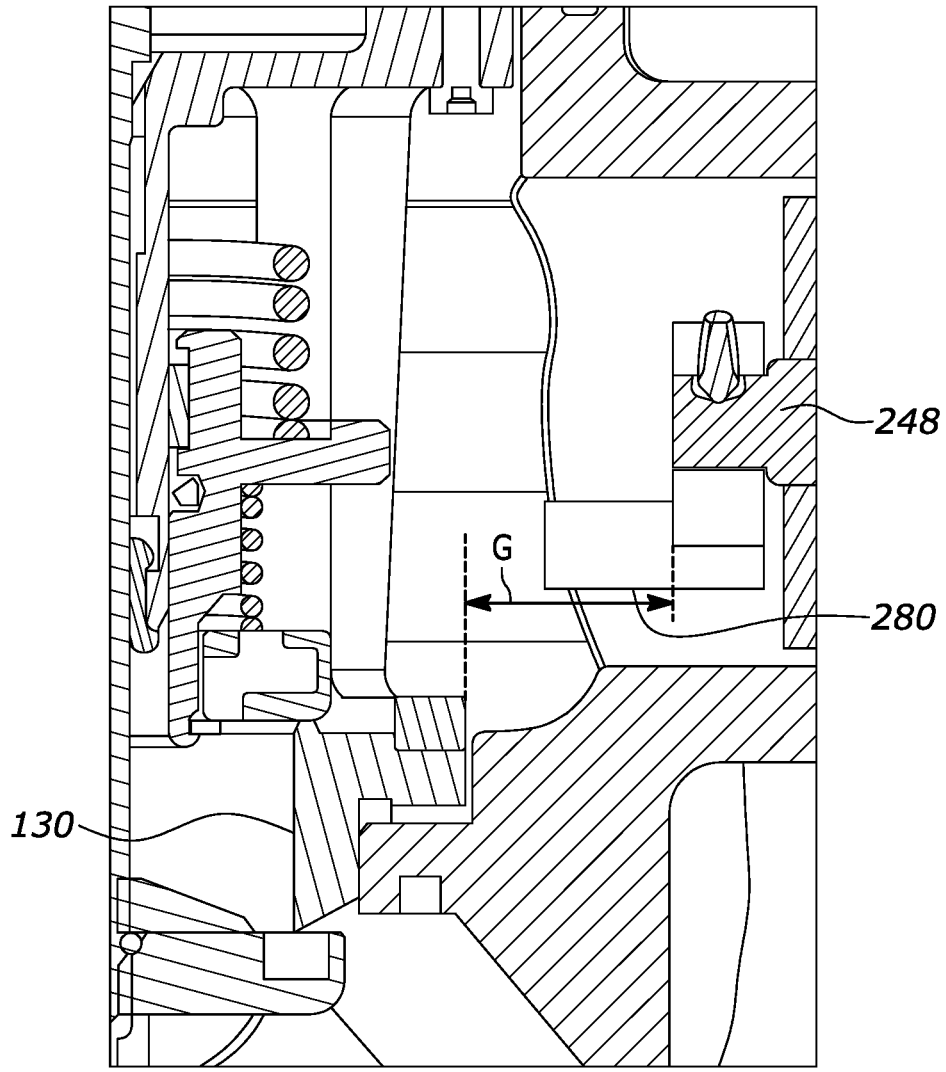
FIG. 59 is a close-up view of a portion of FIG. 58.

When the bushing 5300 is located in the position illustrated in FIGS. 53 and 54, the bushing 5300 is fixed relative to the housing 244 and the stuffing box 246, and the slam-shut safety device 104 is operable in the manner described above. However, when it is necessary to remove the actuator assembly 116 from the regulator body 108, the slam-shut mechanism 204 can be moved from the position illustrated in FIGS. 53 and 54 to the position illustrated in FIGS. 55 and 56. This is accomplished by removing the bolts 5304 from the stuffing box 246 and the bushing 5300, as illustrated in FIGS. 55 and 56. In turn, the housing 244 and the stuffing box 246 can be moved outward, away from the regulator body 108, relative to the regulator body 108, as illustrated in FIGS. 57 and 58. Movement of the housing 244 and the stuffing box 246 in this manner drives the cam surface 280 outward as well, away from the seat 130 and the components of the internal slam-shut assembly 200, such that the slam-shut mechanism 204 does not interfere with the removal of the actuator assembly 116. As illustrated in FIG. 59, for example, a gap G will now exist between the cam surface 280 and the seat 130. At the same time, the bushing 5300 continues to engage the regulator body 108, such that the slam-shut mechanism 204 continues to be coupled to the regulator body 108. Conversely, when it is time to re-couple the actuator assembly 116 to the regulator body 108, the housing 244 and the stuffing box 246 can be moved inward, toward the regulator body 108, and the bolts 5304 can again be used to secure the bushing 5300 to the stuffing box 246, as illustrated in FIGS. 53 and 54.

In some examples, the shaft 248 and the cam 252 (which may also be referred to herein as a cam and shaft assembly) can be modified so that the slam-shut mechanism employing the modified shaft and cam can be interchangeably used in connection with a plurality of differently sized fluid regulators. More particularly, the shaft 248 and the cam 252 can be modified so as to be adjustable relative to one another so that the slam-shut mechanism can be interchangeably used in connection with the plurality of differently sized fluid regulators. As an example, the modified shaft and cam can be configured so that the slam-shut mechanism employing the modified shaft and cam can be interchangeably used in connection with a first fluid regulator (e.g., the fluid regulator 100) having a first size (e.g., a 1" fluid regulator, a 3" fluid regulator), a second fluid regulator having a second size (e.g., a 1.5" fluid regulator, a 4" fluid regulator, a 4.5" fluid regulator) larger than the first size, or a third fluid regulator having a third size (e.g., a 2" fluid regulator, a 2.5" fluid regulator, a 5" fluid regulator, a 6" fluid regulator) larger than the first and second sizes.

Figure 60:
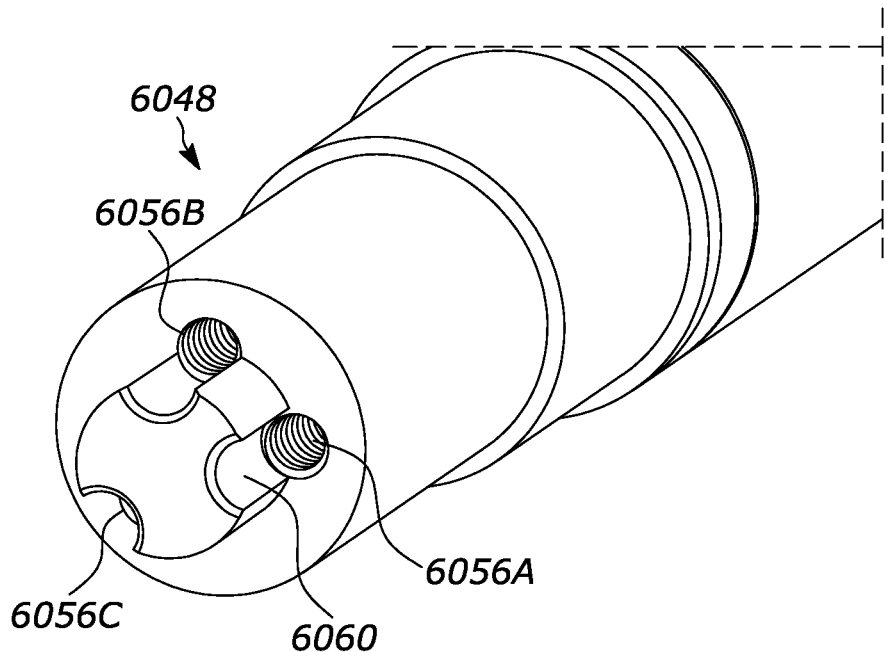
FIG. 60 is a perspective view of a shaft of another example of a cam and shaft assembly constructed in accordance with the teachings of the present disclosure.
Figure 61:
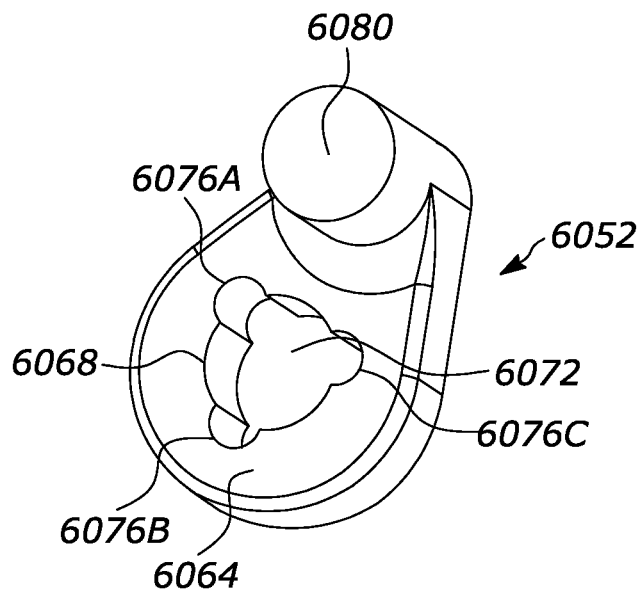
FIG. 61 is a perspective view of a cam of the cam and shaft assembly of FIG. 60.

FIGS. 60 and 61 illustrate one example of such a modified shaft 6048 and a modified cam 6052. As illustrated in FIG. 60, the shaft 6048 generally includes a plurality of holes that correspond to different positions of the cam 6052 relative to the shaft 6048 in order to accommodate the differently sized fluid regulators, respectively. In this example, the shaft 6048 includes three threaded holes 6056A, 6056B, 6056C formed in an end 6060 of the shaft 6048, with each threaded hole 6056A-6056C corresponding to a differently sized fluid regulator. In this example, the first threaded hole 6056A corresponds to the first fluid regulator (having the first size), the second threaded hole 6056B corresponds to the second fluid regulator (having the second size), and the third threaded hole 6056C corresponds to the third fluid regulator (having the third size). The three threaded holes 6056A-6056C are circumferentially spaced about the end 6060 of the shaft 6048. In other examples, however, the shaft 6048 can include more or less holes, such that the shaft 6048 can accommodate a different number of differently sized fluid regulators. Moreover, in other examples, the holes need not be threaded.

Meanwhile, as illustrated in FIG. 61, the cam 6052 generally includes a cam body 6064 having an aperture 6068, and a cam surface 6080 that projects outwardly from the cam body 6064 and is structurally and functionally identical to the cam surface 280 described above. Thus, the cam surface 6080 is also adapted to be operatively connected to the slam-shut control element 216 (via the slam-shut spring seat 220). The aperture 6068 is generally defined by a central opening 6072 and a plurality of semi-circular cutouts surrounding the central opening 6072. In this example, the aperture 6068 includes three semi-circular cutouts 6076A-6076C, with each semi-circular cutout 6076A-6076C corresponding to a differently sized fluid regulator and arranged to be generally aligned with a respective one of the three threaded holes 6056A-6056C when the cam 6052 is coupled to the shaft 6048. As such, in this example, the first semi-circular cutout 6076A corresponds to the first fluid regulator (having the first size), the second semi-circular cutout 6076B corresponds to the second fluid regulator (having the second size), and the third semi-circular cutout 6076C corresponds to the third fluid regulator (having the third size). In other examples, however, the aperture 6068 can be defined by a different arrangement of openings (e.g., less or more than three semi-circular cutouts).

Generally speaking, it will be appreciated that the cam 6052 can be coupled to the shaft 6048 by disposing the end 6060 of the shaft 6048 in the central opening 6072, and, depending upon the size of the fluid regulator in which the shaft 6048 and the cam 6052 are to be disposed, the semi-circular cutout 6076A-6076C corresponding to the size of that fluid regulator is aligned with the corresponding threaded hole 6056A-6056C. In turn, a fastener 6084, which in this example is threaded, is inserted into the desired semi-circular cutout 6076A-6076C and the corresponding threaded hole 6056A-6056C.

Figure 62:
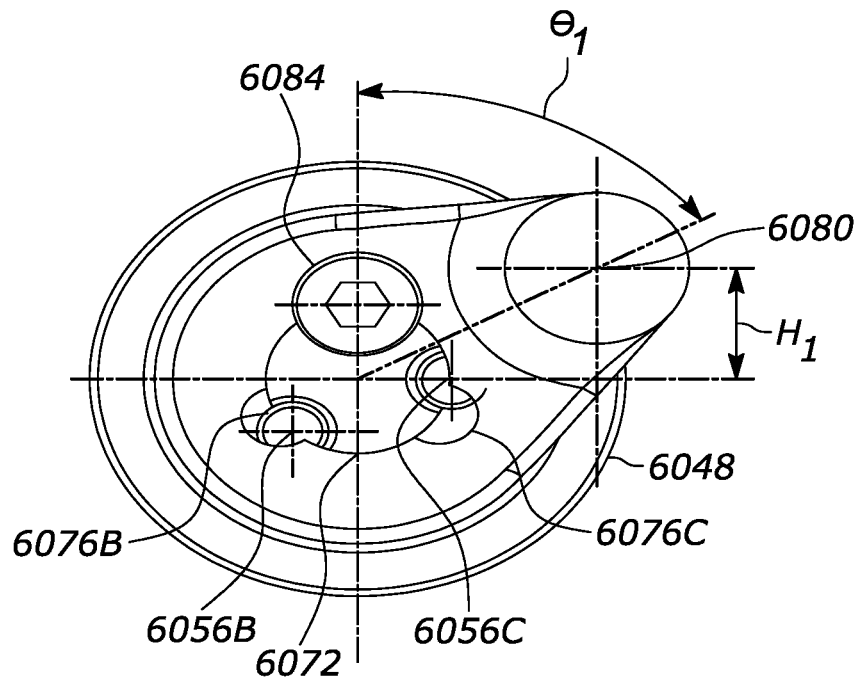
FIG. 62 is a top view of the cam and shaft assembly of FIGS. 60 and 61 when the cam is coupled to the shaft in a first position.

When, for example, the slam-shut mechanism employing the shaft 6048 and the cam 6052 is to be used in connection with the first fluid regulator (having the first size), the cam 6052 is configured in (or re-configured to) a first position relative to the shaft 6048. In this first position, the first semi-circular cutout 6076A is aligned with the first threaded hole 6056A, and the fastener 6084 is inserted into the first semi-circular cutout 6076A and the first threaded hole 6056A, as illustrated in FIG. 62. In turn, the center of the cam surface 6080 is spaced a first height $H_1$ from the center of the shaft 6048. It will be appreciated that the height $H_1$ is equal to the height the cam surface 6080 falls (or rises) as the slam-shut control element 216 moves from the fully open position to the closed position (and vice-versa) in the first fluid regulator. Moreover, the second and third semi-circular cutouts 6076B, 6076C are generally out of alignment with the second and third threaded holes 6056B, 6056C, respectively. Further, the cam surface 6080 is oriented at a first angle $\theta_1$ relative to the transverse axis B of the shaft 6048. It will be appreciated that the first angle $\theta_1$ is related to the amount of rotation that the shaft 6048 and the cam surface 6080 experience as the slam-shut control element 216 is moved from the fully open position to the closed position (and vice-versa) in the first fluid regulator. In the example illustrated in FIG. 62, the first fluid regulator is a 1" fluid regulator, such that the first height $H_1$ is equal to 7.5 inches and the first angle $\theta_1$ is equal to approximately 59.6 degrees, as the shaft 6048 and the cam surface 6080 rotate approximately 30.4 degrees as the slam-shut control element 216 is moved from the fully open position to the closed position (and vice-versa) in the first fluid regulator.

Figure 63:
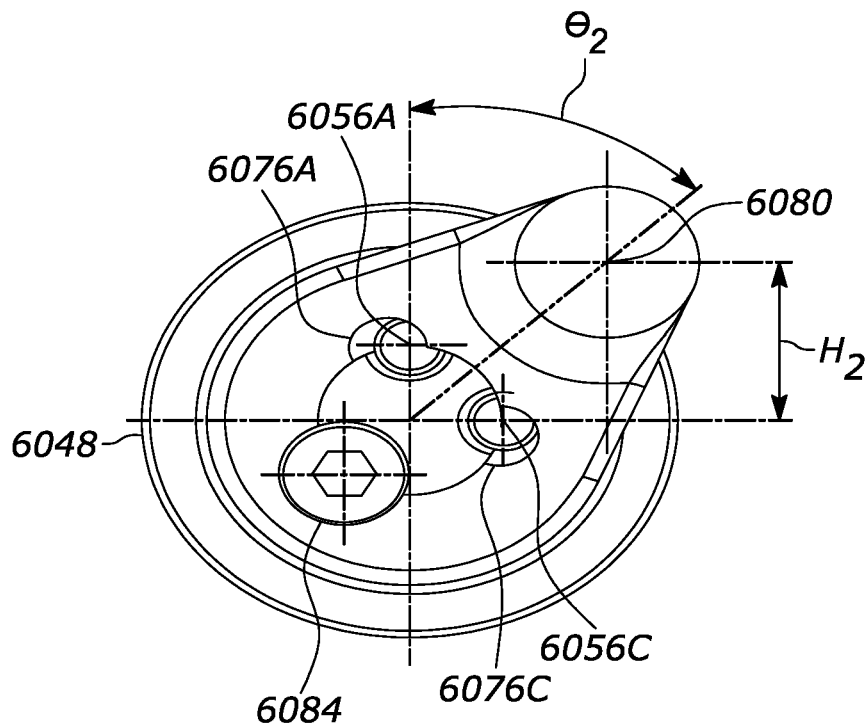
FIG. 63 is similar to FIG. 62 but shows the cam coupled to the shaft in a second position.

However, when the slam-shut mechanism employing the shaft 6048 and the cam 6052 is to be used in connection with the second fluid regulator (having the second size larger than the first size), the cam 6052 is configured in (or reconfigurable to) a second position relative to the shaft 6048 in order to be used in connection with the larger, second fluid regulator. In this second position, the second semi-circular cutout 6076B is aligned with the second threaded hole 6056B, and the fastener 6084 is inserted into the second semi-circular cutout 6076B and the second threaded hole 6056B, as illustrated in FIG. 63. In turn, the center of the cam surface 6080 is spaced a second height $H_2$ from the center of the shaft 6048. It will be appreciated that the height $H_2$ is equal to the height the cam surface 6080 falls (or rises) as the slam-shut control element 216 moves from the fully open position to the closed position (and vice-versa) in the second fluid regulator. Moreover, the first and third semi-circular cutouts 6076A, 6076C are generally out of alignment with the first and third threaded holes 6056A, 6056C, respectively. Further, the cam surface 6080 is oriented at a second angle 82 relative to the transverse axis B of the shaft 6048. It will be appreciated that the second angle 82 is related to the amount of rotation that the shaft 6048 and the cam surface 6080 experience as the slam-shut control element 216 is moved from the fully open position to the closed position (and vice-versa) in the second fluid regulator. In the example illustrated in FIG. 63, the second fluid regulator is a 1.5" fluid regulator, such that the second height $H_2$ is equal to 10.5 inches and the second angle 82 is equal to approximately 45.1 degrees, as the shaft 6048 and the cam surface 6080 rotate approximately 44.9 degrees as the slam-shut control element 216 is moved from the fully open position to the closed position (and vice-versa). Thus, the second height $H_2$ is greater than the first height and the second angle 82 is less than the first angle, which is consistent with the fact that in the second fluid regulator, the slam-shut control element 216 has a greater travel stroke length than the slam-shut control element 216 in the first fluid regulator.

Figure 64:
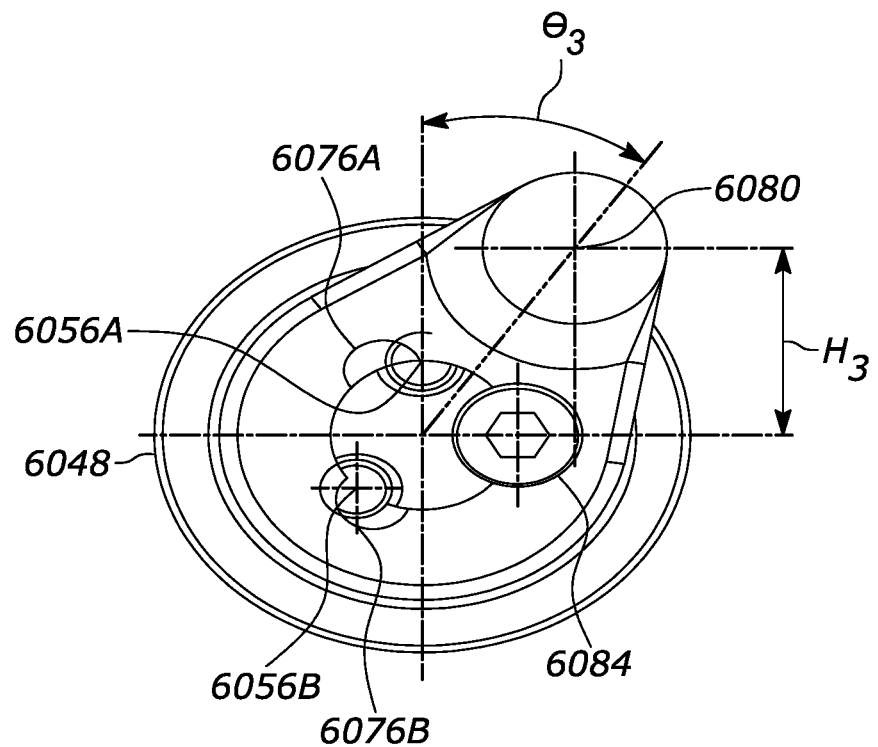
FIG. 64 is similar to FIG. 63, but shows the cam coupled to the shaft in a third position.

On the other hand, when the slam-shut mechanism employing the shaft 6048 and the cam 6052 is to be used in connection with the third fluid regulator (having the third size larger than the first and second sizes), the cam 6052 is configured in (or reconfigurable to) a third position relative to the shaft 6048 in order to be used in connection with the larger, third fluid regulator. In this third position, the third semi-circular cutout 6076C is aligned with the third threaded hole 6056C, and the fastener 6084 is inserted into the third semi-circular cutout 6076C and the third threaded hole 6056C, as illustrated in FIG. 64. In turn, the center of the cam surface 6080 is spaced a third height $H_3$ from the center of the shaft 6048. It will be appreciated that the height $H_3$ is equal to the height the cam surface 6080 falls (or rises) as the slam-shut control element 216 moves from the fully open position to the closed position (and vice-versa) in the third fluid regulator. Moreover, the first and second semi-circular cutouts 6076A, 6076B are generally out of alignment with the first and second threaded holes 6056A, 6056B, respectively. Further, the cam surface 6080 is oriented at a third angle 83 relative to the transverse axis B of the shaft 6048. It will be appreciated that the third angle 83 is related to the amount of rotation that the shaft 6048 and the cam surface 6080 experience as the slam-shut control element 216 is moved from the fully open position to the closed position (and vice-versa) in the third fluid regulator. In the example illustrated in FIG. 64, the third fluid regulator is a 2" or 2.5" fluid regulator, such that the third height $H_3$ is equal to 12.5 inches and the third angle 83 is equal to approximately 33.1 degrees, as the shaft 6048 and the cam surface 6080 rotate approximately 56.9 degrees as the slam-shut control element 216 is moved from the fully open position to the closed position (and vice-versa) in the third regulator. Thus, the third height $H_3$ is greater than the first and second heights and the third angle 83 is less than the first and second angles, which is consistent with the fact that in the third fluid regulator, the slam-shut control element 216 has a greater travel stroke length than the slam-shut control element 216 in the first and second fluid regulators.

It will be appreciated that the cam 6052 is reconfigurable relative to the shaft 248 between the first position, the second position, and the third position any number of times. For example, the cam 6052 can be configured in the first position for use in the first fluid regulator, then reconfigured to the second position for use in the second fluid regulator. To this end, the fastener 6084 is removable from the first, second, or third semi-circular cutout 6076A, 6076B, or 6076C and the first, second, or third threaded hole 6056A, 6056B, or 6056C, depending upon the position of the cam 6052. The cam 6052 can in turn be re-positioned as desired, and the fastener 6084 disposed in the first, second, or third semi-circular cutout 6076A, 6076B, or 6076C and the first, second, or third threaded hole 6056A, 6056B, or 6056C, depending upon the desired new position of the cam 6052.

Finally, it will be appreciated that any of the examples described herein can be combined in any number of different manners. As an example, the cam and shaft assembly described in connection with FIGS. 60-64 with the components described in connection with FIG. 30, the components described in connection with FIGS. 31 and 32, the components described in connection with FIGS. 35-37, or the components described in connection with FIGS. 41-46. Other combinations are possible as well, as would be understood by a person of ordinary skill in the art.

The invention claimed is:

1. A slam-shut mechanism for operatively connecting a slam-shut control element of a fluid regulator with a controller for the slam-shut control element, the slam-shut mechanism comprising:
   a shaft having a first end and a second end opposite the first end;
   a cam carried by the shaft at a position proximate the first end, the cam having a cam surface adapted to be operatively connected to the slam-shut control element;
   a latching pin carried by the shaft at a position between the first end and the second end such that the latching pin is spaced from the cam;
   a latch; and
   a lever operably connected to the latch, the lever adapted to be selectively engaged by the controller,
   wherein responsive to the controller engaging the lever, the latch is movable from a first position, in which the latch securely retains the latching pin, such that the cam surface is arranged to retain the slam-shut control element in a fully open position, to a second position, in which the latching pin is released from the latch, thereby allowing the slam-shut control element to move from the fully open position to a closed position.

2. The slam-shut mechanism of claim 1, wherein the latching pin has a first contact surface and the latch has a second contact surface configured to engage the first contact surface when the latch is in the first position, and wherein the second contact surface is oriented at an angle relative to an axis of the latching pin.

3. The slam-shut mechanism of claim 1, further comprising a second lever that operatively connects the lever and the latch, wherein the second lever is configured to pivot with the lever.

4. The slam-shut mechanism of claim 3, wherein the second lever comprises a pin that engages an inclined surface of the latch when the latch is moved from the first position to the second position.

5. The slam-shut mechanism of claim 1, wherein movement of the latch from the first position to the second position permits the shaft to rotate in a first direction to a closed position, and wherein when the shaft is in the closed position, rotation of the shaft in a second direction opposite the first direction causes the latch to move from the second position to the first position.

6. The slam-shut mechanism of claim 5, wherein rotation of the shaft in the second direction causes the latching pin to engage a first vertex of the lever, and wherein engagement of the first vertex by the latching pin causes a second vertex of the lever to rotate into engagement with the controller, thereby causing the latch to move to the first position.

7. The slam-shut mechanism of claim 1, wherein the cam is reconfigurable relative to the shaft to adjust an angle between the cam surface and a transverse axis of the shaft.

8. A slam-shut mechanism for operatively connecting a slam-shut control element of a fluid regulator with a controller for the slam-shut control element, the slam-shut mechanism comprising
   a shaft;
   a cam carried by the shaft, the cam having a cam surface adapted to be operatively connected to the slam-shut control element;
   a latching pin carried by the shaft;
   a latch;
   a lever operably connected to the latch, the lever adapted to be selectively engaged by the controller,
   wherein responsive to the controller engaging the lever, the latch is movable from a first position, in which the latch securely retains the latching pin, such that the cam surface is arranged to retain the slam-shut control element in a fully open position, to a second position, in which the latching pin is released from the latch, thereby allowing the slam-shut control element to move from the fully open position to a closed position; and
   a spring configured to apply a compressive force on the latch, wherein the spring is adjustable to adjust the compressive force applied to the latch.

9. A slam-shut mechanism for operatively connecting a slam-shut control element of a fluid regulator with a controller for the slam-shut control element, the slam-shut mechanism comprising:
   a housing adapted to be coupled to a regulator body of the fluid regulator;
   a shaft having a first end and a second end opposite the first end, the shaft extending through an opening formed in the housing;

a cam carried by the shaft at a position outside of the housing and proximate the first end, the cam adapted to be operatively connected to the slam-shut control element;

a latching pin carried by the shaft at a position between the first end and the second end such that the latching pin is spaced from the cam;

a latch pivotably coupled to the housing; and a lever pivotably coupled to the housing and operably connected to the latch, the lever adapted to be selectively engaged by the controller, wherein responsive to the controller engaging the lever, the latch is movable from a first position, in which the latch securely retains the latching pin such that the cam is arranged to retain the slam-shut control element in a fully open position, to a second position, in which the latching pin is released from the latch, thereby allowing the slam-shut control element to move from the fully open position to a closed position.

10. The slam-shut mechanism of claim 9, wherein the latching pin has a first contact surface and the latch has a second contact surface configured to engage the first contact surface when the latch is in the first position, and wherein the second contact surface is oriented at an angle relative to an axis of the latching pin.

11. The slam-shut mechanism of claim 9, further comprising a second lever that operatively connects the lever and the latch, wherein the second lever is configured to pivot with the lever.

12. The slam-shut mechanism of claim 11, wherein the second lever comprises a pin that engages an inclined surface of the latch when the latch is moved from the first position to the second position.

13. The slam-shut mechanism of claim 9, further comprising a spring configured to apply a compressive force on the latch, wherein the spring is adjustable to adjust the compressive force applied to the latch.

14. The slam-shut mechanism of claim 9, wherein movement of the latch from the first position to the second position permits the shaft to rotate in a first direction to a closed position, and wherein when the shaft is in the closed position, rotation of the shaft in a second direction opposite the first direction causes the latch to move from the second position to the first position.

15. The slam-shut mechanism of claim 14, wherein rotation of the shaft in the second direction causes the latching pin to engage a first vertex of the lever, and wherein engagement of the first vertex by the latching pin causes a second vertex of the lever to rotate into engagement with the controller, thereby causing the latch to move to the first position.

16. The slam-shut mechanism of claim 9, wherein the cam is reconfigurable relative to the shaft to adjust an angle between the cam surface and a transverse axis of the shaft.

17. A fluid regulator, comprising:

a regulator body having an inlet, an outlet, and a flow path extending between the inlet and the outlet, the regulator body including a seat surrounding an orifice in the flow path;

a slam-shut control element disposed within the regulator body and shiftable along a longitudinal axis between a fully open position in which the slam-shut control element is spaced away from the seat, and a closed position in which the slam-shut control element is seated against the seat;

a controller for moving the slam-shut control element between the fully open position and the closed position, the controller coupled to a first portion of the regulator body; and a slam-shut mechanism for operatively connecting the slam-shut control element to the controller, the slam-shut mechanism comprising:

a shaft having a first end and a second end opposite the first end, the shaft extending along a transverse axis that is non-parallel to the longitudinal axis;

a cam carried by the shaft at a position proximate the first end, the cam having a cam surface operatively connected to the slam-shut control element;

a latching pin carried by the shaft at a position between the first end and the second end such that the latching pin is spaced from the cam;

a latch; and a lever operably connected to the latch, the lever configured to be selectively engaged by the controller, wherein responsive to the controller engaging the lever, the latch is movable from a first position, in which the latch securely retains the latching pin such that the cam surface is arranged to retain the slam-shut control element in the fully open position, to a second position, in which the latching pin is released from the latch, and wherein movement of the latch from the first position to the second position allows the slam-shut control element to move from the fully open position to the closed position.

18. The fluid regulator of claim 17, wherein the controller is removable from the first portion of the regulator body and coupleable to a second portion of the regulator body.

19. The fluid regulator of claim 17, further comprising a first flange mounted to the regulator body and a second flange mounted to the slam-shut mechanism, wherein the second flange is configured to matingly engage the first flange to couple the slam-shut mechanism to the regulator body.

20. The fluid regulator of claim 17, wherein the slam-shut mechanism is slidable relative to the regulator body such that the slam-shut control element is removable from the regulator body without interference from the slam-shut mechanism.

21. The fluid regulator of claim 17, further comprising:

a spring seat; and a spring disposed between the slam-shut control element and the spring seat, the spring configured to bias the slam-shut control element away from the spring seat, wherein the cam surface engages the spring seat as the slam-shut control element moves from the fully open position to the closed position.

22. The fluid regulator of claim 17, wherein the cam is reconfigurable relative to the shaft to adjust an angle between the cam surface and the transverse axis of the shaft.

* * * * *